United States Patent [19]

Ehrsam et al.

[11] 4,386,234
[45] May 31, 1983

[54] CRYPTOGRAPHIC COMMUNICATION AND FILE SECURITY USING TERMINALS

[75] Inventors: William F. Ehrsam, Kingston; Robert C. Elander, Saugerties; Stephen M. Matyas, Poughkeepsie; Carl H. W. Meyer, Kingston; Robert L. Powers, West Hurley; Paul N. Prentice, Hyde Park; John L. Smith; Walter L. Tuchman, both of Woodstock, all of N.Y.

[73] Assignee: International Business Machines Corp., Armonk, N.Y.

[21] Appl. No.: 857,533

[22] Filed: Dec. 5, 1977

[51] Int. Cl.³ .............................................. H04L 9/04
[52] U.S. Cl. .............................. 178/22.09; 178/22.16; 375/2.1
[58] Field of Search ...................... 178/22, 22.01, 22.07, 178/22.08, 22.09, 22.16; 340/149 A, 149 R, 152 R; 375/2, 2.1

[56] References Cited

U.S. PATENT DOCUMENTS

| | | | |
|---|---|---|---|
| 3,876,832 | 4/1975 | Morgan et al. | 178/22 |
| 3,938,091 | 2/1976 | Atalla et al. | 340/152 R |
| 3,956,615 | 5/1976 | Anderson et al. | 340/152 R |
| 3,958,081 | 5/1976 | Ehrsam et al. | 178/22 |
| 3,985,998 | 10/1976 | Crafton | 340/149 A |
| 4,004,089 | 1/1977 | Richard et al. | 340/149 A |
| 4,025,760 | 5/1977 | Trenkamp | 340/149 A |
| 4,120,030 | 10/1978 | Johnstone | 178/22 |

*Primary Examiner*—Sal Cangialosi
*Attorney, Agent, or Firm*—Edwin Lester

[57] ABSTRACT

A data security device which includes storage means for storing a master cipher key, cryptographic apparatus for performing cryptographic operations and control means for controlling the writing of a master cipher key into the storage means, controlling the transfer of the master cipher key to the cryptographic apparatus and controlling the cryptographic apparatus to perform cryptographic operations. When a new master cipher key is written into the storage means, the old master cipher key is automatically overwritten with an arbitrary value, after which the new master key may be written into the storage means. The cryptographic apparatus of the data security device includes storage means, a cipher key register and cipher means for performing a cipher function on data stored in the cryptographic apparatus storage means under control of a working cipher key stored in the cipher key register with the resulting ciphered data being stored in the cryptographic apparatus storage means. A load cipher key direct function can be performed whereby a working cipher key may be loaded directly into the cipher key register for use as a working cipher key in performing a cipher function. A decipher key function can be performed whereby the master cipher key is transferred to the cipher key register as a working cipher key after which an operational key enciphered under the master cipher key is transferred to the cryptographic apparatus storage means and the control means causes the enciphered operational key to be deciphered to obtain the operational key in clear form as a working cipher key for subsequent encipher/decipher data functions.

46 Claims, 45 Drawing Figures

SINGLE DOMAIN NETWORK

⊠ DATA SECURITY DEVICE

FIG. 19

| | | Fig.19c1 | Fig.19d1 | Fig.19e1 | Fig.19f1 | Fig.19g1 | Fig19h1 | |
|---|---|---|---|---|---|---|---|---|
| Fig.19a1 | Fig.19b1 | Fig.19c2 | Fig.19d2 | Fig.19e2 | Fig.19f2 | Fig.19g2 | Fig19h2 | |
| Fig.19a2 | Fig.19b2 | Fig.19c3 | Fig.19d3 | Fig.19e3 | Fig.19f3 | Fig.19g3 | Fig.19h3 | Fig.19i1 |
| | Fig.19b3 | Fig.19c4 | Fig19d4 | Fig19e4 | Fig.19f4 | Fig.19g4 | Fig.19h4 | Fig.19i2 |

FIG. 19a1
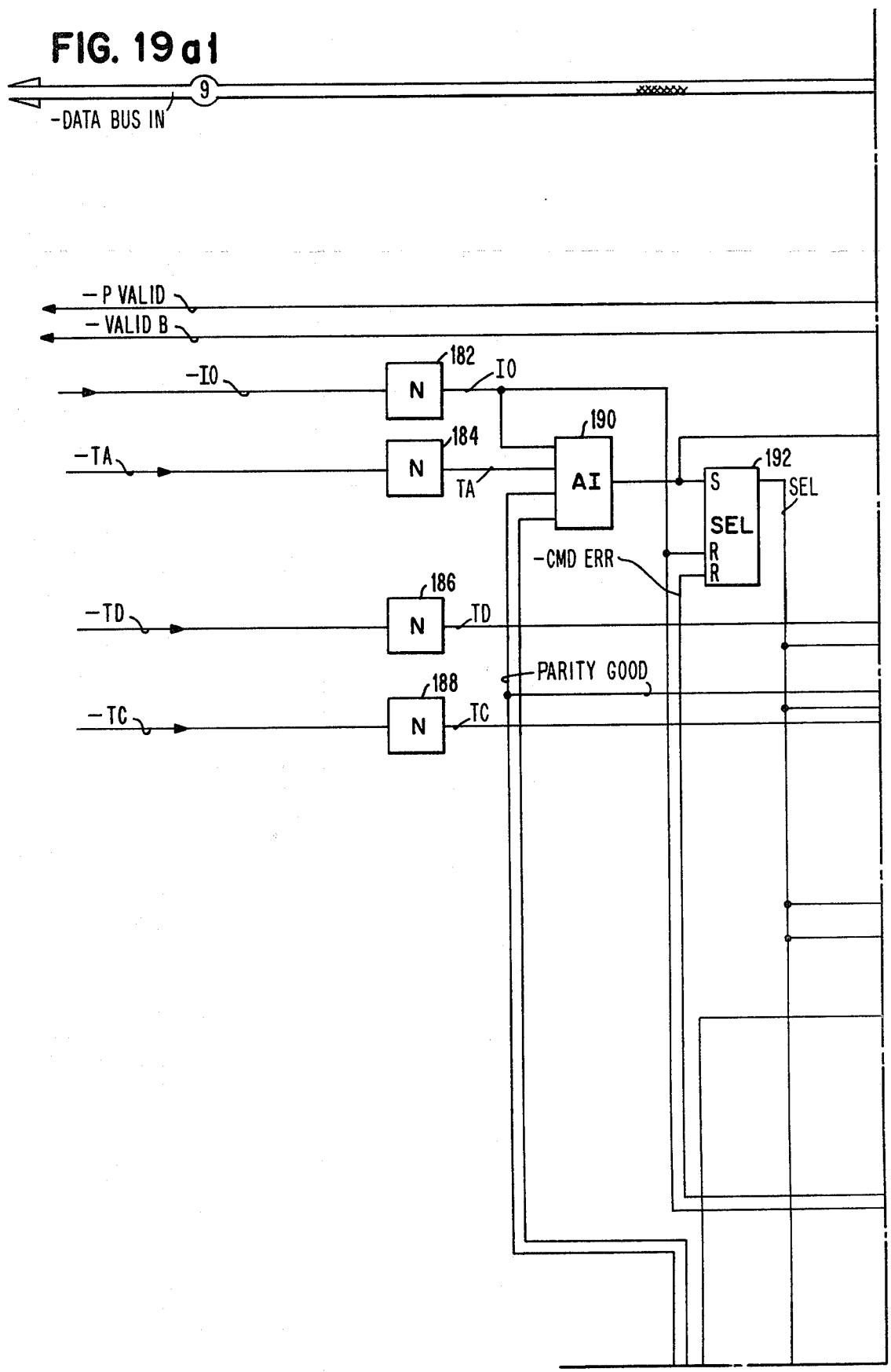

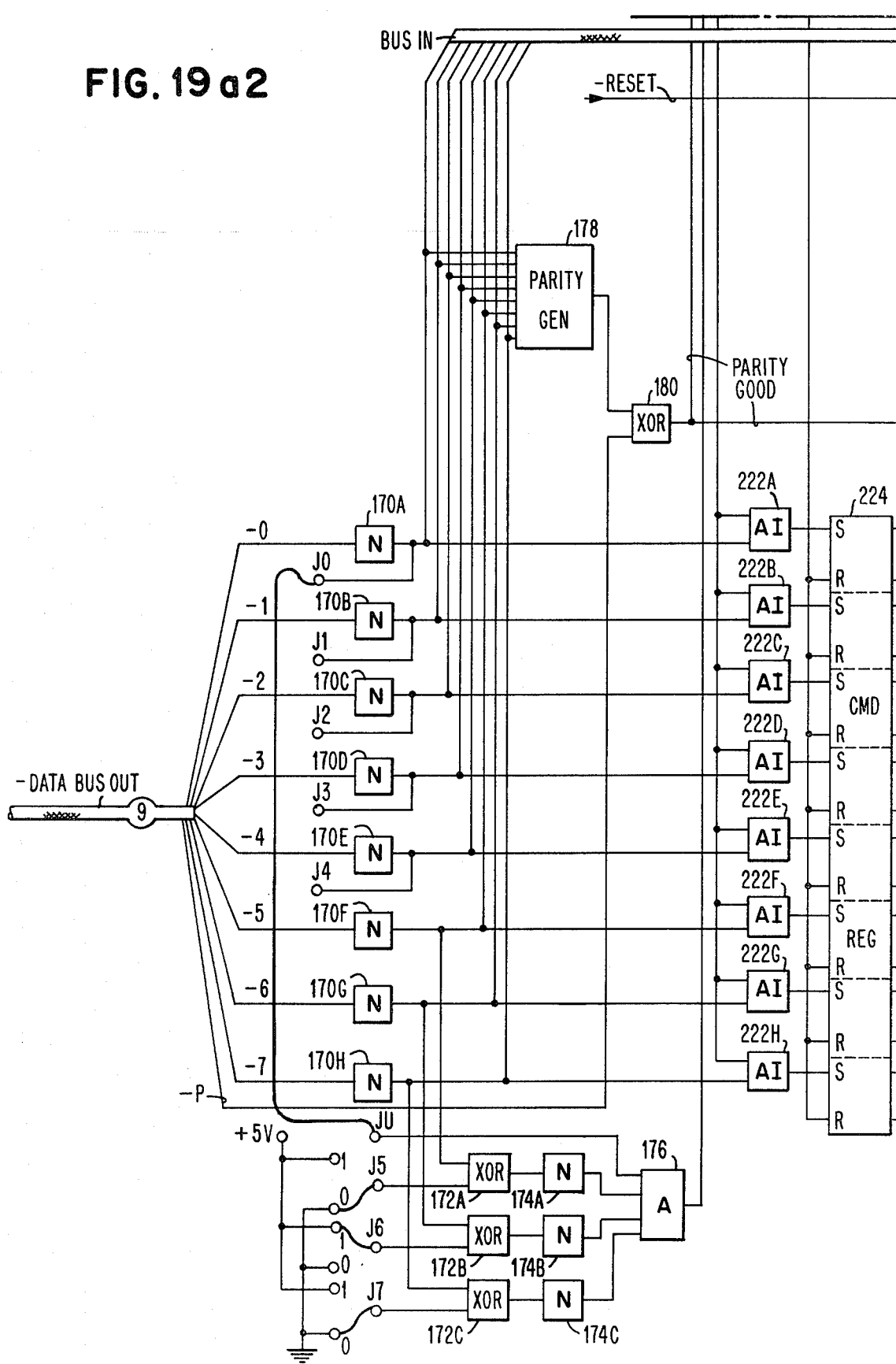
FIG. 19a2

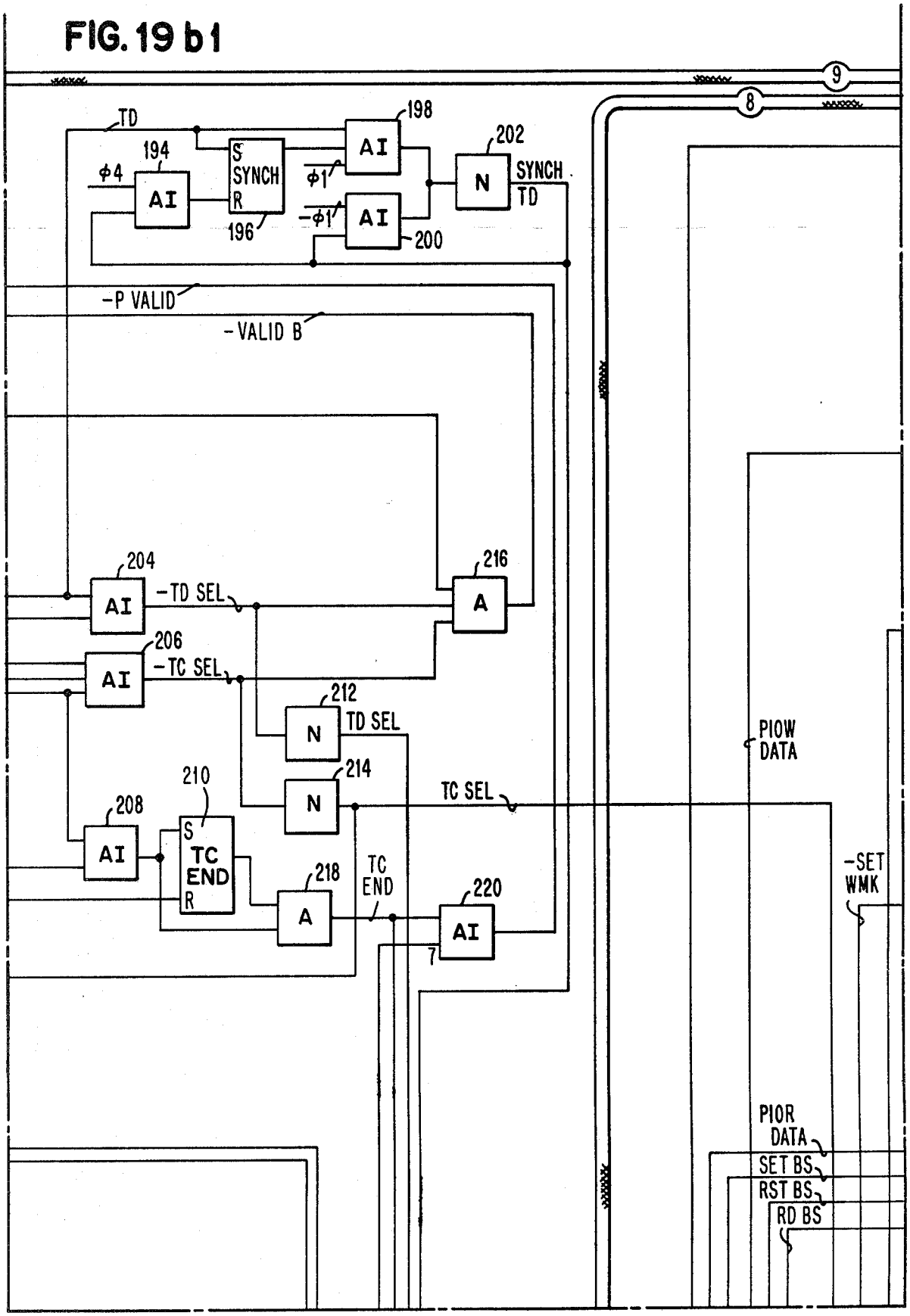
FIG. 19 b1

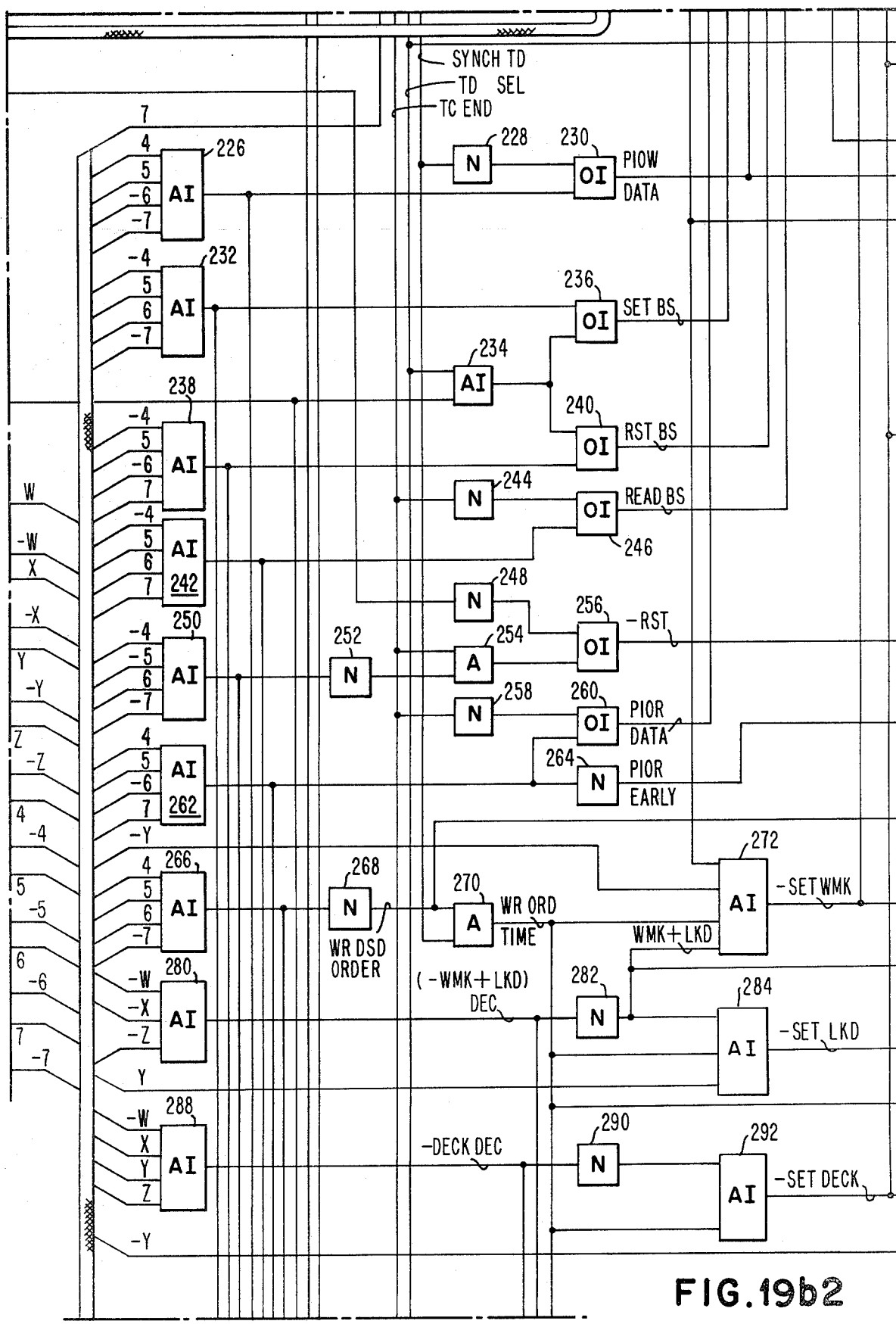
FIG.19b2

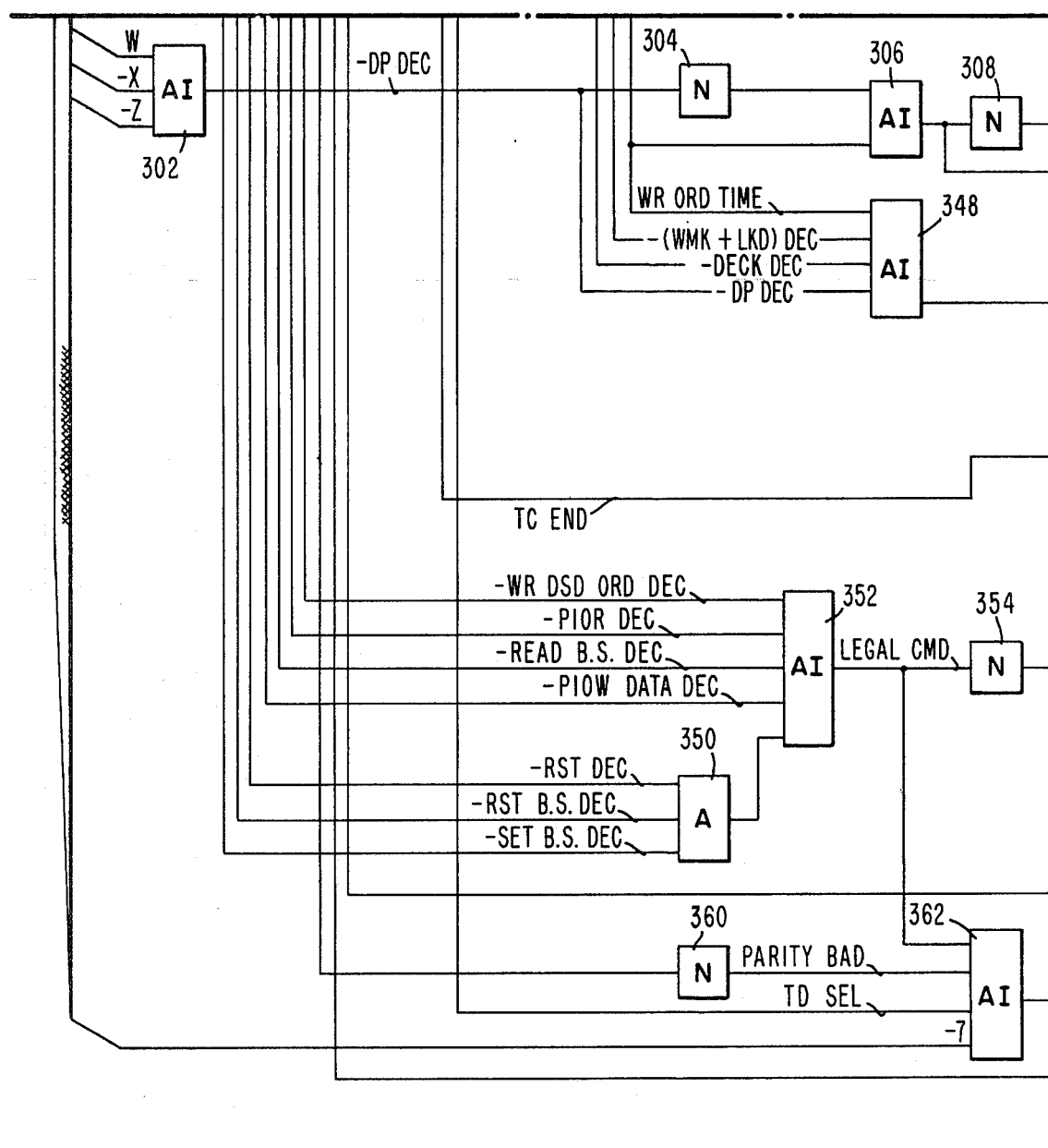
FIG. 19 b3

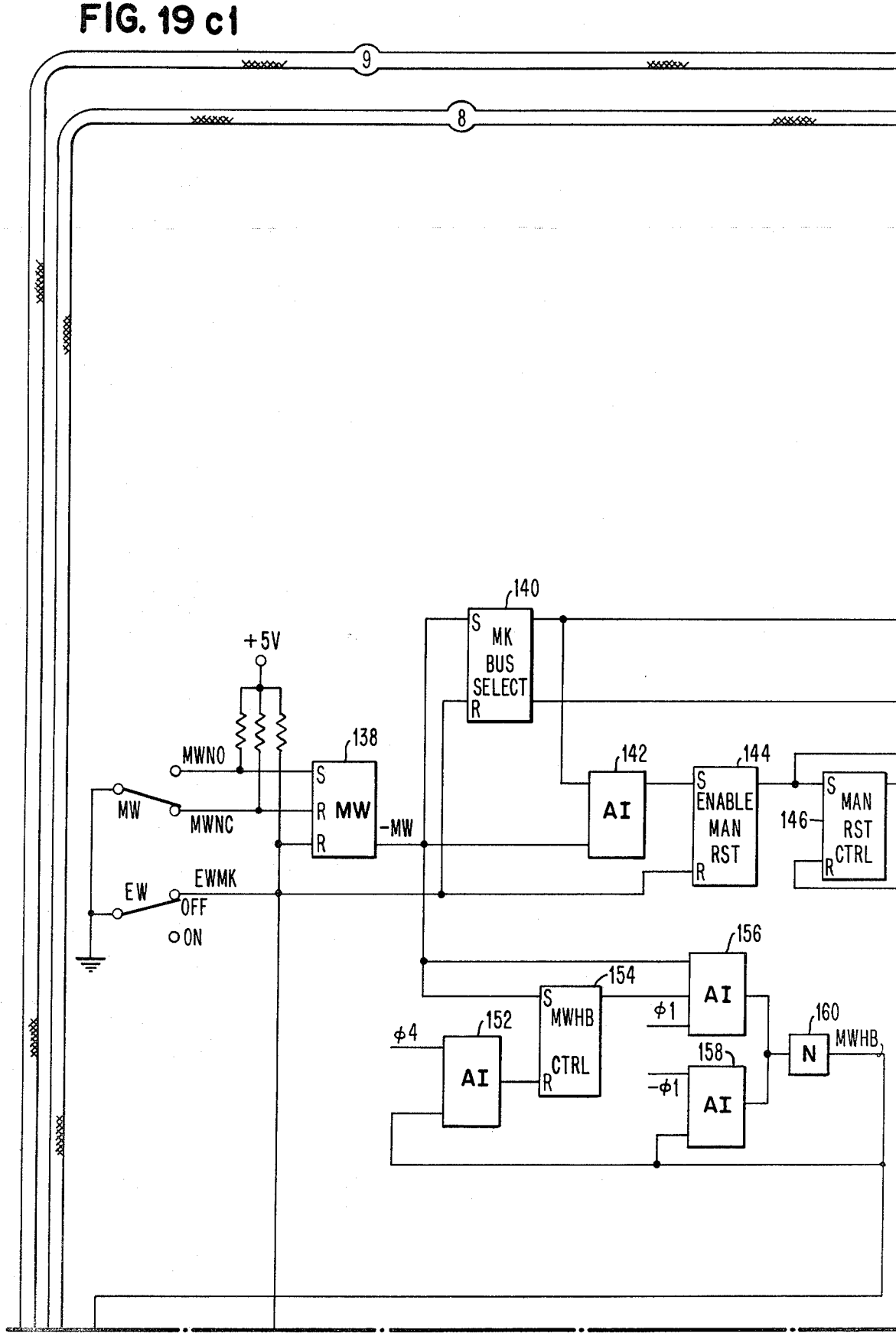
FIG. 19 c1

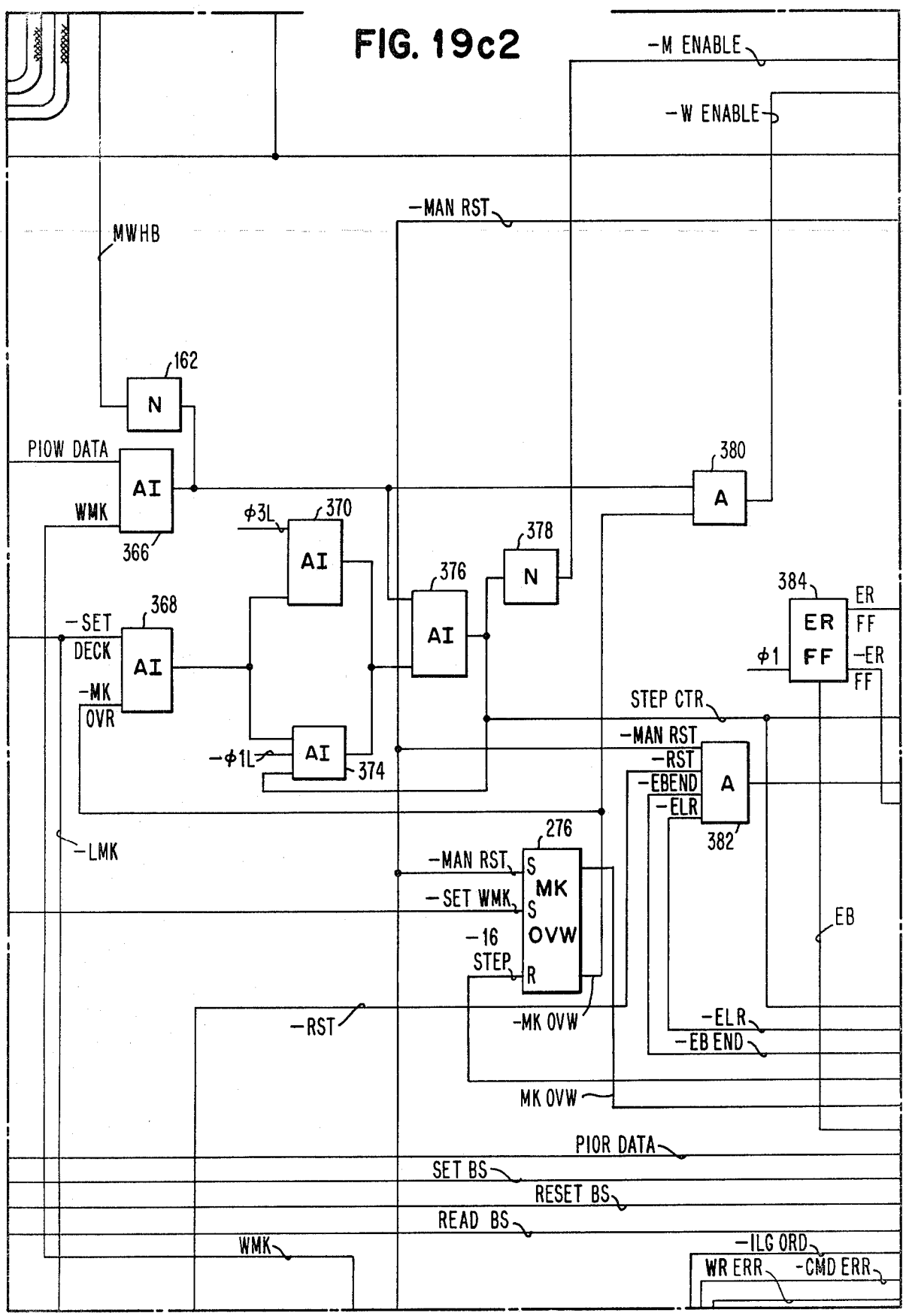
FIG. 19c2

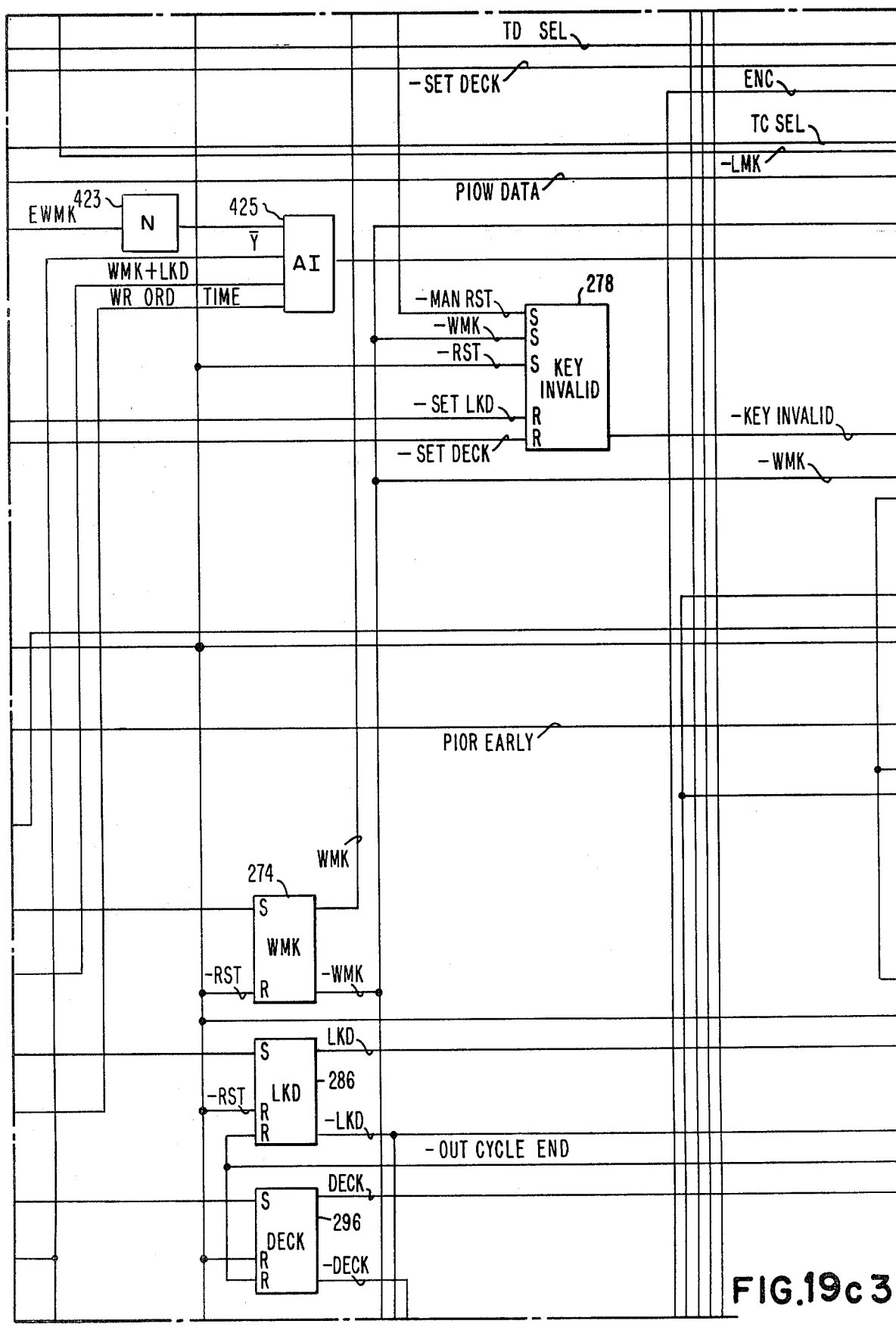
FIG.19c3

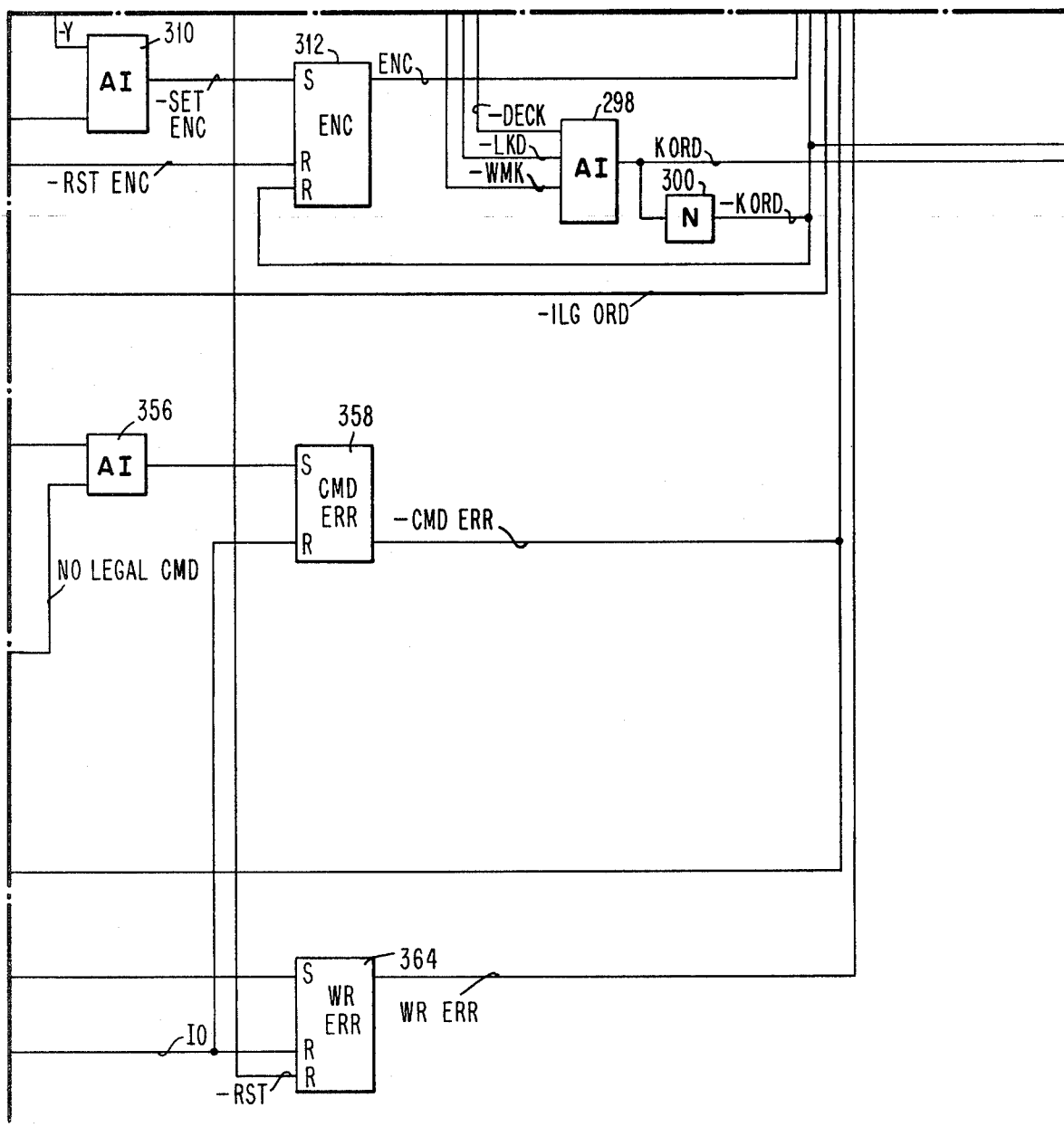
FIG.19 c4

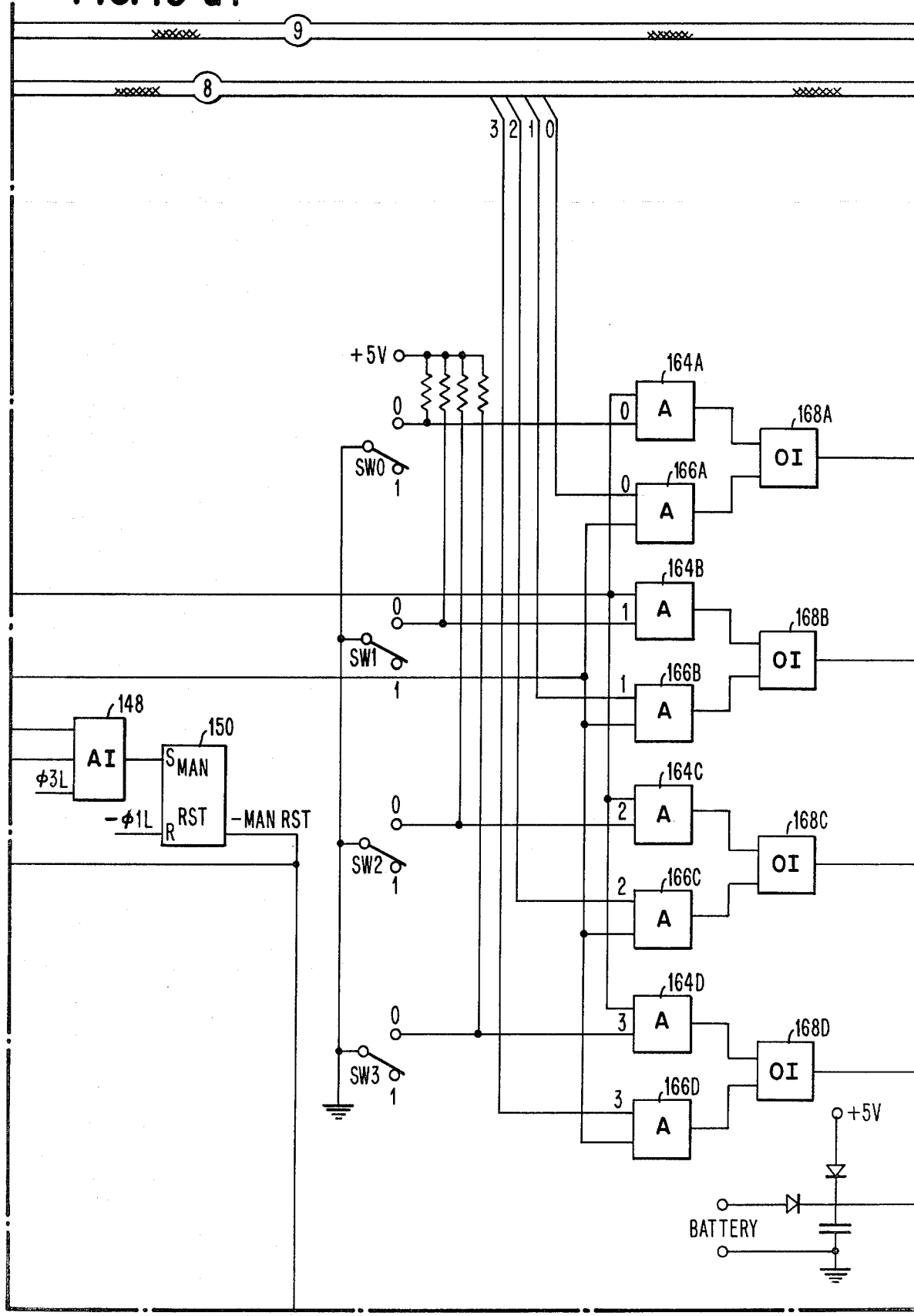
FIG. 19 d1

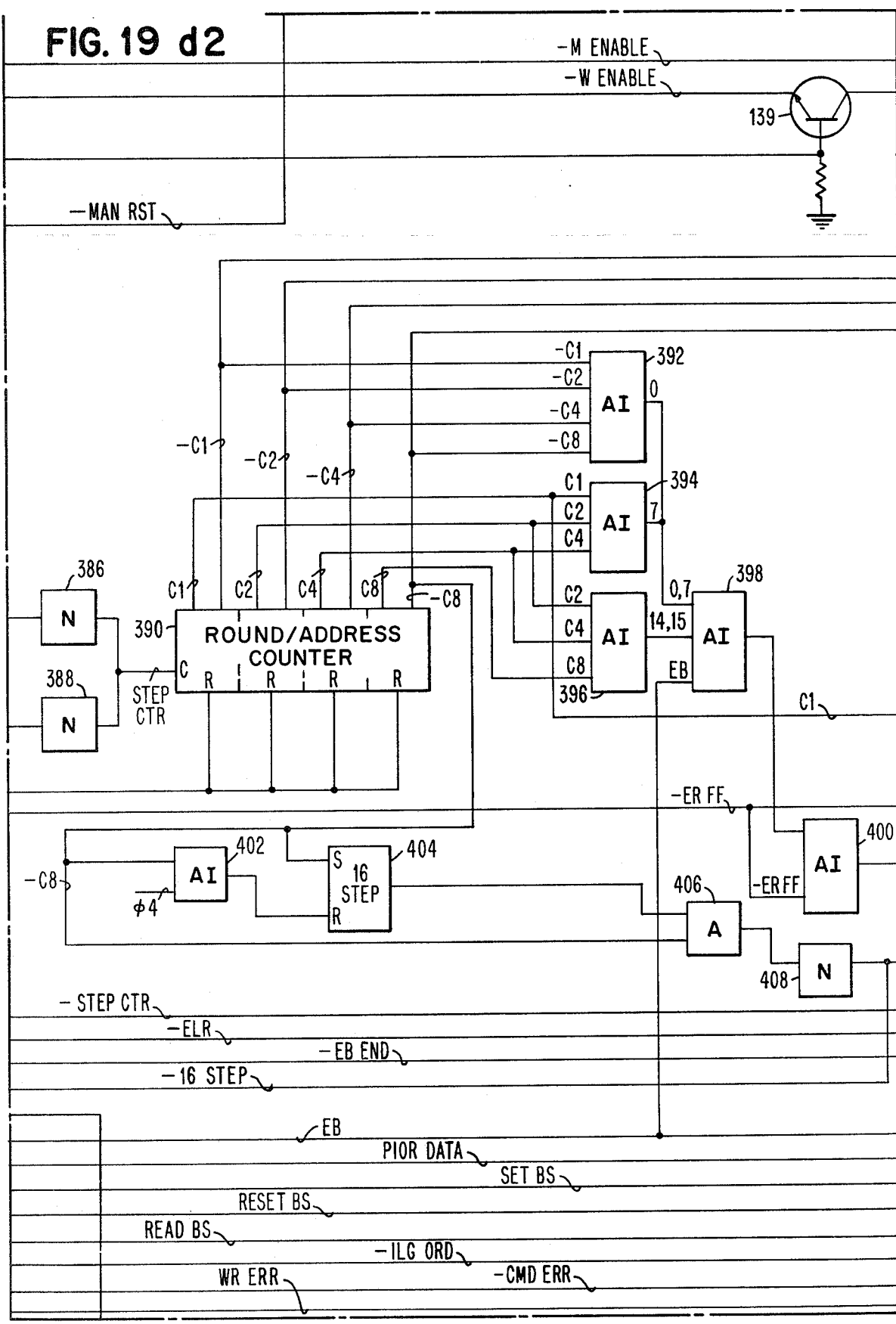
FIG. 19 d2

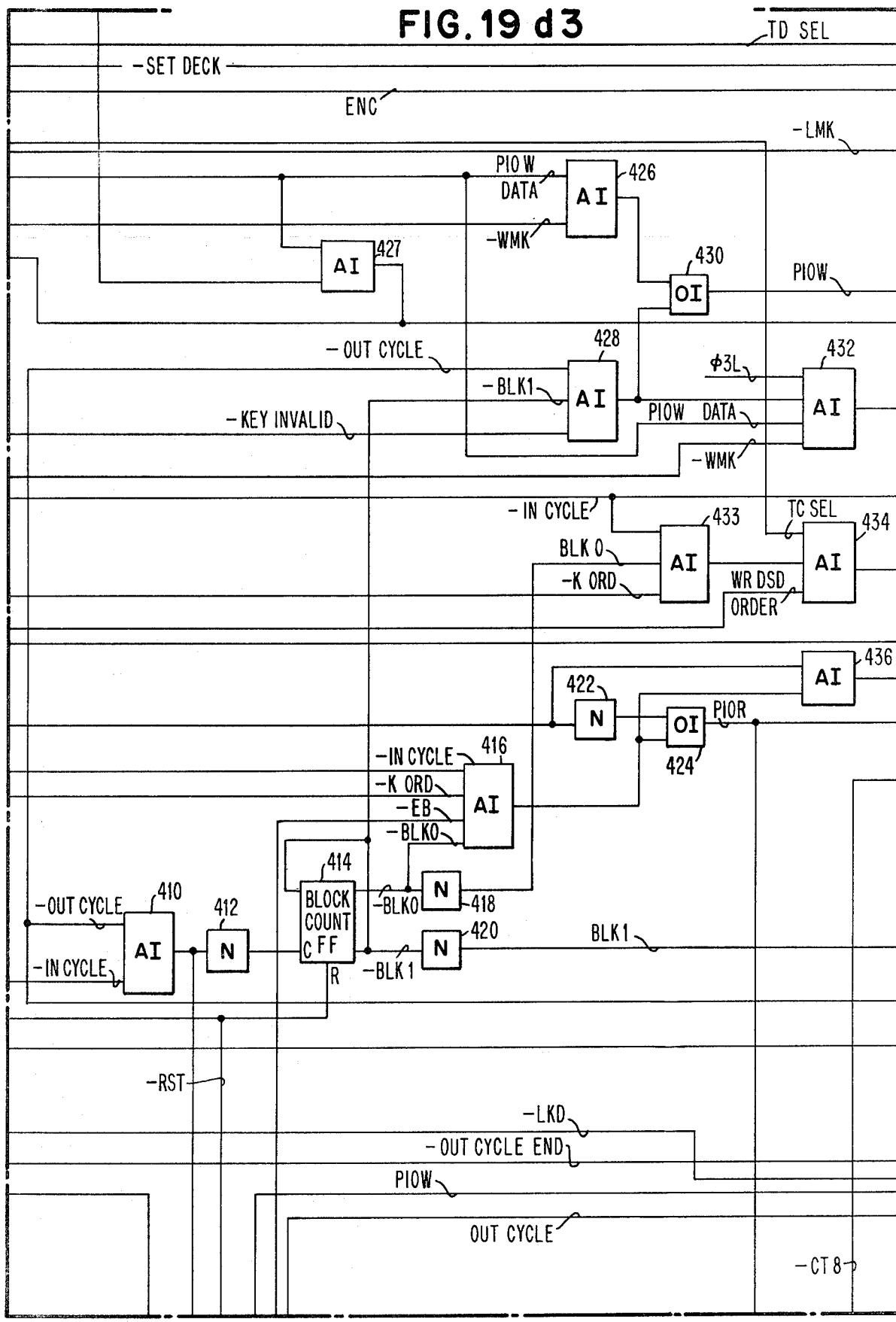
FIG. 19 d3

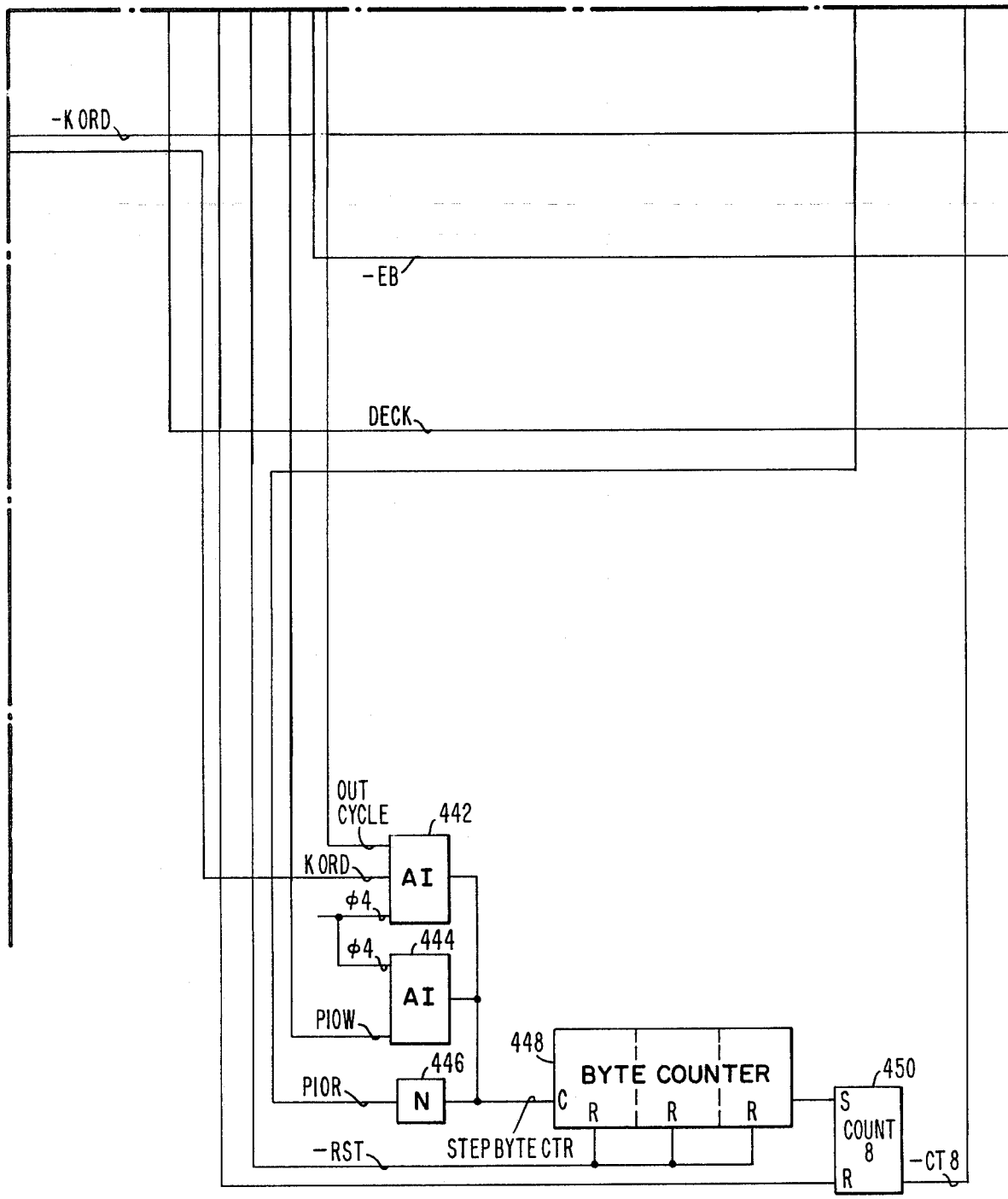
FIG.19 d4

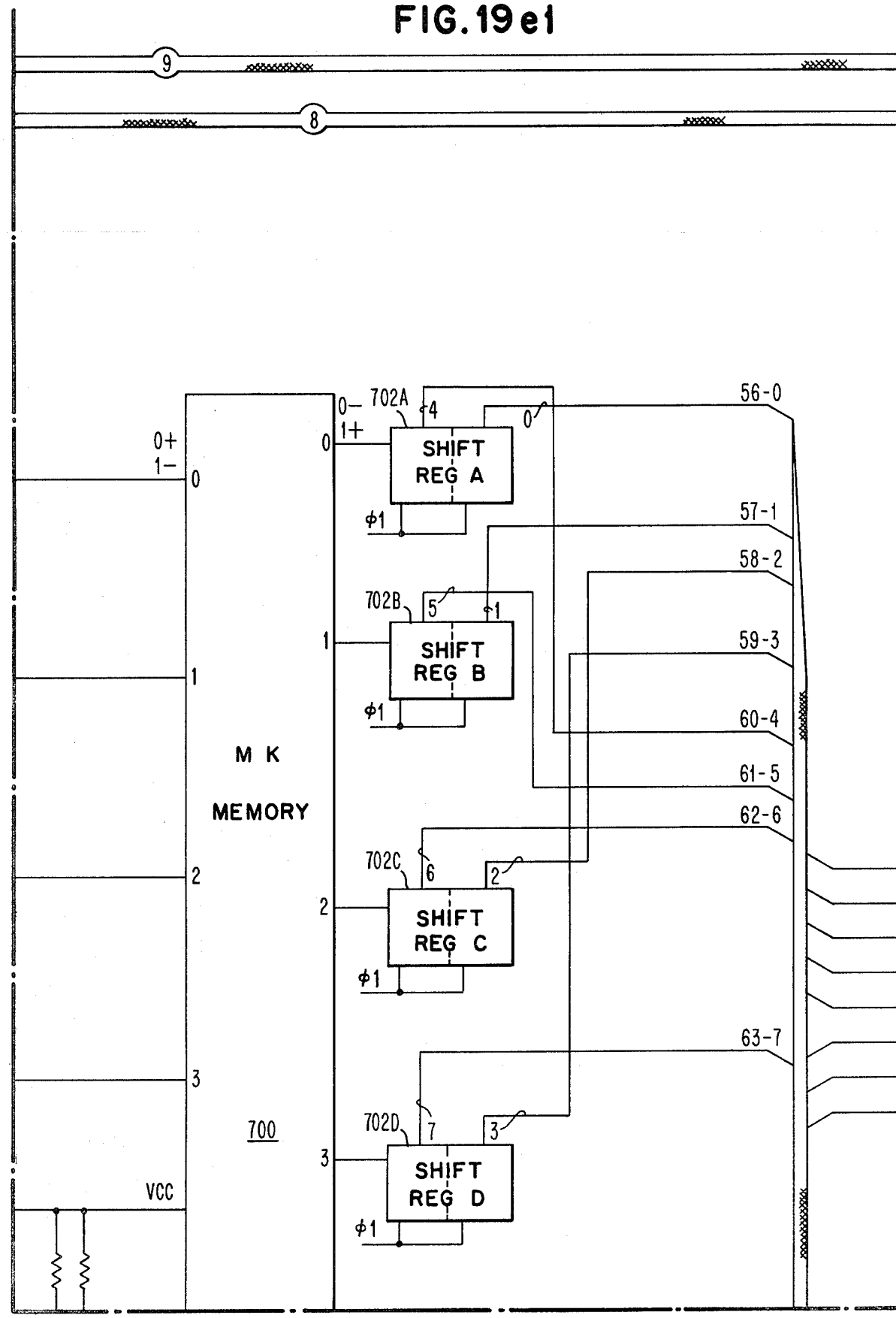
FIG.19e1

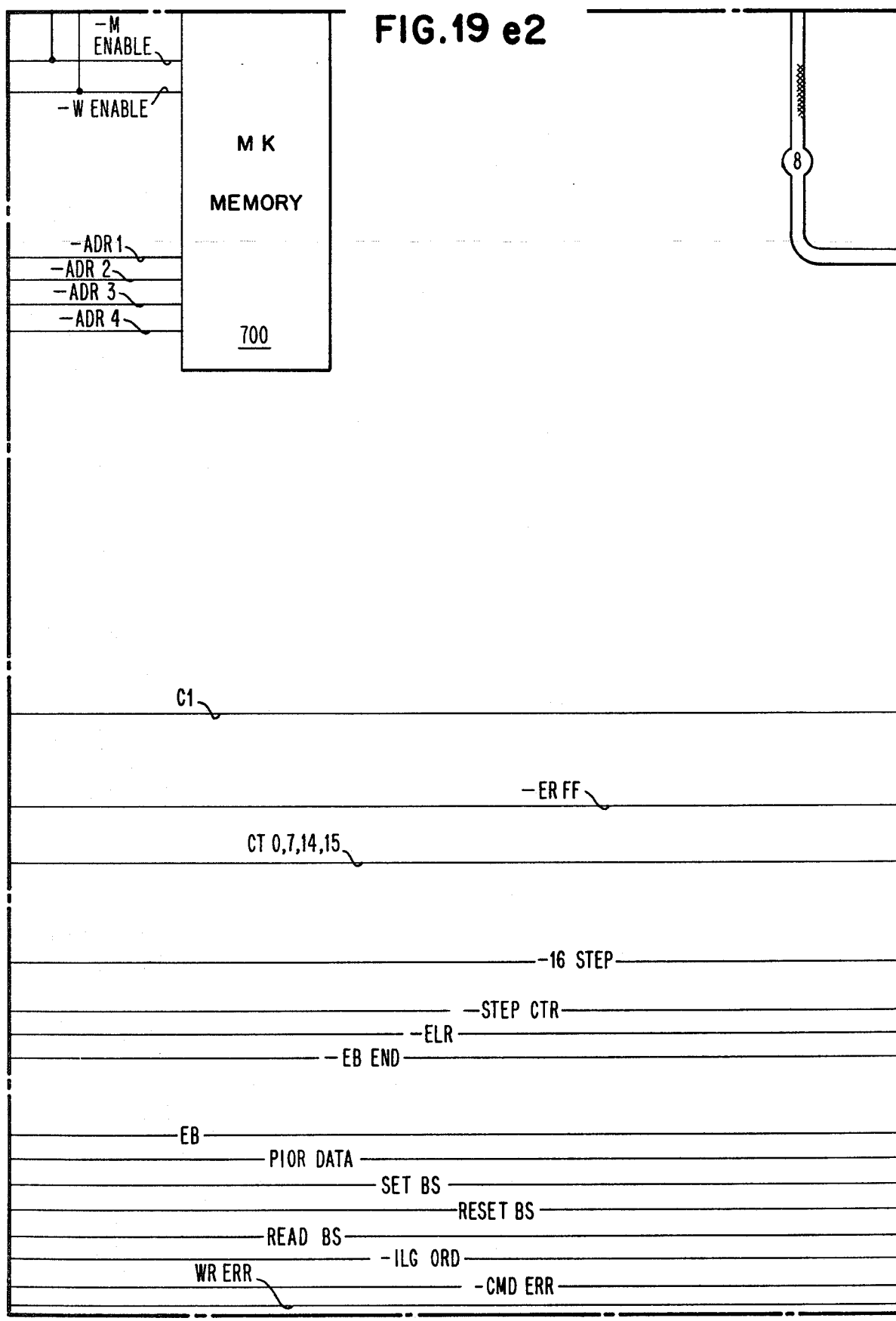

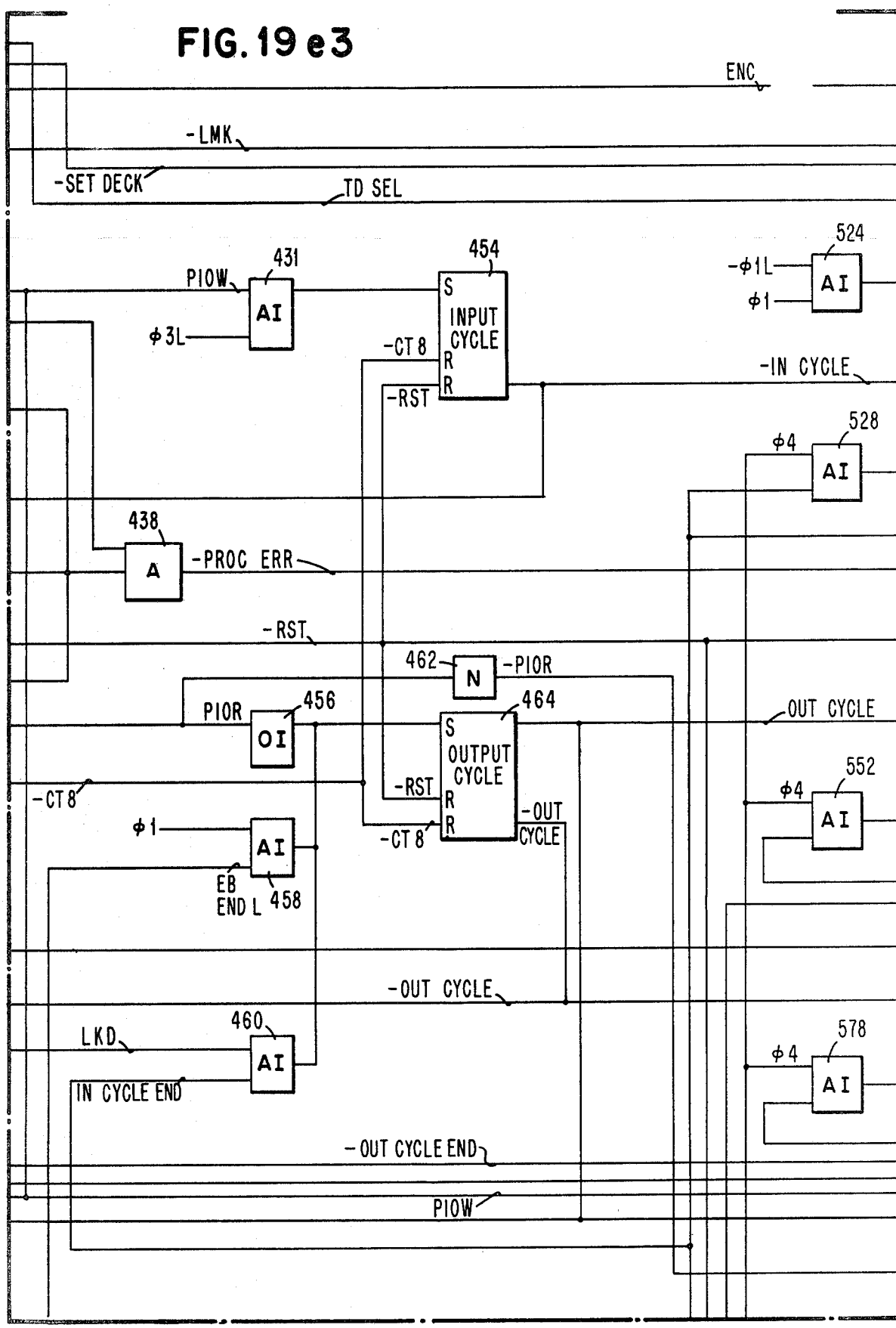

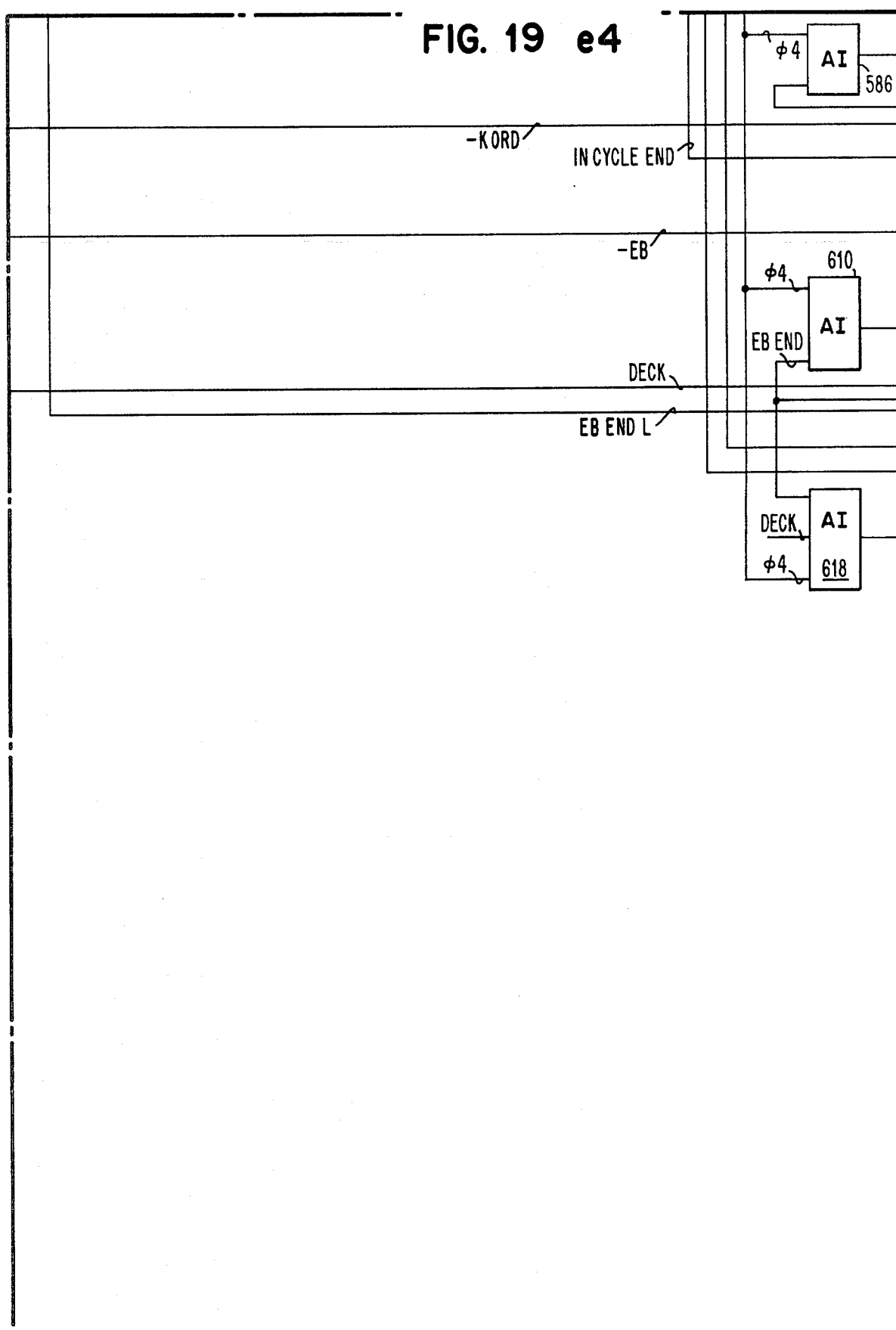

FIG.19 f1
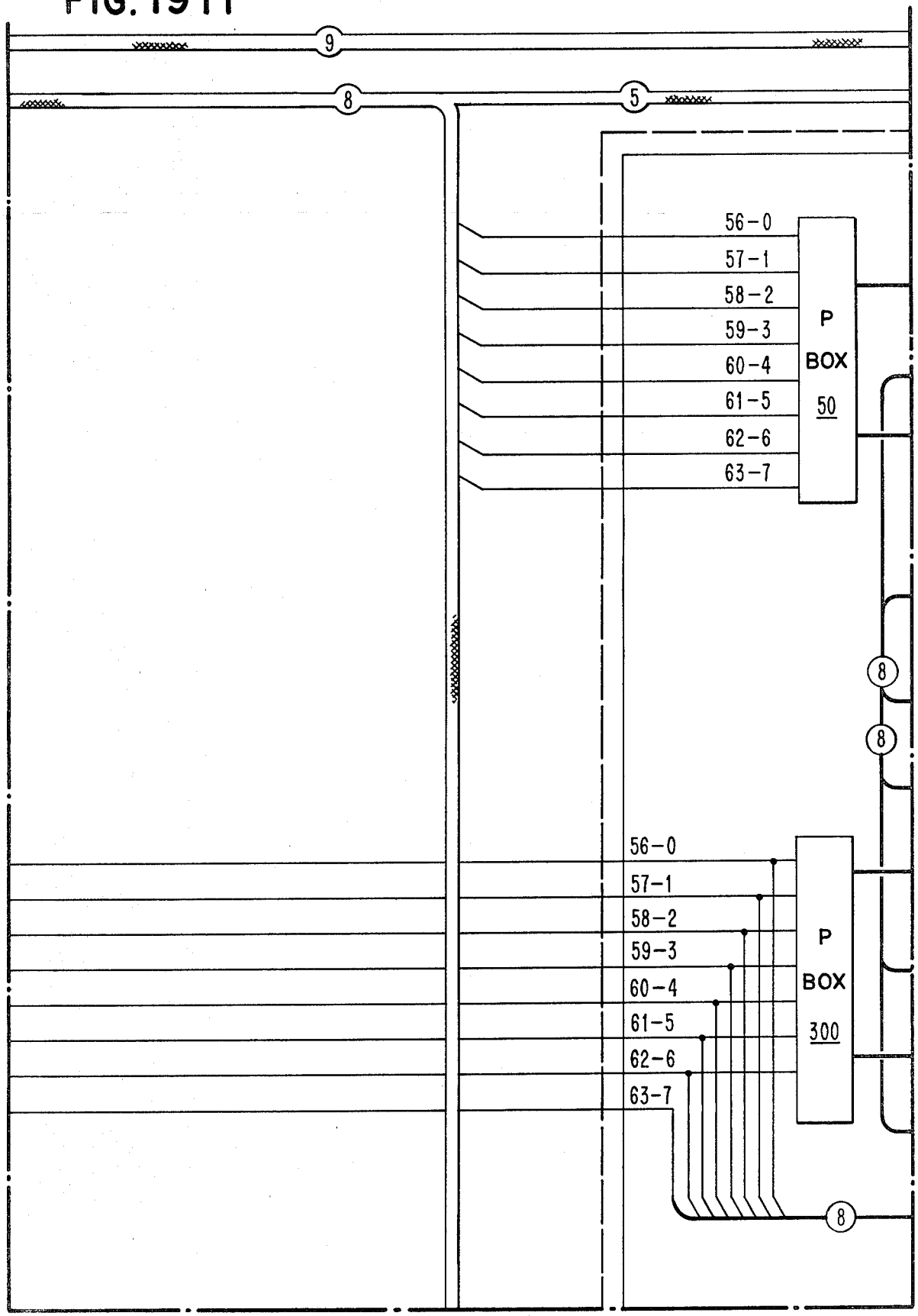

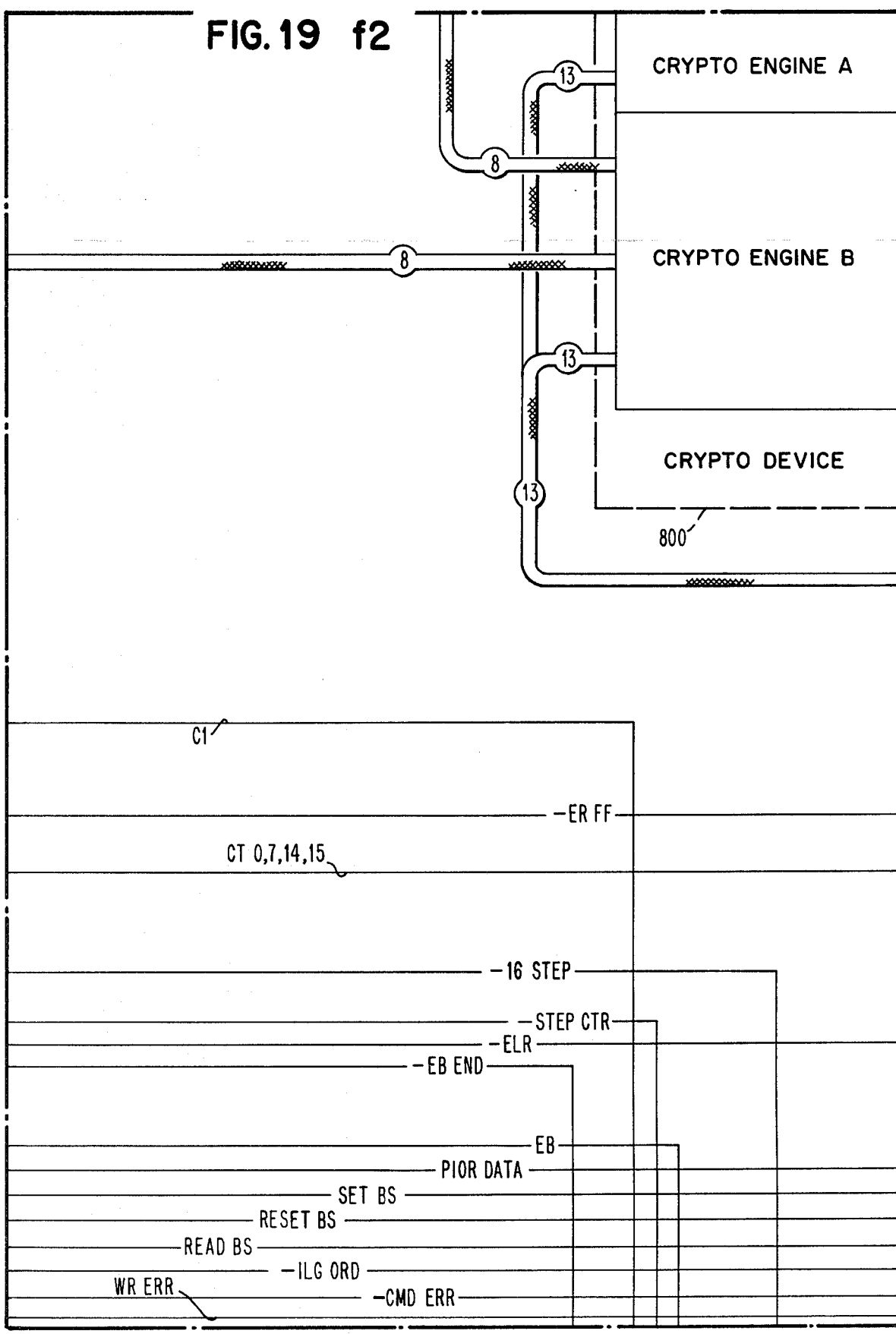

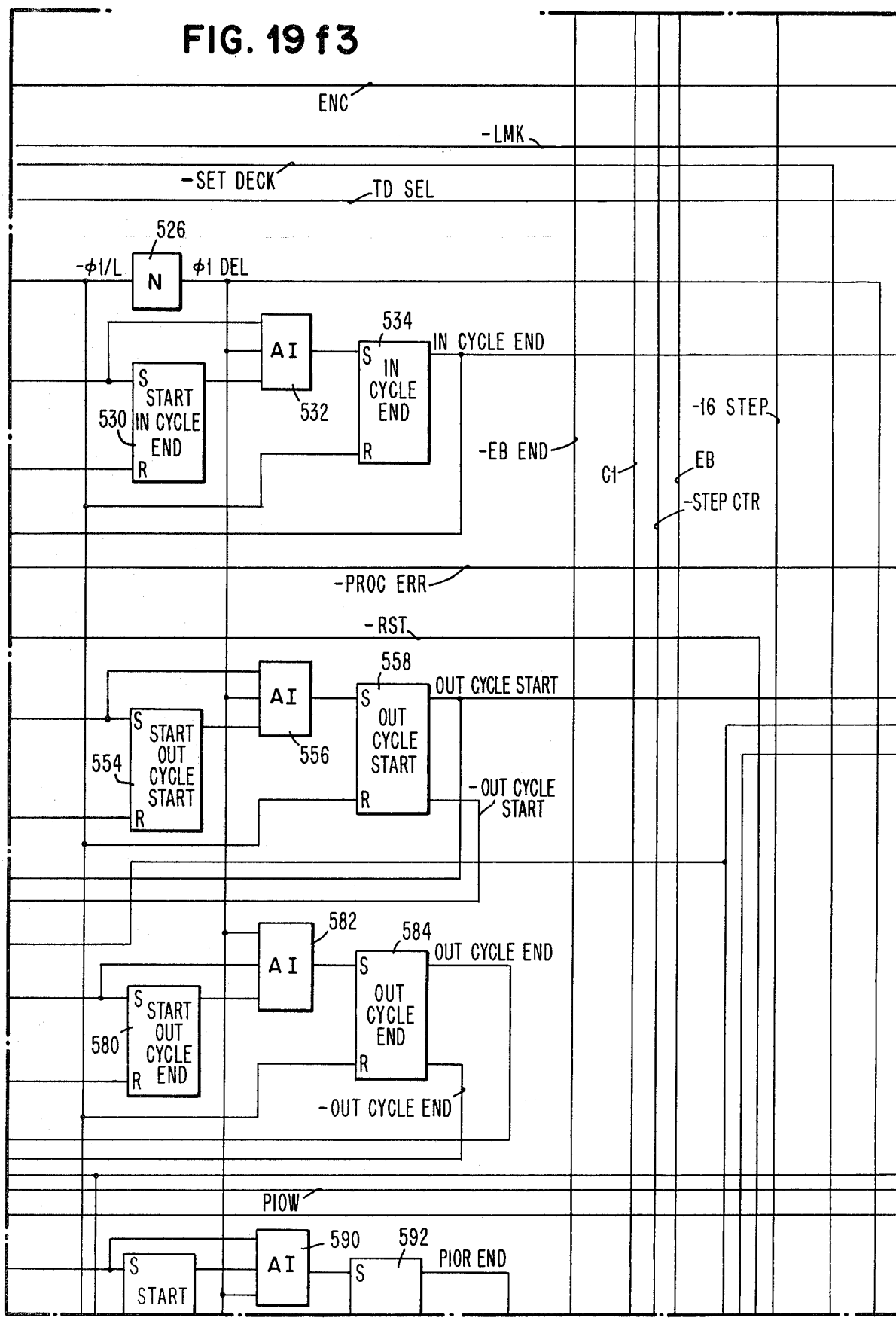

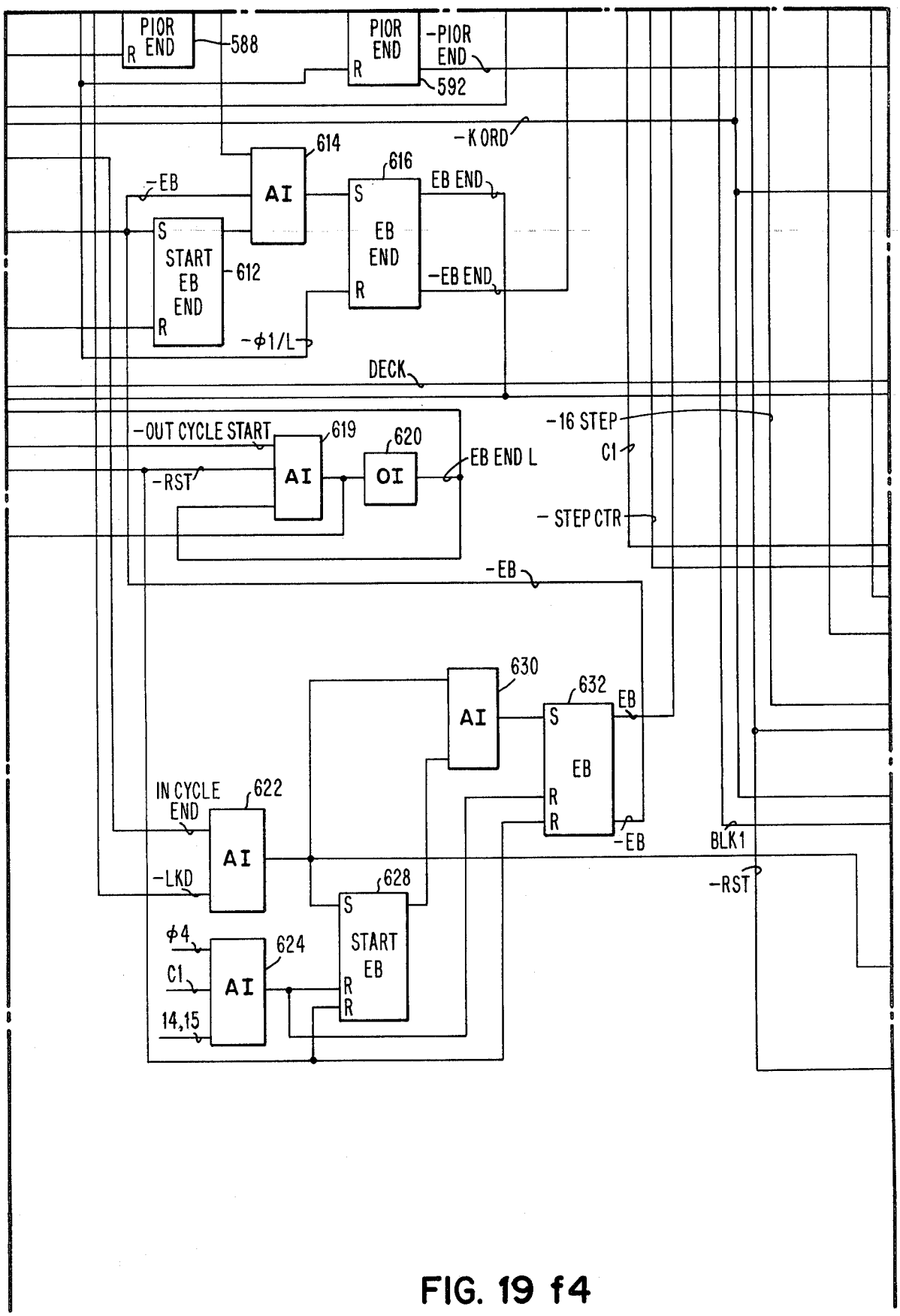
FIG. 19 f4

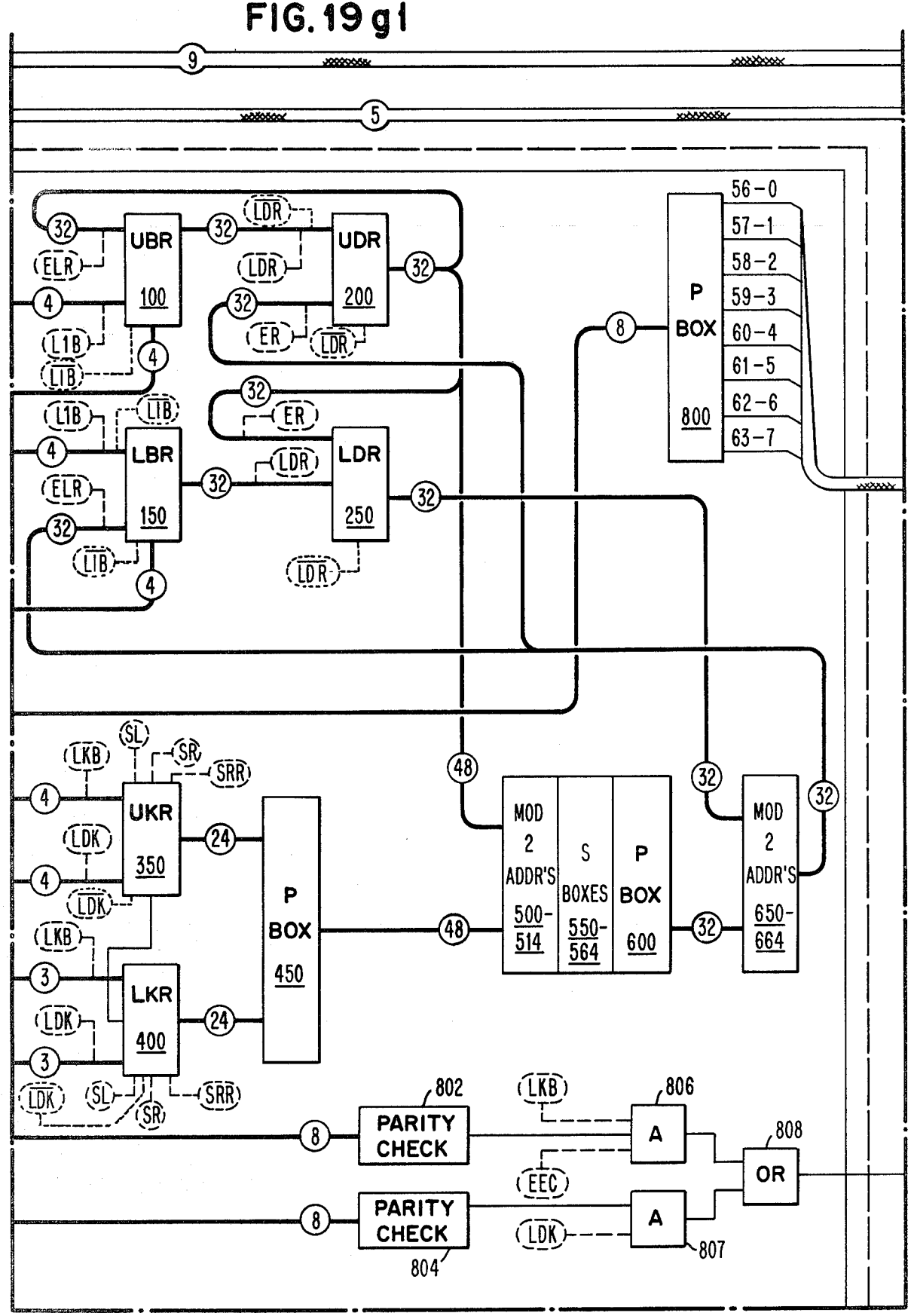
FIG. 19g1

FIG. 19 g2
CRYPTO ENGINE A
CRYPTO ENGINE B
CRYPTO DEVICE
800
⑬
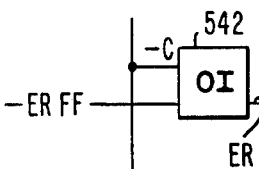
-ER FF-
CT 0,7,14,15
-ELR-
-PIOR DATA-
-SET BS-
-RESET BS-
-READ BS-
-ILG ORD-
WR ERR
-CMD ERR-

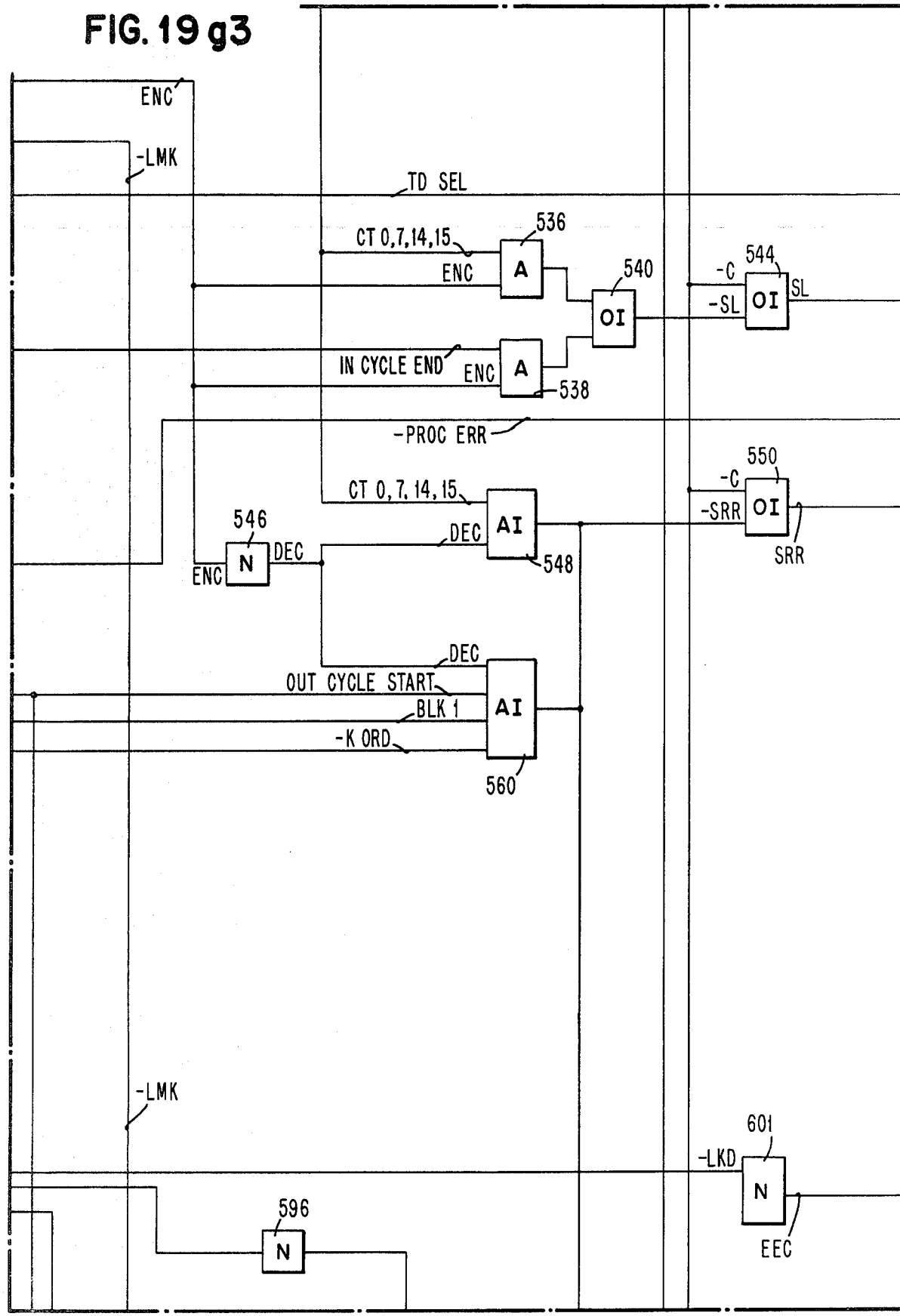
FIG. 19 g3

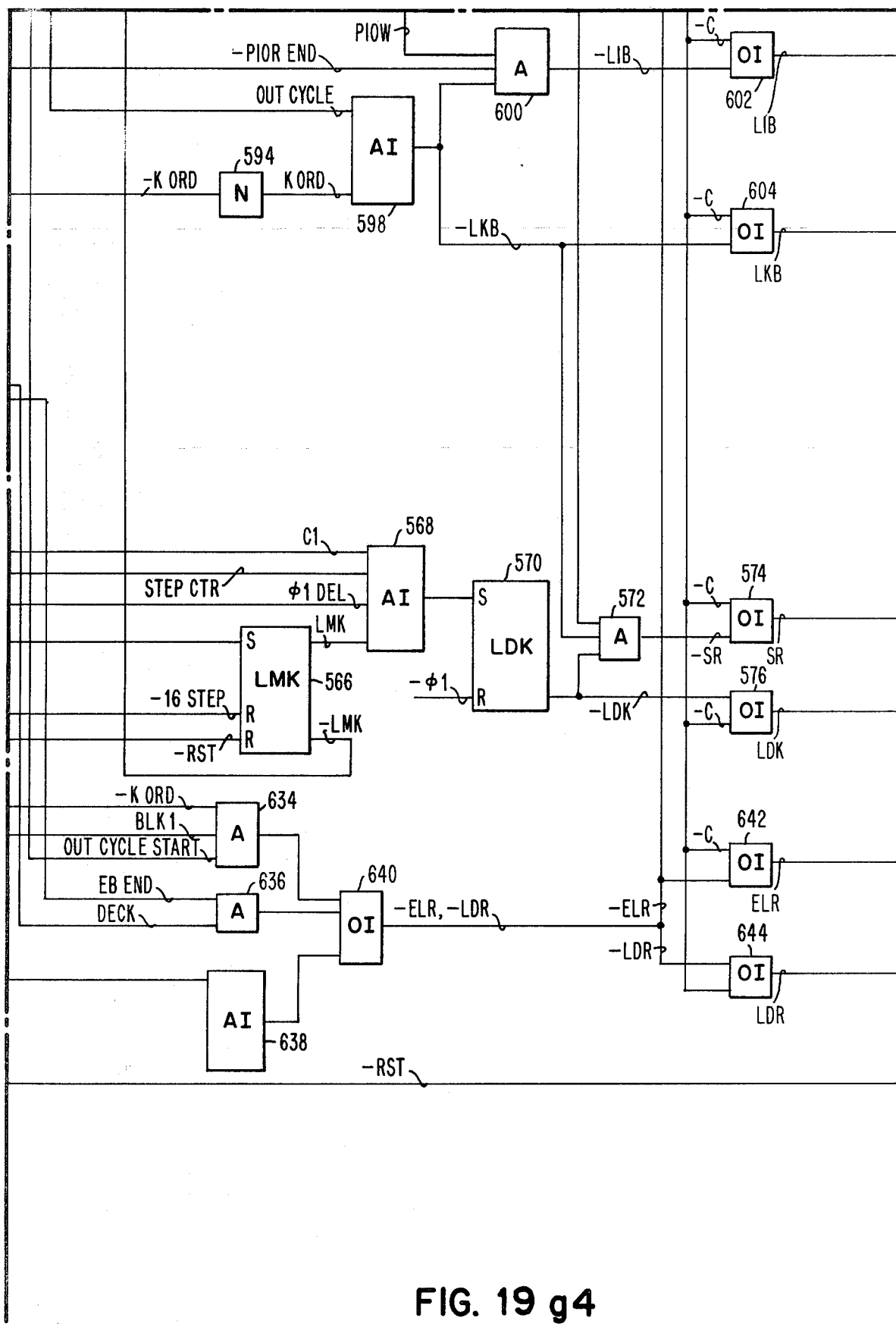
FIG. 19 g4

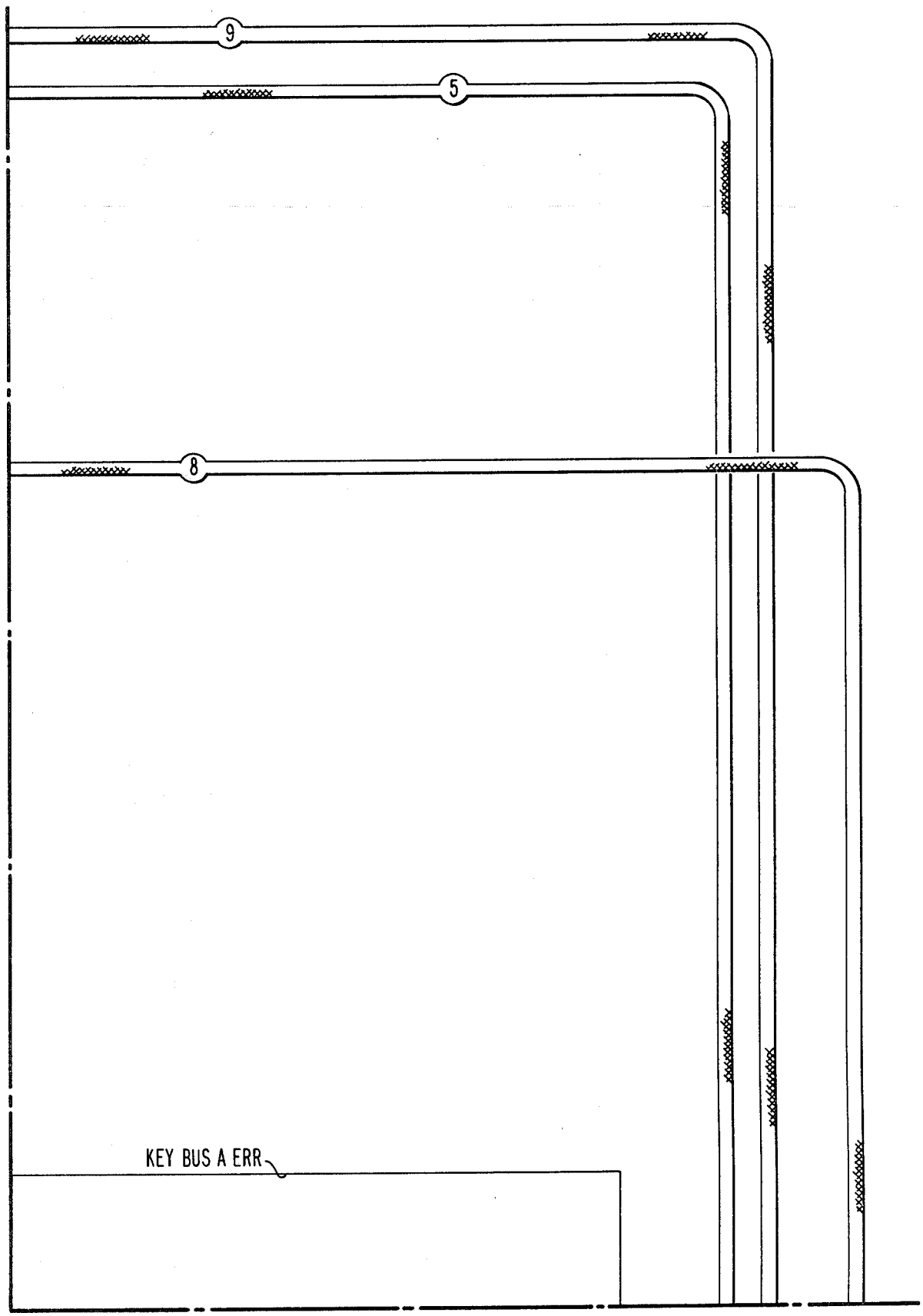
FIG.19h1

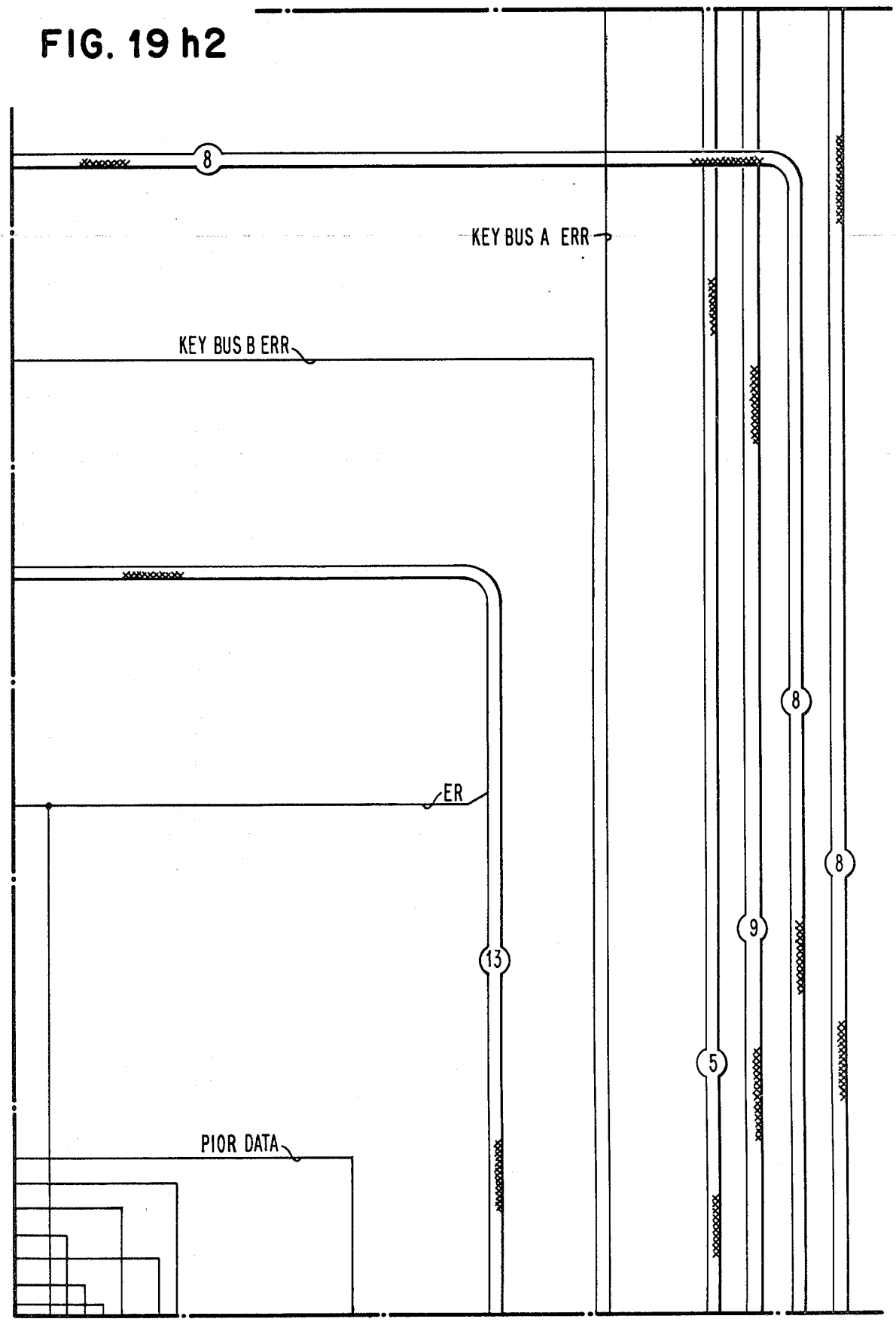
FIG. 19 h2

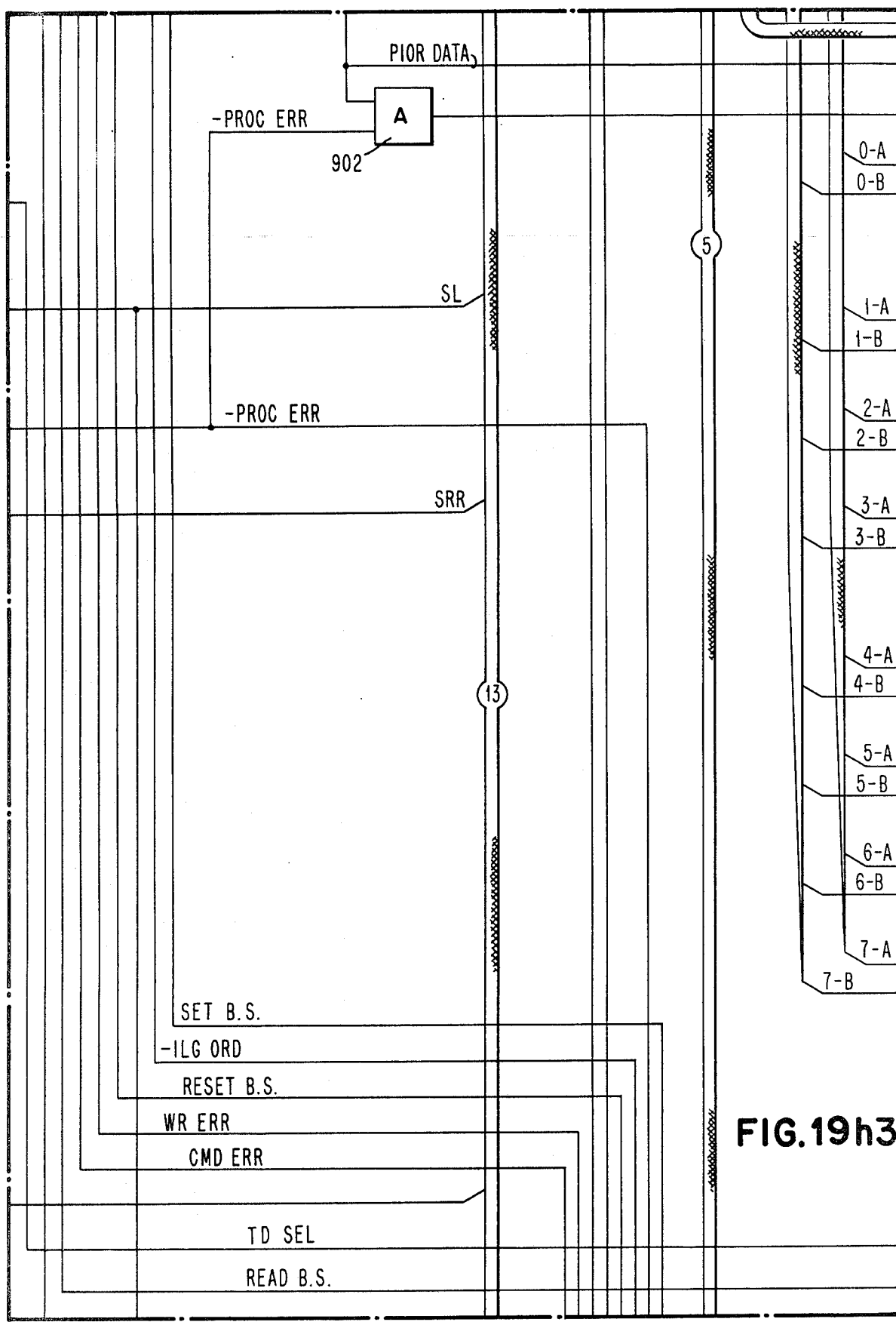
FIG.19h3

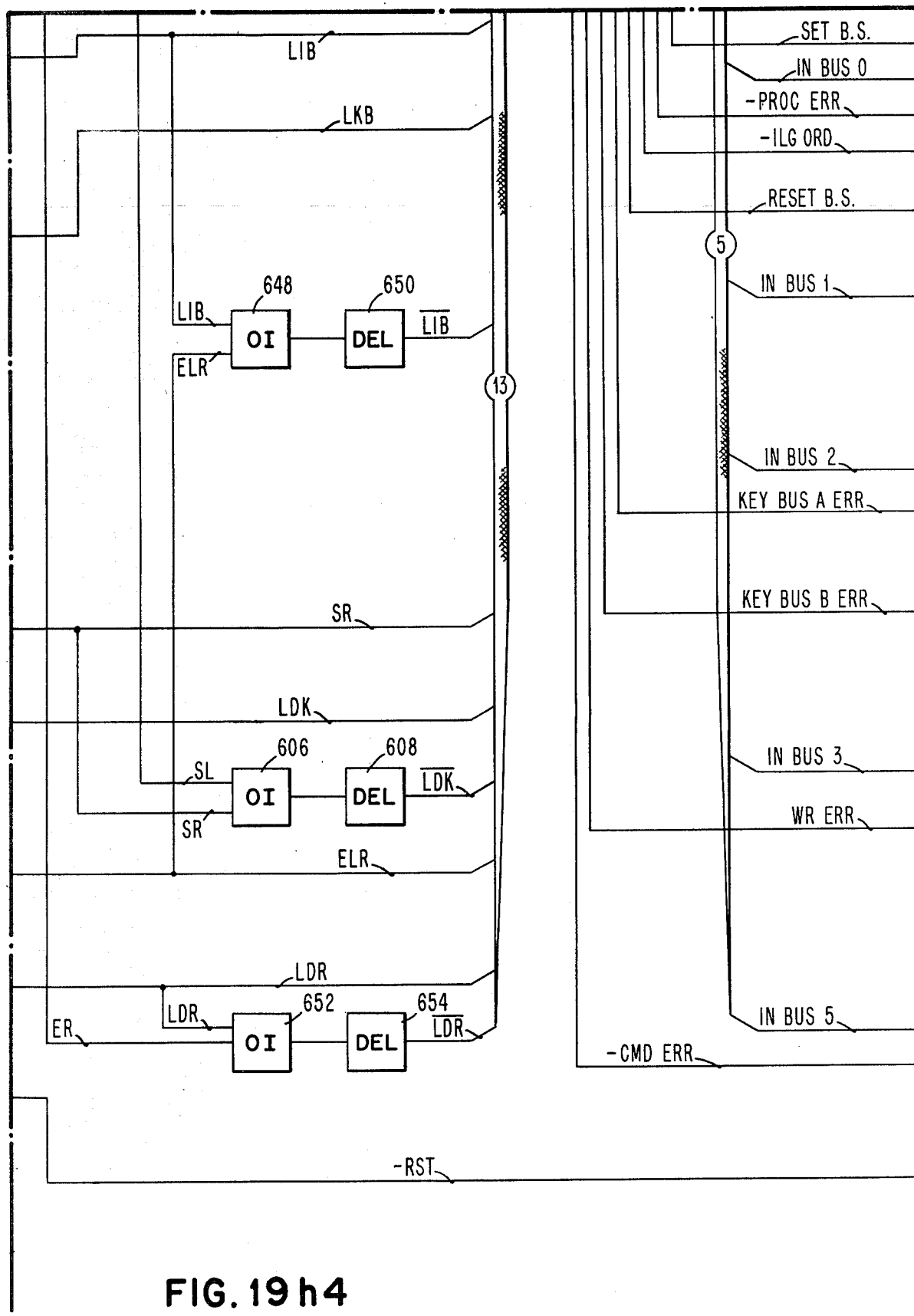
FIG. 19 h4

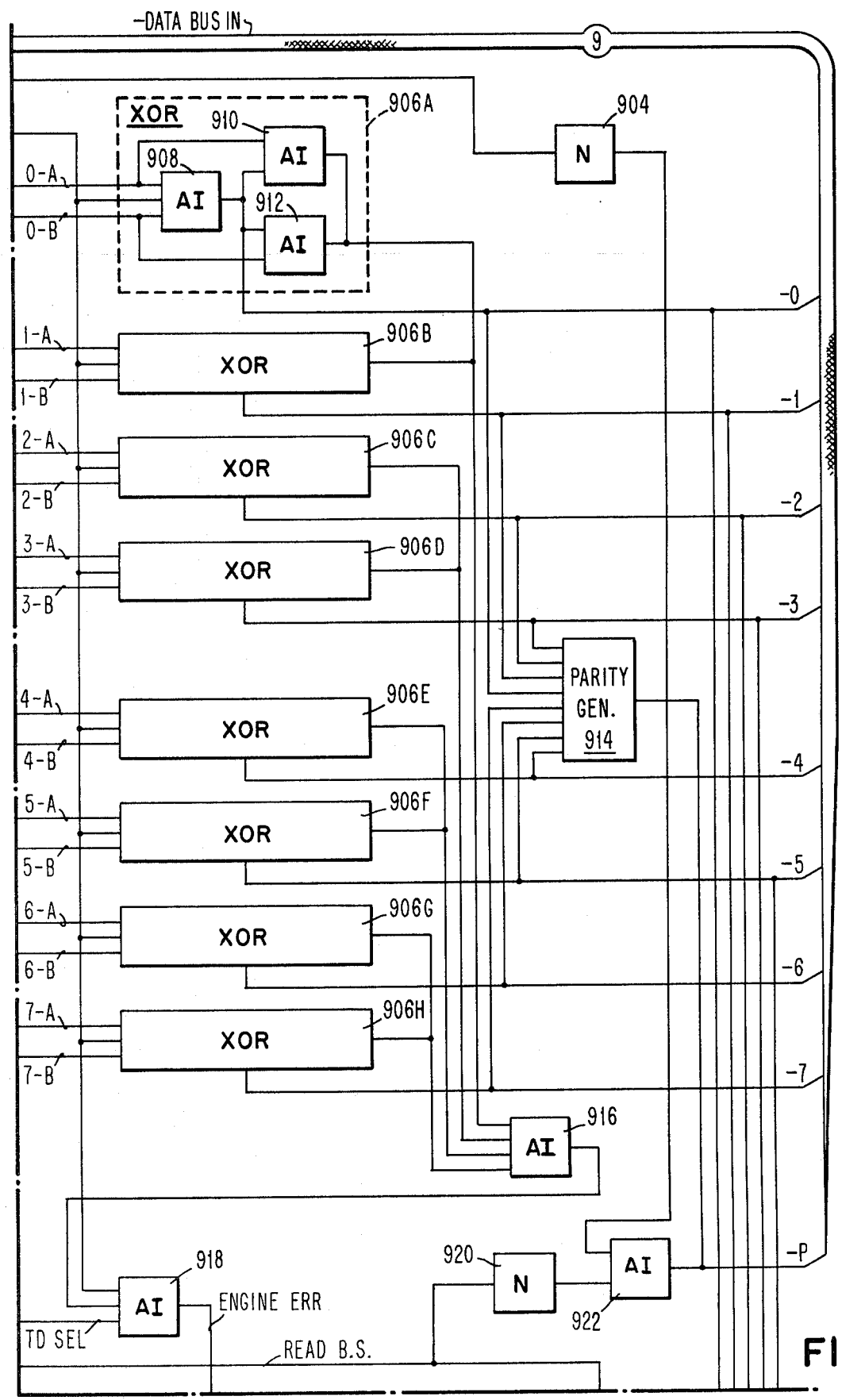
FIG.19i1

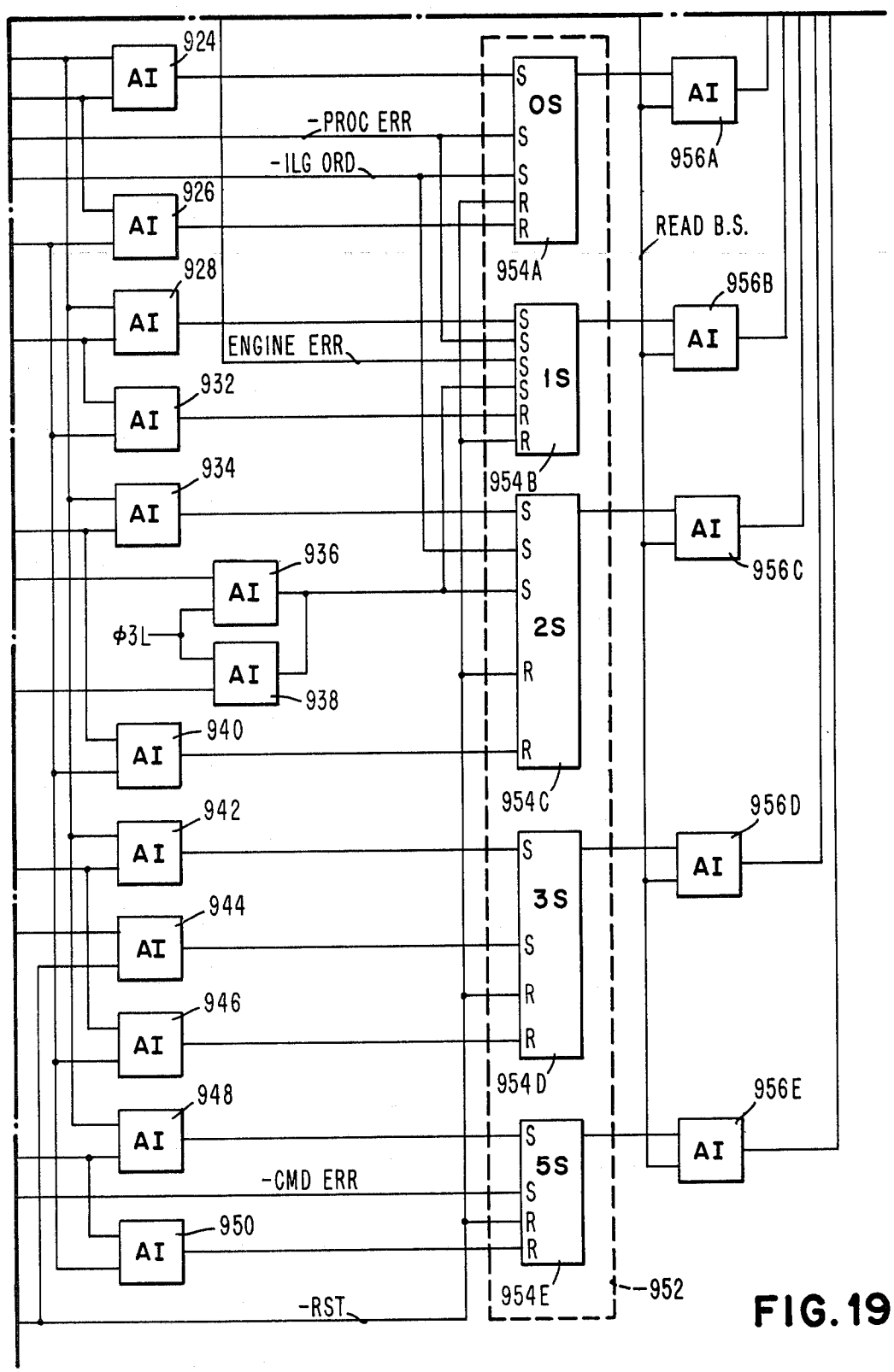
FIG. 19 i2

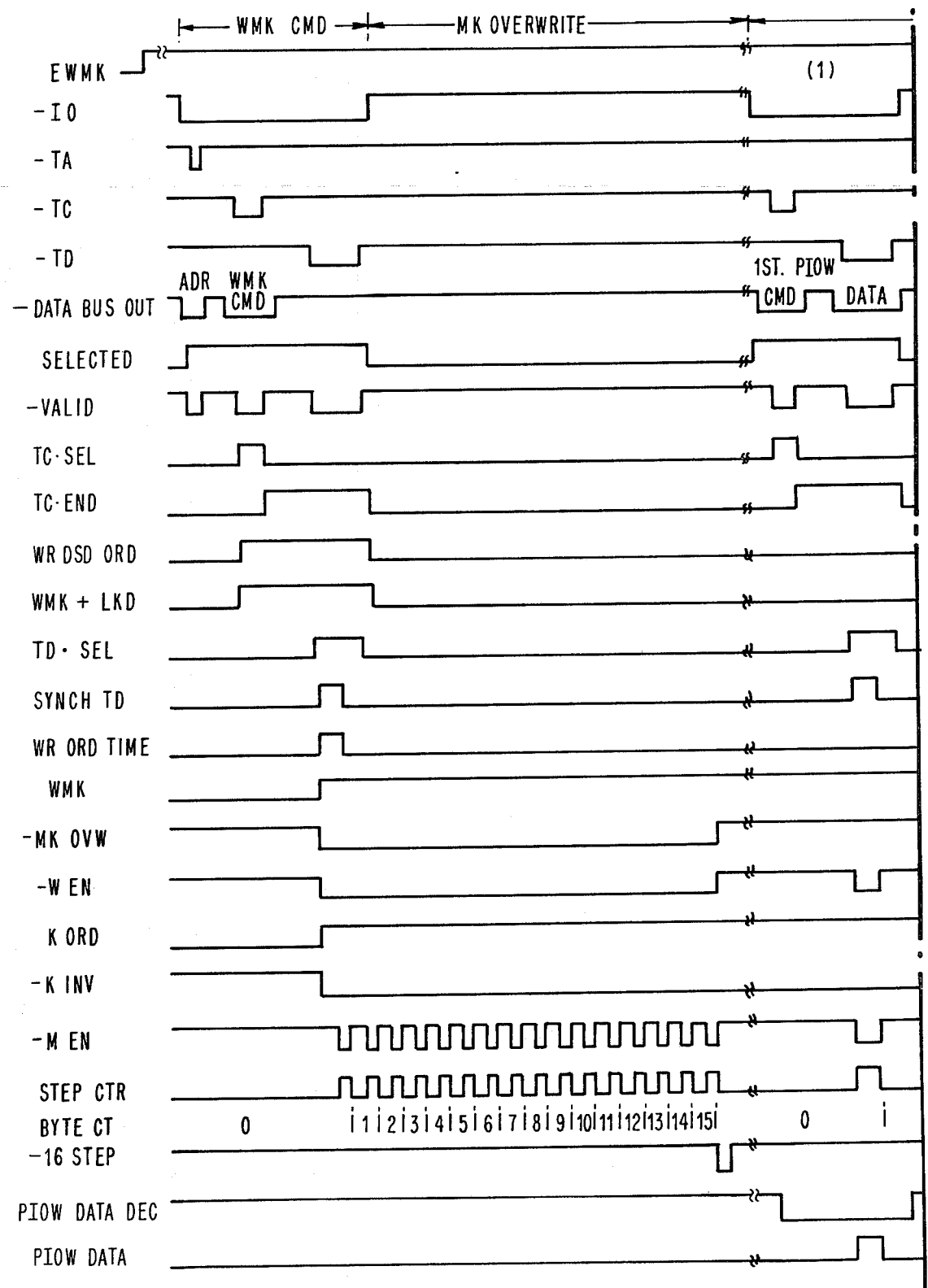
FIG.21A    WMK BY PIOW CMDS

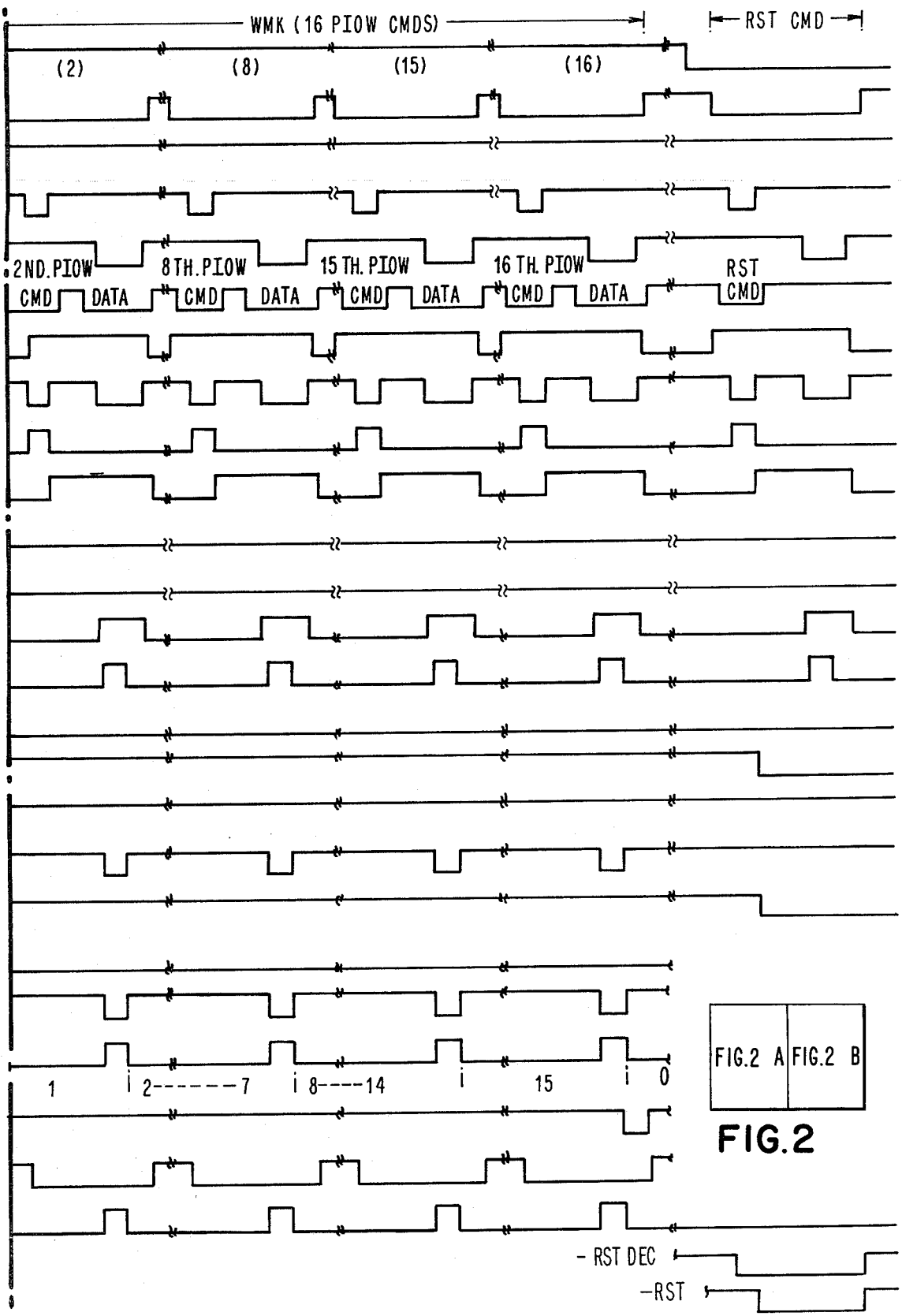
FIG. 21B  WMK BY PIOW CMDS

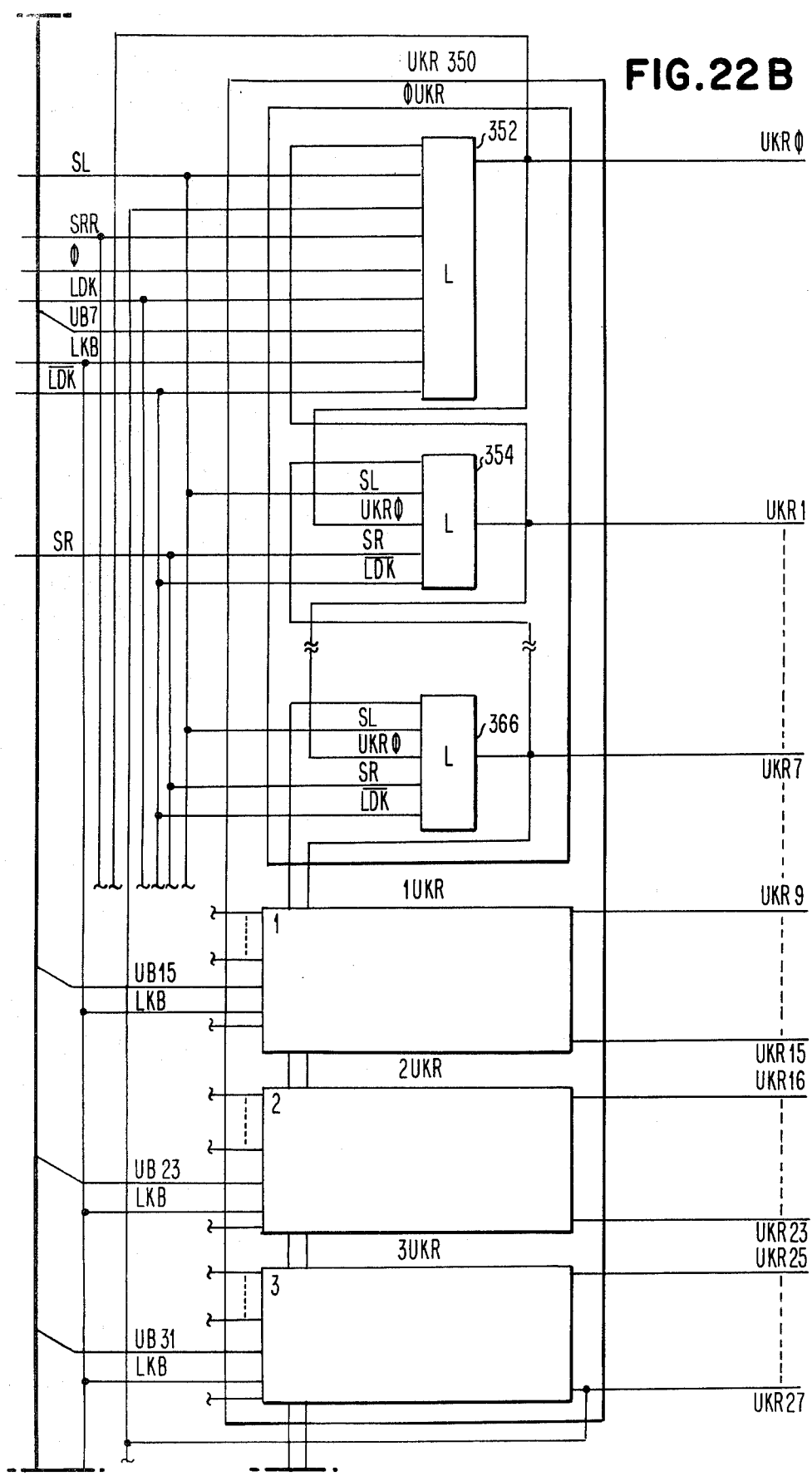

LOAD KEY DIRECT

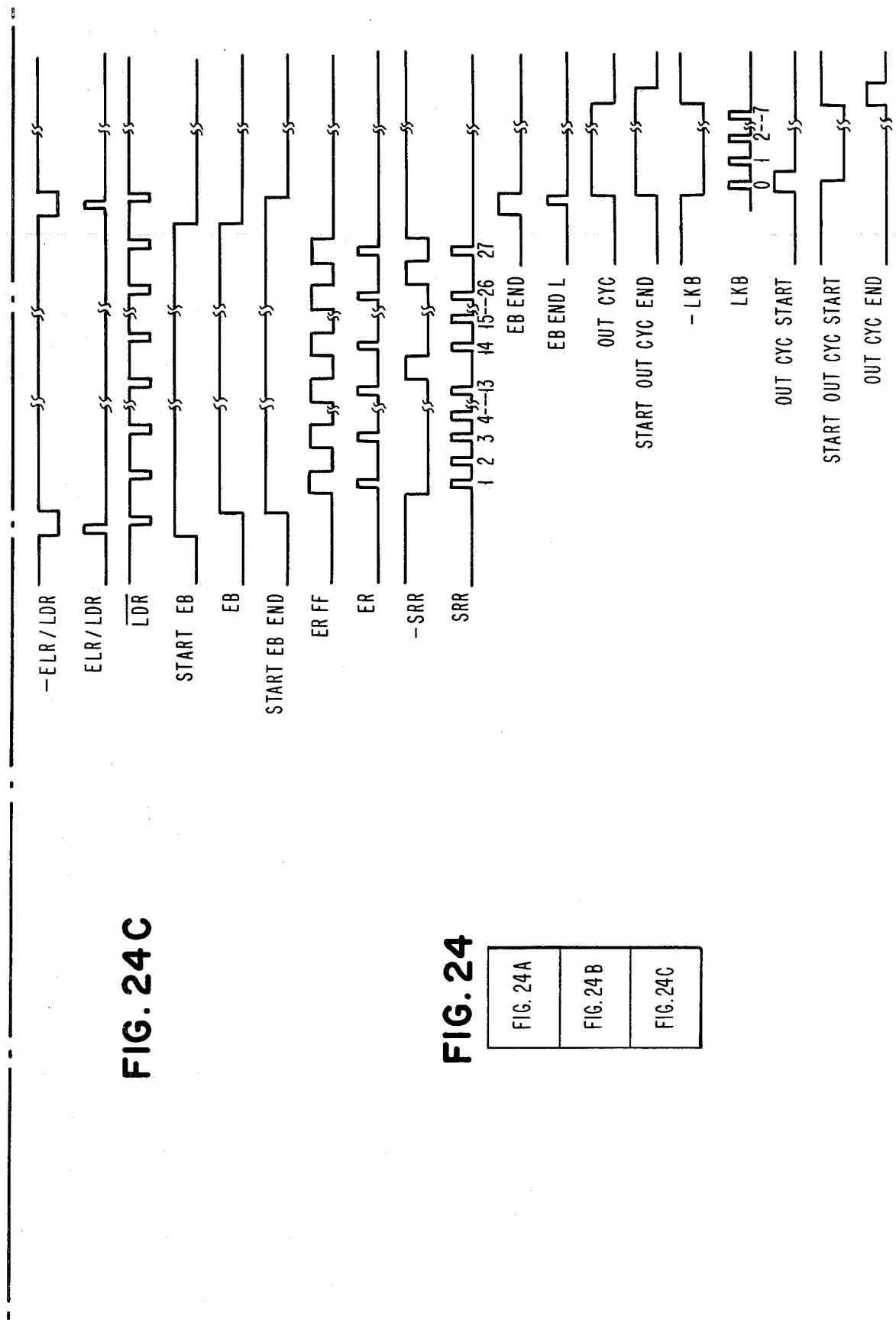

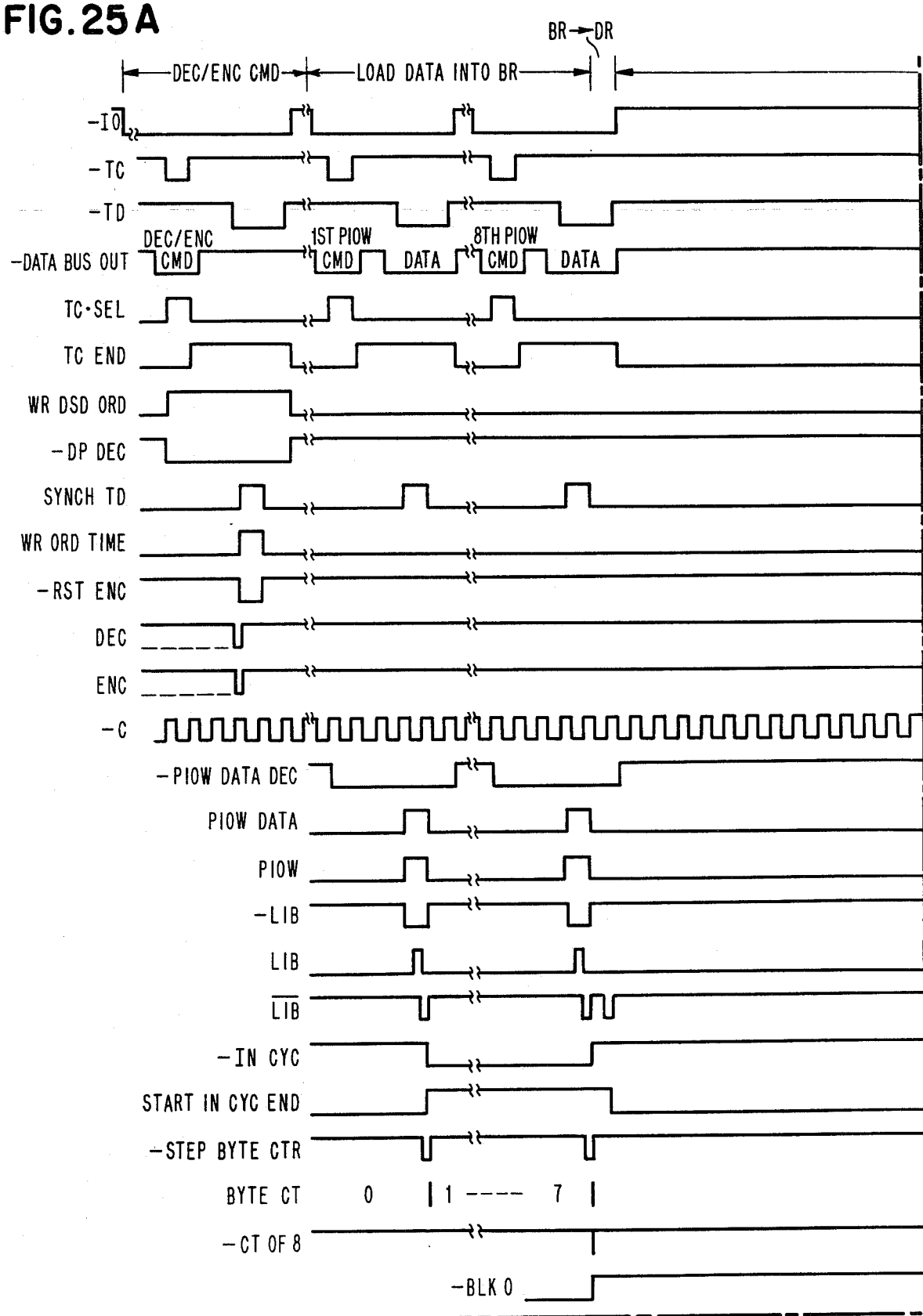
FIG. 25A DECIPHER/ENCIPHER

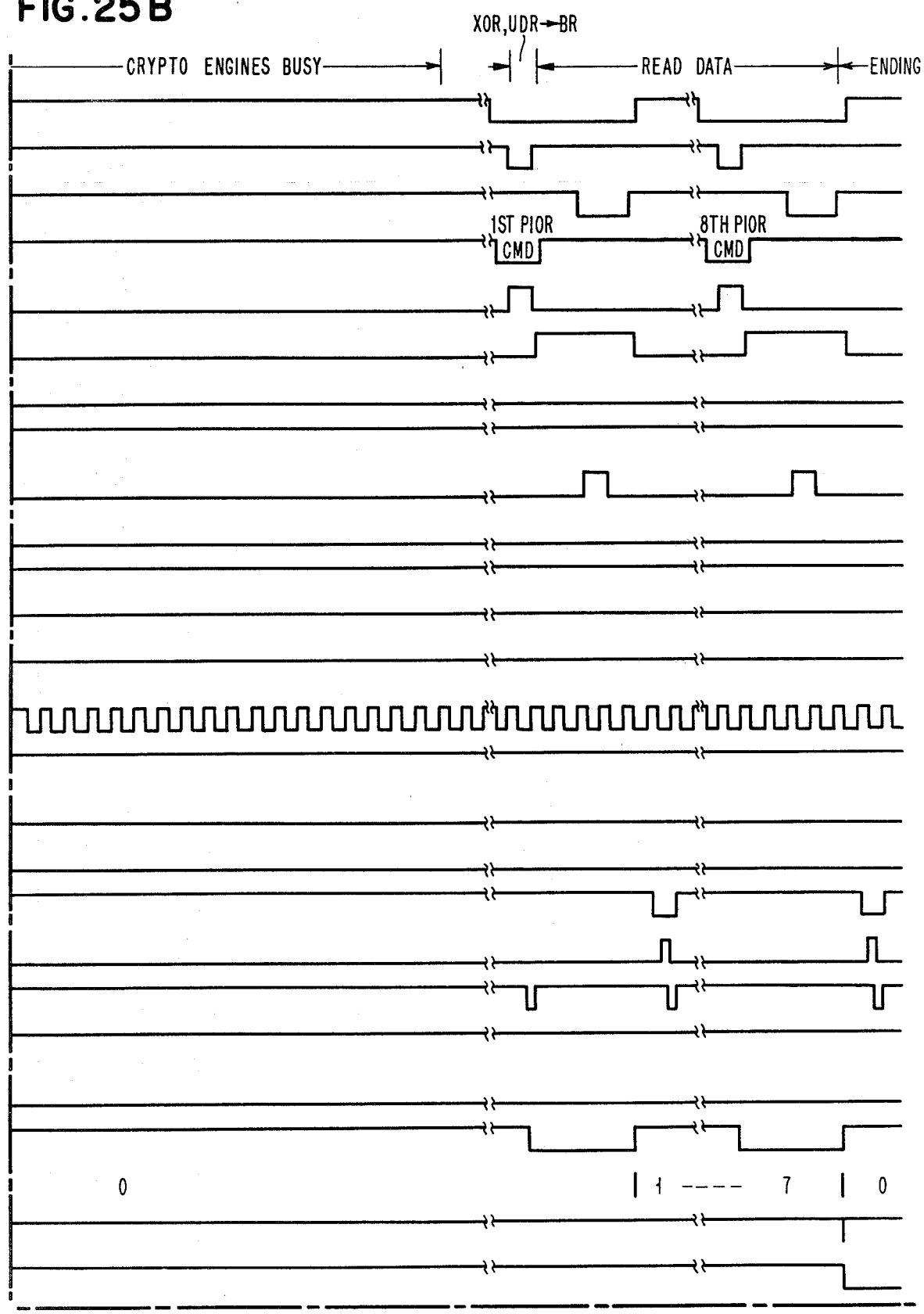
FIG. 25B — DECIPHER / ENCIPHER

CRYPTOGRAPHIC COMMUNICATION AND FILE SECURITY USING TERMINALS

CROSS REFERENCE TO RELATED APPLICATIONS

This application is related to the following patent applications which are concurrently filed herewith and assigned to the same assignee as the present application:

1. "Cryptographic Communication Security for Single Domain Networks," Ser. No. 857,532, filed Dec. 5, 1977, by Ehrsam et al, now U.S. Pat. No. 4,238,853.

2. "Cryptographic File Security for Single Domain Networks," Ser. No. 857,534, filed Dec. 5, 1977, by Ehrsam et al, now U.S. Pat. No. 4,238,854.

3. "Cryptographic Communication Security for Multiple Domain Networks," Ser. No. 857,531, filed Dec. 5, 1977, by Ehrsam et al, now U.S. Pat. No. 4,227,253.

4. "Cryptographic File Security for Multiple Domain Newtorks," Ser. No. 857,535, filed Dec. 5, 1977, by Ehrsam et al, now U.S. Pat. No. 4,203,166

5. "Cryptographic Verification of Operational Keys Used in Communication Networks," Ser. No. 857,546, filed Dec. 5, 1977, by Lennon et al, now U.S. Pat. No. 4,193,131.

BACKGROUND OF THE INVENTION

This invention relates to cryptographic communication and file security techniques using terminals and, more particularly, to a terminal having a data security device which performs enciphering and deciphering operations using system or private keys to permit cryptographic communications and file security in a data processing network.

With the increasing number of computer end users, sharing of a common system resources such as files, programs and hardware and the increasing use of distributed systems and telecommunications, larger and more complex computer base information systems are being created. In such systems, an increasing amount of sensitive data may be transmitted across unsecure communication lines or be stored on portable media such as magnetic tapes or disks for prolonged periods of time. Because of the insecurity of communication lines, the portability of storage media and the long periods of time before data files may be recovered, there is an increasing concern over the interception or alteration of sensitive data which must pass outside a controlled or protected environment or which may become accessible if maintained for too long a period of time. Cryptography has been recognized as an effective data security measure in that it protects the data itself rather than the medium over which it is transmitted or the media on which it is stored.

Cryptography deals with methods by which message data called cleartext or plaintext is encrypted or enciphered into unintelligible data called ciphertext and by which the ciphertext is decrypted or deciphered back into the plaintext. The encipherment/dicipherment transformations are carried out by a cipher function or algorithm controlled in accordance with a cryptographic or cipher key. The cipher key selects one out of many possible relationships between the plaintext and the ciphertext. Various algorithms have been developed in the prior art for improving data security in data processing systems. Examples of such algorithms are described in U.S. Pat. No. 3,796,830 issued Mar. 12, 1974 and U.S. Pat. No. 3,798,359 issued Mar. 19, 1974. Another more recent algorithm providing data security in data processing systems is described in U.S. Pat. No. 3,958,081 issued May 18, 1976. This algorithm was adopted by the National Bureau of Standards as a data encryption standard (DES) algorithm and is described in detail in the Federal Information Processing Standards publication, Jan. 15, 1977, FIPS PUB 46.

A data communication network may include a complex of communication terminals connected via communication lines to a single host system and its associated resources such as the host programs and locally attached terminals and data files. Within the data communication network, the domain of the host system is considered to be the set of resources known to and managed by the host system. Various single domain data communication networks have been developed in the prior art using cryptographic techniques for improving the security of data communication within the network. In such networks, a cryptographic facility is provided at the host system and at various ones of the remote terminals. In order for the host system and a remote terminal to perform a cryptographic communication, both must use the same cryptographic algorithm and a common operational cryptographic key so that the data enciphered by the sending station can be deciphered at the receiving station. In prior art cryptographic communication arrangements, the operational key to be used at the sending station is communicated by mail, telephone or courier to the receiving station so that a common operational key is installed at both stations to permit the cryptographic communications to be performed. Furthermore, the operational key was kept for a relatively long period of time. In order to present a "moving target" to an opponent, other prior art arrangements developed techniques which improved security by changing operational keys dynamically where the frequency of changing keys is done automatically by the system. One such technique is provided in the IBM 3600 Finance Communication System utilizing the IBM 3614 consumer transaction facility as remote terminals and is exemplified by U.S. Pat. No. 3,956,615 issued May 11, 1976. In that system, an enciphered operational or data encrypting key is transmitted over the communication line from the host system to the remote communication terminal. The enciphered data encrypting key is deciphered and then used as the current data encrypting key for all data transmissions. However, with this type of arrangement, since the current data encrypting key must be readily available for the data transmissions it is stored in the clear at the remote terminal thereby making the system somewhat unsecure by the clear keys being susceptible to possible accessibility by unauthorized personnel. Additionally, with this type of system, when the current data encrypting key is to be changed, a new data encrypting key enciphered under the old data encrypting key is transmitted to the remote terminal where it is deciphered and then used as the new current data encrypting key. However, with this type of arrangement, since each new current data encrypting key is a function of the preceeding current data encrypting key, the system becomes unsecure if one current data encrypting key becomes accessible as it will permit the current ciphertext to be deciphered and will permit all succeeding data encrypting keys to be obtained thereby allowing all succeeding ciphertext to be diciphered.

As the size of data communication networks increases, other host systems may be brought into the network to provide multiple domain networks with each host system having knowledge of and managing its associated resources which make up a portion or domain of the network. By providing the proper cross domain data link between the domains of the network, two or more domains may be interconnected to provide a networking facility. Accordingly, as the size of the network increases and the number of communication lines interconnecting the network increases and the number of data files sharing sensitive data increases, there is an increasing need to provide communication security for data transmitted over such communication lines and to provide file security for data stored in data files.

Accordingly, it is an object of the invention to provide a terminal capable of maintaining the security of data transmissions in a data communication network.

Another object of the invention is to provide a terminal having a data security device for enciphering/deciphering message blocks of data under control or a protected terminal cryptographic key.

A further object of the invention is to provide a terminal cryptographic facility in a data communication network without having to provide terminal cryptographic keys in the clear outside of the facility.

Still another object of the invention is to establish communication sessions between a terminal cryptographic facility and a host system in a data communication network in a secure manner.

Still a further object of the invention is to establish secure cryptographic communication sessions between a host and a terminal in a data communication network by providing the terminal with a data encrypting key enciphered under a secondary communication key for each new communication session.

Still another object of the invention is to provide a terminal cryptographic facility which is maintained in a logically and physically protected area of the terminal.

Still a further object of the invention is to provide a terminal data security device which includes a hardware implementation of the data encryption standard algorithm adopted as the United States Federal Data Processing Standard.

Still another object of the invention is to provide a terminal data security device having interfaces to which plaintext/ciphertext input data and operation requests are presented and from which ciphertext/plaintext output data is presented.

Still a further object of the invention is to provide a terminal cryptographic facility which includes cryptographic apparatus, a terminal master cryptographic key memory and a working key register whereby the contents of the terminal master key memory, the working key register and intermediate results of the cryptographic operation are only accessible to the cryptographic apparatus.

Still another object of the invention is to provide a terminal cryptographic facility for performing a write master key function to selectively store a terminal cryptographic key used for encrypting/decrypting other cryptographic keys in a master key memory by manual or terminal control means.

Still a further object of the invention is to provide a terminal cryptographic facility having a battery powered terminal master key memory to allow terminal master key retention when system power is not present.

Still another object of the invention is to provide a terminal cryptographic facility for performing a terminal master key overwrite function whenever a new terminal master key is to be used by the facility.

Still a further object of the invention is to provide a terminal cryptographic facility having a working key register for storing a terminal cryptographic key used to personalize the encrypting/decrypting operation of the terminal cryptographic facility.

Still another object of the invention is to provide a terminal cryptographic facility for performing a load key direct function to directly store a terminal data encrypting key in a working key register of the terminal cryptographic facility.

Still a further object of the invention is to provide a terminal cryptographic facility for performing a decipher key function to decipher a data encrypting key enciphered under a terminal master key to obtain the data encrypting key for storage in a working key register.

Still another object of the invention is to provide a terminal cryptographic facility for performing an encipher function for enciphering input plaintext under control of a data encrypting key stored in a working key register to produce output ciphertext.

Still a further object of the invention is to provide a terminal cryptographic facility for performing a decipher function for deciphering input ciphertext under control of a data encrypting key stored in a working key register to produce output plaintext.

Still another object of the invention is to provide a terminal cryptographic facility for performing a decipher function for deciphering a data encrypting key enciphered under a terminal master key to obtain the data encrypting key within the facility for use in enciphering input cleartext into output ciphertext.

Still a further object of the invention is to provide a terminal cryptographic facility for performing a decipher function for deciphering a data encrypting key enciphered under a terminal master key to obtain the data encrypting key within the facility for use in deciphering ciphertext enciphered under the data encrypting key into cleartext.

Still another object of the invention is to provide a terminal having a data security device which deciphers an enciphered data encrypting key used for data enciphering/deciphering operations under selective control of a system or private key encrypting key to permit cryptographic data transmissions in a data communication network.

Still a further object of the invention is to provide a terminal having a data security device which performs data enciphering/deciphering operations under control of a private data encrypting key to permit private cryptographic data transmissions in a data communication network.

Still another object of the invention is to provide terminals having data security devices associated with different domains of a multiple domain communication network with the terminal associated with one domain performing data enciphering/deciphering operations under control of a private data encrypting key and the terminal associated with another domain performing enciphering/deciphering operations under control of the same private data encrypting key to permit cross domain cryptographic data transmissions in the multiple domain communication network.

Still a further object of the invention is to provide a terminal capable of maintaining the security of data for storage in a private file or a data processing system.

Still another object of the invention is to provide a terminal having a data security device for enciphering message blocks of data under control of a private data encrypting key for secure storage in a private file of a data processing system.

Still a further object of the invention is to provide a terminal having a data security device for deciphering message blocks of enciphered data recovered from a private file of a data processing system under control of the same private data encrypting key which was used to create the enciphered data file.

Still another object of the invention is to provide terminals having data security devices associated with different data processing systems with the terminal associated with one system enciphering data under control of a private data encrypting key for secure storage in a private portable file which is transported to and installed in another system where the terminal associated with that system can decipher the enciphered data recovered from the private data file under control of the same private data encrypting key which was used to create the enciphered data file.

In accordance with the invention, a terminal is provided to permit cryptographic data transmissions in a data communication network. The terminal has an integrated data security device which includes a memory for storing a terminal master key acting as a key encrypting key, cryptographic apparatus for ciphering input data under control of a cryptographic key stored in a working key register to produce ciphered output data and an interface adapter to which operation requests are presented and plaintext/ciphertext are presented for application as input data to the cryptographic apparatus and from which ciphertext/plaintext data is presented as applied from the ciphered output data of the cryptographic apparatus. The terminal master key may be loaded into the master key memory by manual means or under terminal control by a write master key operation request to the interface adapter. Additionally, the terminal is key synchronized with the host system by reception and deciphering of synchronizing data from the host system consisting of a data encrypting key enciphered under the terminal master key. This is accomplished by accessing the terminal master key memory for transferring the master key to the working key register and by applying the synchronizing data as input data to the cryptographic apparatus. The cryptographic apparatus then deciphers the synchronizing data under control of the terminal master key to obtain the synchronizing data encrypting key which is then loaded into the working key register replacing the terminal master key previously stored therein. Encipher/decipher operation requests may then proceed to encipher plaintext under control of the data encrypting key in the working key register to produce ciphertext for transmission to the host system or to decipher ciphertext received from the host system under control of the data encrypting key in the working key register to produce plaintext.

The terminal data security device also provides an arrangement which permits a variety of applications using a pre-defined private data encrypting key. With a load key direct operation request to the interface adapter the private data encrypting key may be directly loaded into the working key register as the working key. This allows subsequent encipher/decipher operations to proceed under control of the private data encrypting key. In a data processing system where portable data files are created, secure storage and later recovery of data files may be accomplished by directly loading a private data encrypting key into the working key register and enciphering the data to be stored under control of the private data encrypting key when the data file is to be created and using the same private data encrypting key in the working key register when the enciphered data file is later recovered and is to be deciphered.

The foregoing and other objects, features and advantages of the invention will be apparent from the following particular description of a preferred embodiment of the invention, as illustrated in the accompanying drawings.

BRIEF DESCRIPTION OF THE DRAWINGS

FIG. 19 is a diagram of how FIGS. 19a1 through 19i2 may be placed to form a detailed schematic diagram.

FIGS. 19a1 through 19i2, taken together, comprise a detailed schematic diagram of the data security device of the present invention.

FIG. 21 illustrates how FIGS. 21a and 21b may be placed to form a composite timing diagram.

FIGS. 21a and 21b, taken together, comprise a timing diagram of the terminal controlled WMK operation.

FIG. 24 illustrates how FIGS. 24a to 24c may be placed to form a composite timing diagram.

FIGS. 24a to 24c, taken together, comprise a timing diagram of the DECK operation.

FIGS. 25a to 25d, taken together, comprise a timing diagram of the DEC/ENC operation.

GENERAL DESCRIPTION

INTRODUCTION

Figure 1:
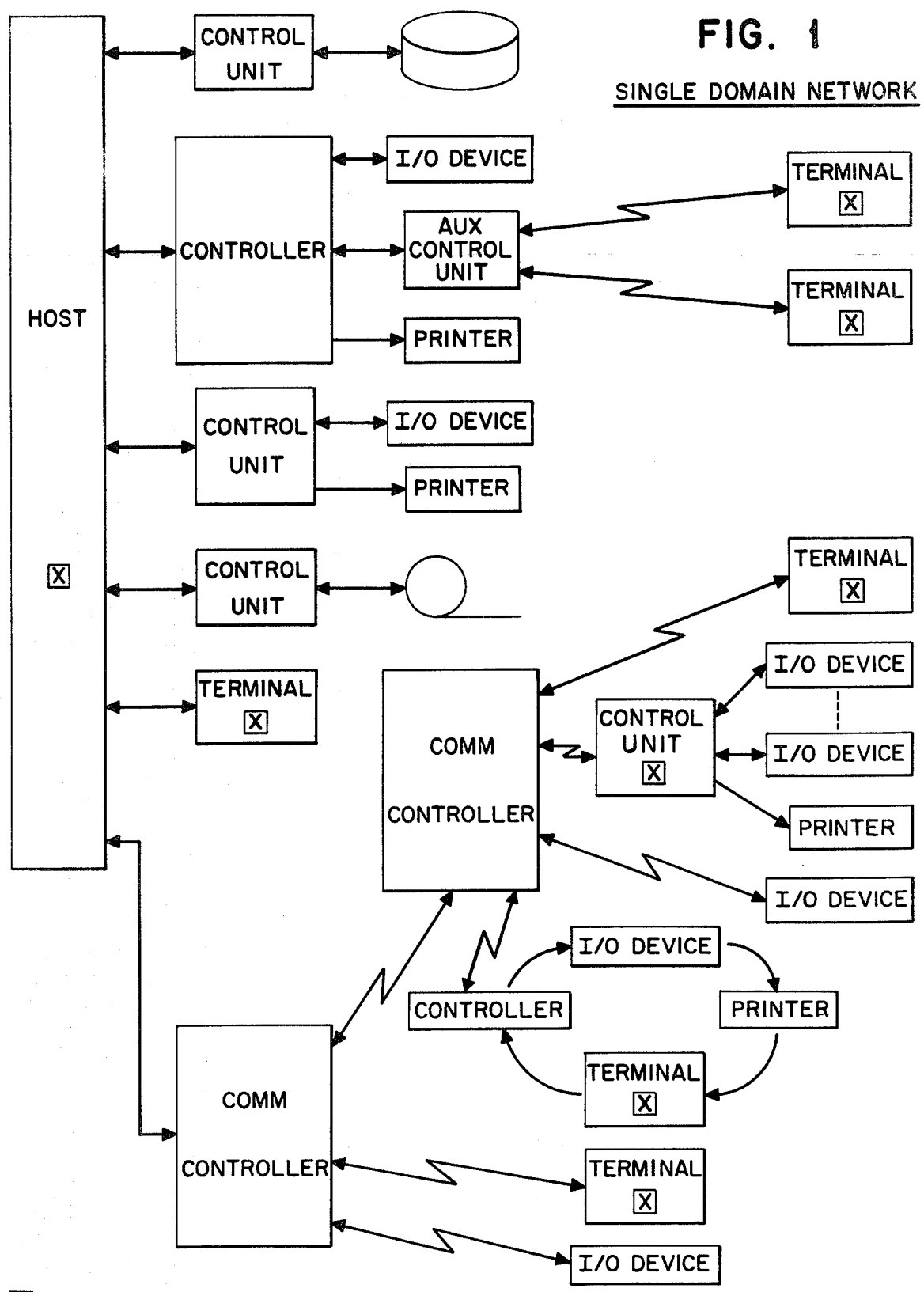
FIG. 1 is a block diagram illustrating a cryptographic data communication network.

In a data communication network, a complex of communication terminals are connected via a plurality of communication lines to a host data processing system and its associated resources such as host programs, and locally attached terminals and secondary storage files. Because of the complexity and increasing size of such networks which may include single or multiple domain networks, it has been recognized that when data is transmitted over unsecure communication lines or stored in secondary storage files or in portable storage media, it is necessary to protect the data to maintain the confidentiality and integrity of the information represented by that data. Cryptography provides an effective data security measure for communication and file security in that it protects the confidentiality and integrity of the data itself rather than the medium over which it is transmitted or the media in which it is stored. FIG. 1 illustrates a cryptographic arrangement in a representative single domain data communication network.

Most practical cryptographic systems require two basic elements, namely, (1) a cryptographic algorithm which is a set of rules that specify the steps required to transform or encipher plaintext into ciphertext or to transform or decipher ciphertext back into plaintext and (2) a cipher key. The cipher key is used to select one out of many possible relationships between the plaintext and the ciphertext. Various cryptographic algorithms have been developed in the prior art for improving data security in data processing systems. One such algorithm is described in U.S. Pat. No. 3,958,081 issued May 18, 1976 and was recently adopted as a United States Federal Data Processing Standard as set forth in the aforesaid Federal Information Processing Standard publication. A hardware implementation of this algorithm is incorporated in the present invention. The cryptographic algorithm operates to transform or encipher a 64 bit block of plaintext into a unique 64 bit block of ciphertext under control of a 56 bit cipher key or to transform or decipher a 64 bit block of ciphertext back into an original 64 bit block of plaintext under control of the same 56 bit cipher key with the deciphering process being the reverse of the enciphering process. The effectiveness of this cipher process depends on the techniques used for the selection and management of the cipher key used in the cipher process. The only cipher key actually used in the cipher process to personalize the algorithm when encrypting or decrypting data or other keys is termed the working key and is accessible only by the cryptographic apparatus. All other keys hereafter discussed are used at different times as working keys depending upon the cipher operation to be performed.

There are basically two categories of cipher keys used in the cryptographic system, namely, operational keys (KO) and key encrypting keys (KEK) with operational keys being referred to and used as data encrypting keys. Data encrypting or operational keys are a category of keys used to encrypt/decrypt data while key encrypting keys are a category of keys used to encrypt/decrypt other keys.

Within the two basic categories, there are variously defined classes and types of cipher keys. Thus, in the data encrypting or operational class of cipher keys, the data encrypting or operational key which protects data during data communication sessions is a class of key called the primary communication key. One type of this class of keys is one which is a system generated, time variant, dynamically created key transmitted in enciphered form under a key encrypting key from a host system to a remote terminal. The key is deciphered at the terminal and then loaded into the working key register and used as the working key. The key exists only for the duration of the communication session and will be referred to as the system session key (KS). In private cryptographic systems which use a private protocol known to each end user but unknown to the system, a private key may be used as another type of primary communication key to provide communication security. The private key is loaded into the terminal working key register and then used as the working key. The key exists only for a time duration determined by the private protocol which may require the key to be changed for each communication, once an hour, once a week, etc. and will be referred to as the private session key (KSP).

The data encrypting or operational key which is used to protect a data file in a storage media is a class of key called the primary file key. This key provides file data security for data files which may be inactive for long periods of time or in the case of portable storage media during periods when the data file is in transit from point to point. Thus, the primary file key generally exists for long periods of time as contrasted with the primary communication key which generally exists for relatively short periods of time. In private cryptographic systems which use a private protocol, a private key may be used as one type of primary file key to provide a private file security system. This key exists for as long as the protected file exists and will be referred to as the private file key (KFP).

Within the key encrypting category of cipher keys, there are two sub-categories, namely, the primary key encrypting key and the secondary key encrypting key. In the primary key encrypting key sub-category of cipher keys, the key encrypting key used in the host system to encipher other keys is a class of key called the system key. One type of this class of keys is one which is used to protect the system session keys actively used at the host and will be referred to as the host master key (KMH). In the secondary key encrypting key sub-category of cipher keys, the key encrypting key used in the terminal to protect other keys is a class of key called a secondary communication key. Two types of this class of keys are used to protect system session keys transmitted to the terminal and when system generated will be referred to as the terminal master key (KMT) and when provided as a pre-defined private key will be referred to as a private terminal master key (KMTP). The various cipher keys defined above are summarized in the following table by category, class, type and use:

| CATEGORY | SECURITY CLASS | TYPE | USE |
|---|---|---|---|
| Key Encrypting Keys | | | |
| Primary | System Key | Host master Key (KMH) | |
| | | | Encipher |
| Secondary | Secondary Communications Keys | Terminal Master Key (KMT) | Other |
| | | | Cryptographic |
| | | Private Terminal Master Key (KMTP) | Keys |
| Data Encrypting Keys | Primary Communication Keys | System Session Key (KS) | Encipher |
| | | Private Session Key (KSP) | Or Decipher |
| (Operational Keys) | Primary File Key | Private File Key (KFP) | Data |

GENERATION, DISTRIBUTION AND INSTALLATION OF CRYPTOGRAPHIC KEYS

Key generation is the process which provides for the creation of the cipher keys required by a cryptographic system. Key generation includes the specification of a system master key, primary and secondary communication keys and the primary file key.

The system master key is the primary key encrypting key and is the only cipher key that needs to be present in the host cryptographic facility in clear form. Since the system master key does not generally change for long periods of time, great care must be taken to select this key in a random manner. This may be accomplished by using some random experiment such as coin tossing where bit values 0 and 1 are determined by the occurrence of heads and tails of the coin or by throwing dice where bit values 0 and 1 are determined by the occurrence of even or odd rolls of the dice, with the occurrence of each group of coins or dice being converted into corresponding parity adjusted digits. Since all other cipher keys stored in the host system are enciphered under the system master key then secrecy for such other cipher keys reduces to that of providing secrecy for the single system master key. This may be accomplished by storing the system master key in a non-volatile master key memory so that it need only be installed once. Once installed, the master key is used only by the cryptographic apparatus for internally deciphering enciphered keys which may then be used as the working key in a subsequent encipher/decipher operation.

The terminal master key is a secondary key encrypting key and like the system master key, is the only key encrypting key that needs to be present in clear form in the terminal cryptographic facility. Since there may be numerous terminals associated with the data communication network, it may not be practical or prudent to have these keys generated by a human user using some type of random experiment. Therefore, to relieve the system administrator from the burden of creating cryptographic keys, except for the single system master key, the cryptographic apparatus of the host system can be used as a pseudo random generator for generating the required terminal master keys used by the various terminals of the network. The manner by which such host system generated random numbers are produced is described in detail in the co-pending application Ser. No. 857,532 filed Dec. 5, 1977 entitled "Cryptographic Communications Security for Single Domain Networks" by Ehrsam et al. In addition to the system generated terminal master keys, off line means may be used by end users to establish a private terminal master key. In either event, the terminal master key is retained in enciphered form at the host in a manner as described in the aforementioned patent application and the clear form of the system or private generated terminal master key is distributed in a secure manner to the authorized terminal users. This may be accomplished by transporting the key by courier, registered mail, public telephone, etc. The liklihood of an opponent obtaining the key during transit can be lessened by transmitting different portions of the key over independent paths and then combining them at the destination. Once having properly received a valid system or private generated terminal master key in clear form, it becomes necessary to maintain its secrecy. In the terminal master key approach of the present invention, this is accomplished by writing the terminal master key in a non-volatile master key memory, as in the case of the system master key. Once installed, the terminal master key is used only by the terminal cryptographic apparatus for internally deciphering system generated session keys which may then be used as the working key in a subsequent encipher/decipher operation.

Installation of the system or private generated terminal master keys may be accomplished by a direct manual entry process using mechanical switches, dials, or a hand-held key entry device. Alternatively, an indirect entry method may be used in which case the master key may be entered from a non-volatile media such as a magnetic card or tape which is maintained in a secure location (safe, vault, etc.) accessible only to the security administrator. Another alternative indirect entry method may be to use a keyboard entry device though this method is subject to human error. In any event, whichever indirect method is chosen, during terminal initialization, the terminal master key may be read into and temporarily stored in the terminal memory and then transferred to the master key memory with the terminal memory entry being subsequently erased so that only one copy is present in the terminal and accessible only by the terminal cryptographic facility.

System generated primary communication keys, such as the system session keys, are time variant keys which are dynamically generated for each communication session and are used to protect communicated data. Since there may be numerous communications sessions it is impractical to have these keys generated by a human user. Therefore, as in the case of the terminal master keys, the cryptographic apparatus of the host system may be used as a pseudo-random generator for generating, as each communication session is required, a pseudo-random number which may be defined as being an enciphered system session key. By a technique described in the aforementioned application, Ser. No. 857,532, the enciphered terminal master key and the enciphered session key are processed by a function which produces the session key enciphered under the terminal master key. This quantity is then communicated to the terminal where it is deciphered thereby allowing the host and terminal to communicate using the common session key. In addition to system generated session keys, end users may wish to communicate using a mutually agreed upon private session key. This key is loaded into the host system and the terminal as a common working key thereby allowing the host and terminal to communicate using the common private session key.

In private cryptographic systems where the end users use a private protocol which is unknown to the system, communication and/or file security can be obtained by the use of private primary communication and/or private primary file keys. In such arrangements, key selection, management and data transfer operations are performed without system knowledge that cryptography is being performed. Thus, in single domain data communication networks where end user terminals are remote from the host system or in multiple domain data communication networks where the end user terminals are local to or remote from their respective host systems, the end users may define a private protocol using a mutually agreed upon primary communication key, i.e. a private session key. This key may be loaded directly into the respective end user terminals as a working key under control of a load key direct operation thereby allowing the end user terminals to cryptographically communicate with each other using the common private session key. With this end-to-end encryption approach, enciphered messages can be sent via networks of any type, private or public, without system knowledge that cryptography is being performed but providing communication security for such data transmissions.

In single domain data processing systems where sensitive data is processed at an end user terminal for storage in a data file for subsequent recovery at a later time at the same or a different terminal associated with the host system or where the sensitive data processed at an end user terminal is stored in a data file on a portable storage media which is transported to another data processing system for subsequent recovery at a later time at a terminal associated with the other data processing system, a private protocol may be defined using a primary file key i.e., a private file key. At the time the file is to be created, this key may be loaded directly into the terminal used for creating the data file as a working key under control of a load key direct operation. With this approach, enciphered data may be created and stored in data files for prolonged periods of time or in portable storage media using normal system data processing and system storage techniques without system knowledge that cryptography is being performed but providing file security for data. At the time the file is to be recovered, the private file key may again be loaded directly into the terminal used for the data file recovery as a working key under control of a load key direct operation. The data file may then be obtained using normal system access means and be transmitted to the terminal for decipherment.

TERMINAL DATA SECURITY DEVICE

Figure 2:
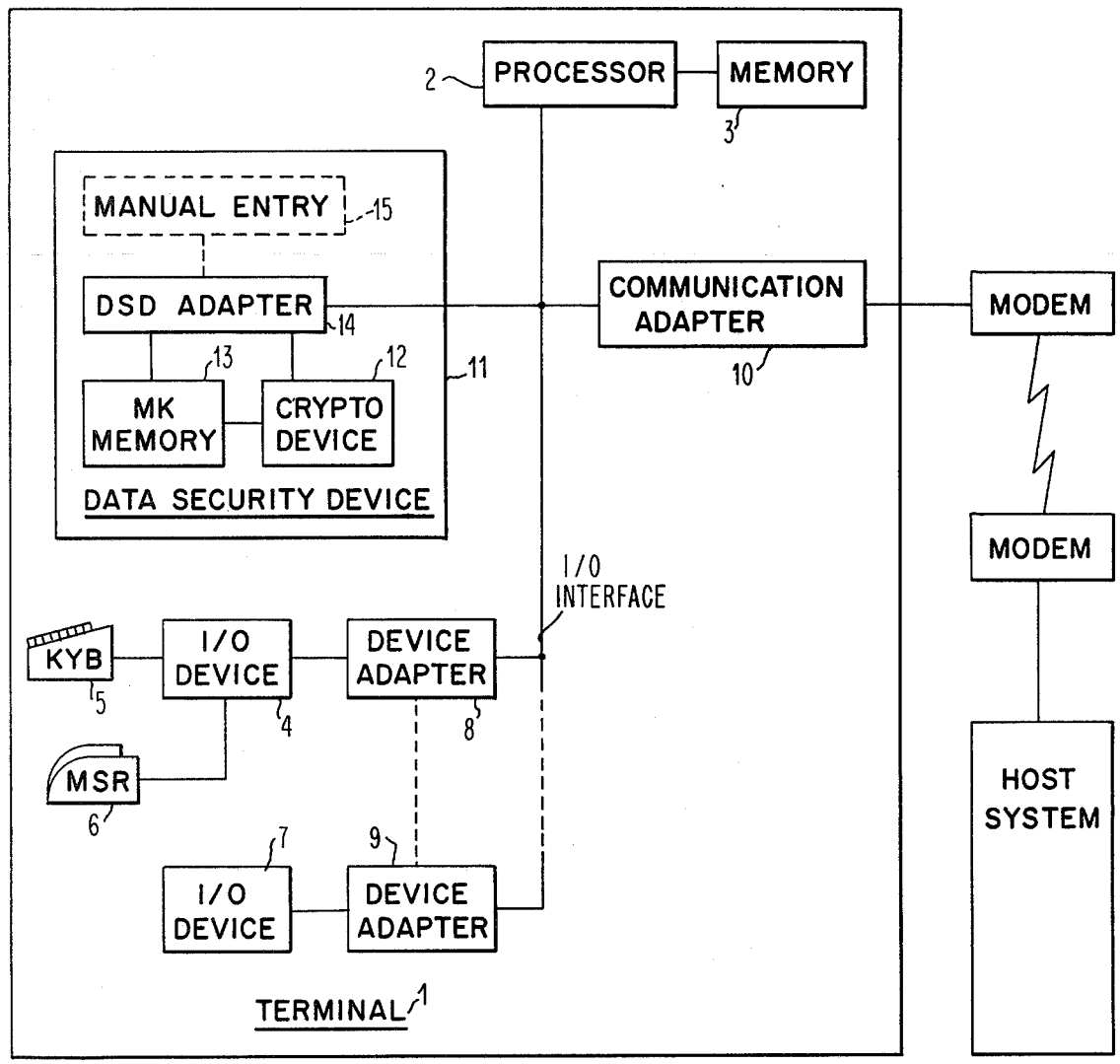
FIG. 2 is a block diagram of a terminal having a data security device of the present invention.

Modern day communication terminals take many forms which may include stand-alone terminals having a variety of data entry devices such as keyboards, magnetic stripe card readers, light pens, etc. as well as a variety of output devices such as displays and printers. In addition to the stand-alone type of communication terminal there are cluster type communication terminals having a control unit capable of controlling a cluster of input/output devices such as display stations and printers. While the particular manner in which a communication terminal is implemented is not critical to the present invention, FIG. 2 is a block diagram of a representative communication terminal 1 showing data flow and control relationships. The terminal 1 is generally modular in nature and includes a programmable processor 2 operationally connected to a memory 3 which provides storage for data and the programs which are utilized to control the terminal 1. The processor 2 contains the normal facilities for addressing memory, for fetching and storing data, for processing data, for sequencing program instructions and for providing operational and data transfer control of a single I/O device 4 which may be a display type of device having a keyboard entry unit 5 and/or magnetic stripe card reader entry unit 6, a single I/O device 7 which may be a printer type of device or a cluster of such display and printer type of devices. The collection of data and control lines connected between the processor 2 and the I/O device or devices is commonly referred to as the I/O interface providing an information format and signal sequence common to all the I/O devices. The I/O interface lines generally include a data bus out which is used to transmit device addresses, commands and data from the processor 2 to the I/O device; a data bus in which is used to transmit device identification, data or status information from the I/O device to the processor 2 and tag signal lines which are used to provide signals identifying an I/O operation, the nature of information on the data bus and parity condition. Since each I/O device has a unique electrical interface, device adapters such as adapters 8 and 9 are generally provided to allow device connection to the common I/O interface. All I/O data transfers between the processor and the attached adapters may be performed in a programmed input/output (PIO) mode on a 1 byte per I/O instruction basis. In addition to the device adapters, a communication adapter 10 is also generally provided to connect the communication terminal 1 via modems and a communication line to a host system.

Into this organization of a general purpose communication terminal 1 is integrated a data security device of the present invention. The data security device (DSD) 11 includes a crypto device 12, a master key (MK) memory 13, a DSD adapter 14 which connects to the I/O interface and optionally a manual entry device 15 for manually loading a terminal master key into the MK memory 13. Either one of two methods can be used for writing a terminal master key into the MK memory 13. The first method for writing the terminal master key in the MK memory 13 is achieved under program control. In this method, an I/O device having a keyboard, magnetic stripe card reader or the like, may use such elements to cause the terminal master key to be stored in the terminal memory 3 as in the case of conventional data entry. Subsequently, under program control, the terminal master key may be read from the terminal memory 3 to the MK memory 13 of the DSD in a manner which will be described in greater detail hereafter. The other method of writing the terminal master key into the MK memory 13 consists of manually writing the terminal master key into the MK memory 13 by means of individual toggle or rotary switches wired to produce binary coded hex digits as will be described in greater detail hereafter. To enable master key writing into the MK memory 13 by either method, an enable write master key (EW) switch is provided which is initially turned on when a write master key operation is initiated and turned off at the end of write master key operation. To prevent the key from being changed by unauthorized persons, the EW switch operation may be activated by a physical key lock arrangement.

The DSD adapter 14 serves a dual function namely, providing adapter functions for DSD connection to the I/O interface and control functions for the DSD.

The I/O interface provides the DSD adapter 14 with overall direction, gives it cipher keys to be used, presents it with data to be processed and accepts the processed results. Over-all direction is achieved by use of operation commands which are decoded and subsequently provide control in properly timed sequences of signals to carry out each command. These signals are synchronized with the transfer of data in and out. The DSD adapter 14 also controls the placing of cipher keys in the crypto device 12 and directs the crypto device in the enciphering and deciphering operations.

The MK memory 13 is a non-volatile 16×4 bit random access memory (RAM) which is battery powered to enable key retention when terminal power may not be present. The terminal master key consists of eight master key bytes (64 bits) each of which consists of seven key bits and one parity bit.

The crypto device 12 is the heart of the DSD hardware for performing enciphering and deciphering operations. The crypto device 12 performs encipher/decipher operations on a block cipher basis in which a message block of 8 data bytes (64 bits) is enciphered/deciphered under control of a 56 bit cipher working key to produce an enciphered/deciphered message block of 8 data bytes. The block cipher is a product cipher function which is accomplished through successive applications of a combination of non-linear substitutions and transpositions under control of the cipher working key. Sixteen operation defined rounds of the product cipher are executed in which the result of one round serves as the argument of the next round. This block cipher function operation is more fully described in the aforementioned U.S. Pat. No. 3,958,081. A basic encipher/decipher operation of a message block of data starts with the loading of the cipher key from the terminal memory 3. This key is generally stored under master key encipherment to conceal its true value. Therefore, it is received as a block of data and deciphered under the master key to obtain the enciphering/deciphering key in the clear. The clear key does not leave the crypto device 12 but is loaded back in as the working key. The message block of data to be enciphered/deciphered is then transferred to the crypto device 12 and the cipher function is performed, after which the resultant message block of enciphered/deciphered data is transferred from the crypto device 12 to the terminal memory 3. If subsequent encipher/decipher functions are to be performed using the same working key, there is no need to repeat the initial steps of loading and deciphering the working key as it will still be stored in the working key register.

Figure 3:
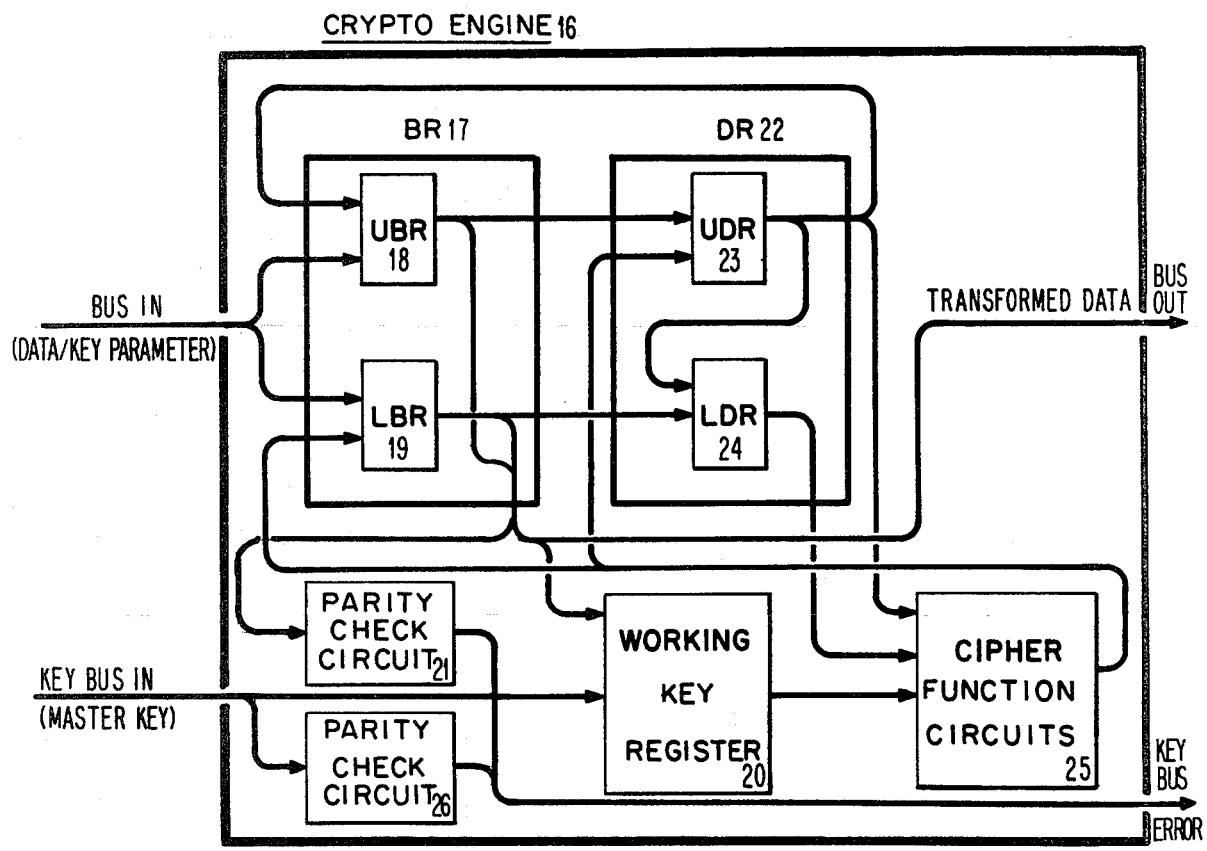
FIG. 3 is a block diagram of a cryptographic engine which performs cryptographic functions in a logically and physically secure manner.

The crypto device 12 includes duplicate crypto engines operating in synchronism to achieve checking by 100% redundancy. Referring now to FIG. 3, one of the crypto engines is shown in simplified block form with a heavy lined border signifying a secure area. The crypto engine 16 contains a 64 bit input/output buffer register 17 divided into upper and lower buffer registers 18 and 19 of 32 bits each. The buffer register 17 is used in a mutually exclusive manner for receiving input data on a serial by byte basis from the bus in, termed an input cycle, and for providing output data in a serial by byte basis to the bus out, termed an output cycle. Thus, during each input cycle a message block of eight data bytes is written into the buffer register 17 from the terminal memory 3 while during each output cycle a message block of eight processed data bytes is read from the buffer register 17 to the terminal memory 3. Serial outputs of the buffer register 17 are also applied as serial inputs to the working key register 20 and a parity check circuit 21, the latter being controlled to be effective only when a 64 bit clear cipher key is to be loaded directly into the working key register 20 from the terminal memory 3 via the buffer register 17. Only 56 of the 64 bits are stored in the working key register 20, the 8 parity bits being used only in the parity check circuit 21. The buffer register 17 is also provided with parallel input and output paths from and to a 64 bit data register 22 also divided into upper and lower data registers 23 and 24 of 32 bits each. The upper and lower data registers 23 and 24 each possesses parallel outputs and two sets of parallel inputs. The parallel inputs to the lower data register 24 being from the lower buffer register 19 and the upper data register 23 while the parallel inputs to the upper data register being from the upper buffer register 18 and from the lower data register 24 after modification by the cipher function circuits 25. The 64 bit master key is inputted to the crypto engine 16 on a serial by byte basis with each byte being checked for correct parity by the parity check circuit 26. As in the case of the cipher key transfer from the buffer register 17 to the working key register 20, only 56 of the 64 bits are stored in the key register 20, the 8 parity bits being used only in the parity check circuit 26. During the loading process, the key register 20 is configured as seven 8-bit shift right registers to accommodate the eight 7-bit bytes received from the MK memory 13 (or the buffer register 16).

When the working key is used for enciphering, the key register 20 is configured as two 28 bit recirculating shift left registers and the working key is shifted left, in accordance with a predetermined shift schedule, after each round of operation of the cipher function so that no set of key bits once used to perform a cipher operation is used again in the same manner. Twenty-four parallel outputs from each of the two shift registers (48 bits) are used during each round of the encipher operation. The shift schedule provided is such that the working key is restored to its initial beginning position at the end of the complete encipher operation.

When the working key is used for deciphering, the key register 20 is configured as two 28 bit recirculating shift right registers and the working key is shifted right in accordance with a predetermined shift schedule, after each round of operation of the cipher function so that again no set of key bits is used again. As in the enciphering operation, twenty-four parallel outputs from each of the two shift registers (48 bits) are used during each round of the decipher operation. The shift schedule provided in this case is also such that the working key is restored to its initial beginning position at the end of the complete decipher operation.

The cipher function circuits 24 perform a product cipher through successive application of a combination of non-linear substitutions and transpositions under control of the cipher working key. Sixteen rounds of the product cipher are executed in which the results of one round serves as the argument of the next round. Deciphering is accomplished by using the same key as for enciphering but with the shift schedule for shifting the key being altered so that the deciphering process is the reverse of the enciphering process, thus undoing in reverse order every step that was carried out during the enciphering process. During each round of the cipher function, the data contents of the upper data register 23, designated R, is enciphered under control of the working key, designated K, with the result being added modulo-2 to the contents of the lower data register 24, designated L, the operation being expressed as $L \oplus f(R,K)$. At the end of the cipher round, the contents of the upper data register 23 is parallel transferred to the lower data register 24 while the output of the cipher function circuits 25 is parallel transferred to the upper data register 23 to form the arguments for the next round of the cipher function. After a total of sixteen rounds, which completes the total cipher function, the contents of the upper data register 23 is parallel transferred to the upper buffer register 18 while the output of the cipher function circuits 25 is parallel transferred to the lower buffer register 19. The transformed data contents of the buffer register 17 is then outputted via the bus out to the terminal memory 3.

DSD COMMANDS AND ORDERS

Input/output operations of an I/O device are generally directed by the execution of I/O instructions. In executing an I/O instruction, the processor generally provides an address field for addressing the I/O device, a command field for designating the operation to be performed and another address field for addressing the data field in memory from which data is fetched or to which data is stored. The data security device 11 of the present invention is responsive to seven types of commands from the processor as shown in the following table including the mnemonic and bit pattern of the command:

| | | COMMAND FORMAT | | | | | | | |
|---|---|---|---|---|---|---|---|---|---|
| | | | | | | Command Field | | | |
| Name | Mnemonic | 0 | 1 | 2 | 3 | 4 | 5 | 6 | 7 |
| 1. Reset Adaptor | RST | — | — | — | — | 0 | 0 | 1 | 0 |
| 2. Set Basic Status | SET BS | — | — | — | — | 0 | 1 | 1 | 0 |
| 3. Reset Basic Status | RST BS | — | — | — | — | 0 | 1 | 0 | 0 |
| 4. Read Basic Status | RD BS | — | — | — | — | 0 | 1 | 1 | 1 |
| 5. PIO Write Data | PIOW | — | — | — | — | 1 | 1 | 0 | 0 |
| 6. PIO Read Data | PIOR | — | — | — | — | 1 | 1 | 0 | 1 |
| 7. Write DSD Order | WR DSD | w | x | y | z | 1 | 1 | 1 | 0 |

The following is a brief description of the function of each of the commands, the operation of which will be described in greater detail hereafter.

1. Reset Adapter (RST)—This command causes a reset signal to be created to reset all counters, flip-flops and latches in the adapter and control sections of the DSD.

2. Set Basic Status (SET BS)—This command causes those latches in a status register of the DSD that correspond to 1's in the data field to be set to 1.

3. Reset Basic Status (RST BS)—This command is similar to the SET BS command except that the status latches corresponding to 1's in the data field are set to 0.

4. Read Basic Status (RD BS)—This command causes the contents of the status latches to be applied via the data bus in to the processor.

5. PIOW Data (PIOW)—This command causes the data field to be loaded into the buffer register or the bits 0, 1, 2, and 3 of the data field to be stored in the MK memory depending on the operation to be performed.

6. PIOR Data (PIOR)—This command causes the contents of the buffer register, with correct parity, to be applied via the data bus in to the processor.

7. Write DSD Order (WR DSD)—This command uses the four high order bits of the command field to designate cipher key handling and data processing orders as shown in the following table including the mnemonic and bit pattern of the order field:

| | | ORDER FORMAT | | | | | | | |
|---|---|---|---|---|---|---|---|---|---|
| | | Order Field | | | | Command Field | | | |
| Name | Mnemonic | W | X | Y | Z | 4 | 5 | 6 | 7 |
| Cipher Key Handling | | | | | | | | | |
| 1. Write Master Key | WMK | 0 | 0 | 0 | 0 | 1 | 1 | 1 | 0 |
| 2. Load Key Direct | LKD | 0 | 0 | 1 | 0 | 1 | 1 | 1 | 0 |
| 3. Decipher Key | DECK | 0 | 1 | 1 | 1 | 1 | 1 | 1 | 0 |
| Data Processing | | | | | | | | | |
| 1. Encipher | ENC | 1 | 0 | 0 | 0 | 1 | 1 | 1 | 0 |
| 2. Decipher | DEC | 1 | 0 | 1 | 0 | 1 | 1 | 1 | 0 |

DSD FUNCTIONS

DSD cyptographic functions may be performed by combinations of the previously defined commands or by a combination of functions. These functions require an input to the cryptographic apparatus consisting of a key parameter of a data parameter. The notation used to describe these functions will be expressed as follows:

FUNCTION[KEY PARAMETER]→OUTPUT or

FUNCTION[DATA PARAMETER]→OUTPUT and when functions are combined, the notation used to describe the combined functions will be expressed as follows:

FUNCTION[KEY PARAMETER, DATA PARAMETER]→OUTPUT

The salient characteristics of cryptographic functions are that (1) the key parameter, except in the case of the Load Key Direct function is always in enciphered form and therefore must be internally deciphered by the crypto engine before the clear key is used and that (2) no function allows keys to become available in clear form. The descriptions that follow describe what each function does and how it is performed. These functions will be described in greater detail hereafter but the general description of these functions or combination of functions are given at this point to provide a better understanding of how various security applications may be performed. The description may follow along with reference to FIG. 3 at times. In the diagrams which are referenced in the following, the cryptographic facility is shown in simplified block form for ease of understanding these operations and will be shown and described in greater detail hereafter.

Figure 4:
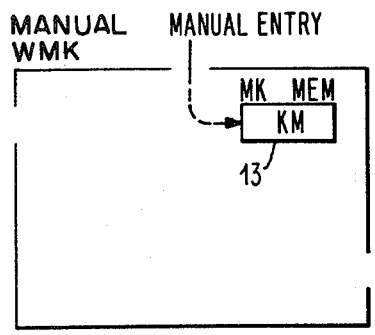
FIG. 4 illustrates in block diagram form a manual WMK function.

Before proceeding to the descriptions of the functions, a brief general description will be given on how the manual write key operation is performed. Referring now to FIG. 4, there is shown a simplified block diagram of a manual WMK operation. In the manual WMK operation, a EW switch is set on to enable writing into the MK memory 13 after which a MW switch is closed to enable manual writing and causing the current master key to be overwritten with whatever happens to be set in the data key entry switches. Following this, 16 sets of 4 bits (64 bits) are manually written into the MK memory 13 to complete the manual WMK operation.

Figure 5:
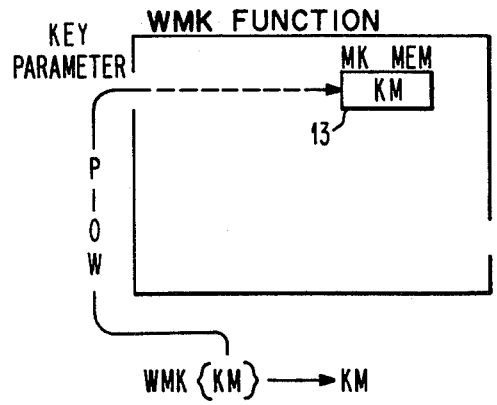
FIG. 5 illustrates in block diagram form a terminal controlled WMK function.

Referring now to FIG. 5, there is shown a simplified block diagram of a write master key (WMK) function. This function is carried out by the following sequence of commands: (1) WMK and (2) 16 PIOW's. In this operation, as in the manual WMK operation, the EW switch is previously set on to enable writing into the MK memory 13. The execution of this function causes the current master key in the master key memory 13 to be overwritten with whatever happens to be present as bits 0, 1, 2 and 3 on the bus in. Thereafter, the crypto engine controls are set to allow a 64 bit master key KM to be written as a key parameter into the MK memory 13 by means of 16 successive PIOW data commands with the bits 0, 1, 2 and 3 in the data fields associated with the 16 PIOW data commands constituting the new master key. The notation WMK[KM]→KM is used to describe this operation whereby the term WMK indicates the function, the contents of the brackets indicate the key parameter input to the MK memory 13 and the arrow points to the result.

Figure 6:
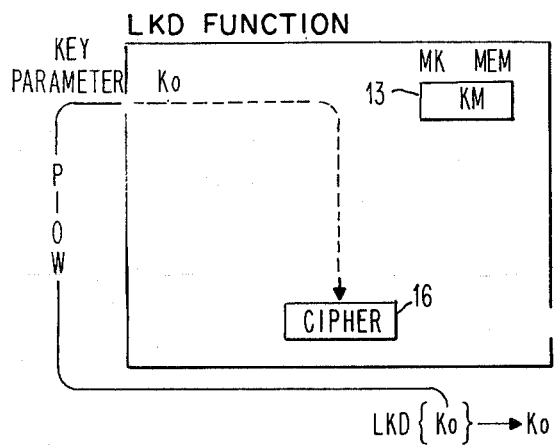
FIG. 6 illustrates in block diagram form a LKD function.

Referring now to FIG. 6, there is shown a simplified block diagram of a load key direct (LKD) function. This function is carried out by the following sequence of commands: (1) LKD and (2) 8 PIOW's. The execution of this function sets the crypto engine controls to allow a 64 bit operational key KO to be loaded directly to a key parameter into the crypto engine 16 by means of 8 successive PIOW data commands with the successive data fields associated with the 8 PIOW data commands constituting the new operational key. Within the crypto engine 16, the operational or data encrypting key is loaded into the buffer register 17 and then transferred to the working key register 20 as shown in FIG. 3. The notation LKD[KO]→KO is used to describe this operation whereby the term LKD indicates the function, the contents of the bracket indicate the key parameter input to the crypto engine 16 and the arrow points to the result.

Figure 7:
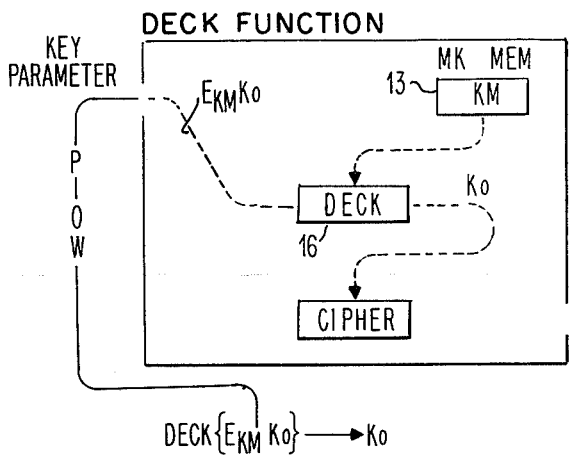
FIG. 7 illustrates in block diagram form a DECK function.

Referring now to FIG. 7, there is shown a simplified block diagram of a decipher key DECK function. This function is carried out by the following sequence of commands: (1) DECK and (2) 8 PIOW's. The execution of this function sets the crypto engine controls to first allow the master key KM in the MK memory 13 to be transferred to the crypto engine 16 as the working key. After or during the master key transfer, a 64 bit data block, defined as an operational key enciphered under the master key, is loaded as a key parameter into the crypto engine 16 by means of 8 successive PIOW data commands with the successive data fields associated with the 8 PIOW commands constituting the enciphered operational key. After the key parameter loading is completed, the crypto engine 16 performs a decipher operation to obtain the cipher key in clear form. The resultant clear cipher key does not leave the crypto engine 16 but is loaded back into the key register 20 of the crypto engine 16 replacing the master key as the working key. The notation DECK[$E_{KM}KO$]→KO is used to describe this operation whereby the term DECK indicates the function, the contents of the bracket indicate the key parameter which is inputted to the crypto engine 16 and the arrow points to the result.

Figure 8:
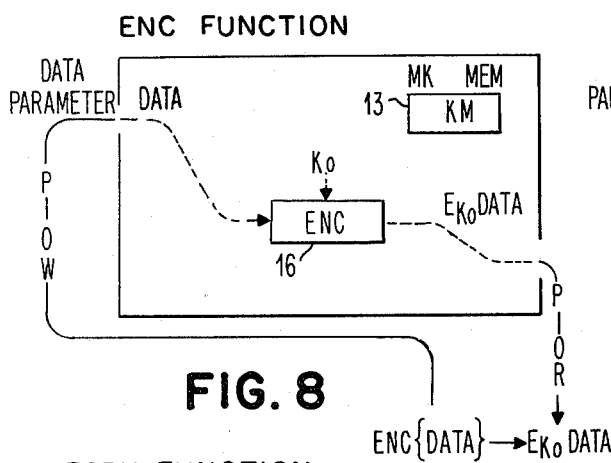
FIG. 8 illustrates in block diagram form a ENC function.

Referring now to FIG. 8, there is shown a simplified block diagram of an encipher (ENC) function. This function is carried out by the following sequence of commands: (1) ENC, (2) 8 PIOW's and (3) 8 PIOR's. The execution of this function sets the crypto engine controls to the encipher mode of operation and allows a 64 bit message block of data to be loaded as a data parameter into the crypto engine 16 by means of 8 successive PIOW data commands with the successive data fields associated with the 8 PIOW commands constituting the message block of data to be enciphered. After the data parameter loading is completed, the crypto engine 16 performs an encipher operation to encipher the data parameter under the operational key presently stored in the working key register of the crypto device 16. The 64 bit enciphered result is transferred by a series of 8 PIOR commands from the crypto engine 16 for storage in designated data fields of the terminal memory 3. The notation ENC[DATA]→$E_{KO}$DATA is used to describe this operation whereby the term ENC indicates the function, the contents of the bracket indicate the data parameter input to the crypto engine 16 and the arrow points to the result. Additionally, so long as the crypto engine controls remain set in the encipher mode of operation, then a message which consists of multiple 8 byte blocks of data may be enciphered by the crypto engine 16 by means of an encipher command followed by a series of successive 8 PIOW data commands and successive 8 PIOR data commands for each block of data. This message encipherment may be expressed by the notation:

ENC[DATA$_1$, DATA$_2$ ---- DATA$_N$]→E$_{KO}$(DATA$_1$, DATA$_2$ ---- DATA$_N$).

Figure 9:
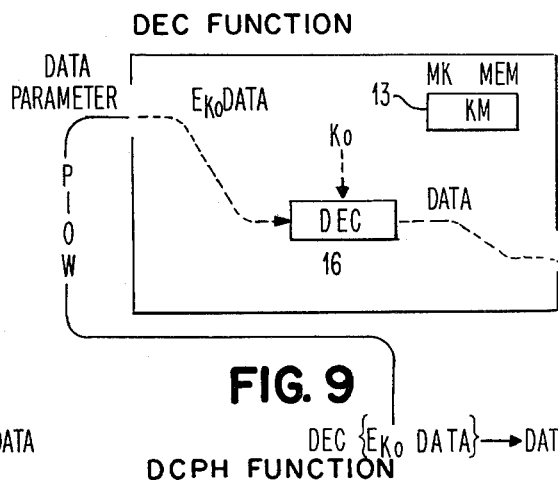
FIG. 9 illustrates in block diagram form a DEC function.

Referring now to FIG. 9, there is shown a simplified block diagram of a decipher (DEC) function. This function is carried out by the following sequence of commands: (1) DEC, (2) 8 PIOW's and (3) 8 PIOR's. The execution of this function sets the crypto engine controls to a decipher mode of operation and allows a 64 bit message block of enciphered data to be loaded as a data parameter into the crypto engine 16 by means of 8 successive PIOW data commands with the successive data fields associated with the 8 PIOW commands constituting the message block of enciphered data to be deciphered. After the data parameter loading is completed, the crypto engine 16 performs a decipher operation to decipher the data parameter under control of the operational key presently stored in the working key register of the crypto engine 16. The 64 bit deciphered result is transferred by a series of 8 PIOR commands from the crypto engine 16 for storage in designated data fields of the terminal memory 3. The notation DEC[E$_{KO}$DATA]→DATA is used to describe this operation whereby the term DEC indicates the function, the contents of the bracket indicate the data parameter input to the crypto engine 16 and the arrow points to the results. Additionally, so long as the crypto engine controls remain set in the decipher mode of operation, then a message which consists of multiple blocks of enciphered data may be deciphered by the crypto engine 16 by means of a decipher command followed by a series of successive 8 PIOW data commands and successive 8 PIOR data commands for each block of enciphered data. This message decipherment may be expressed by the notation: DEC[E$_{KO}$(DATA$_1$, DATA$_2$ ---- DATA$_N$)]→DATA$_1$, DATA$_2$ ---- DATA$_N$.

Figure 10:
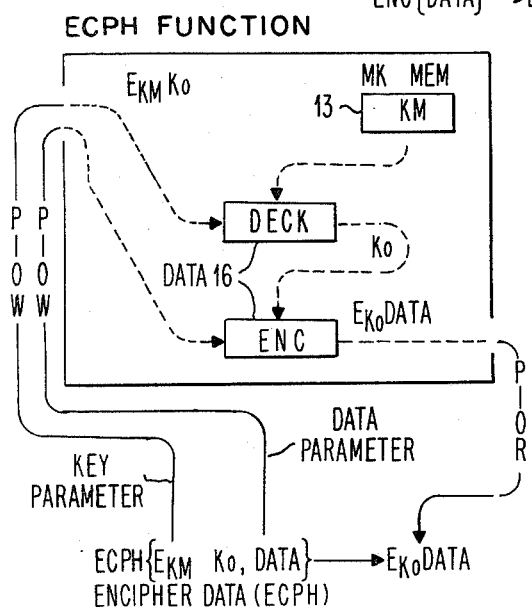
FIG. 10 illustrates in block diagram form a ECPH function.

Referring now to FIG. 10, there is shown a simplified block diagram of an encipher data (ECPH) function. This function is a combination of the DECK function and the ENC function and is carried out by the following sequence of commands: (1) DECK, (2) 8 PIOW's, (3) ENC, (4) 8 PIOW's and (5) 8 PIOR's. Accordingly, in executing this function, the crypto engine controls are first set to the decipher key mode of operation by the DECK command causing the master key KM in the master key memory 13 to be transferred as the working key to the working key register of the crypto engine 16. After or during the master key loading, the key parameter of the function, consisting of an operational key enciphered under the master key, is loaded into the crypto engine 16 by means of 8 successive PIOW data commands. The crypto engine 16 then performs a decipher key operation to obtain the operational key in clear form which is then loaded back in as the working key of the crypto engine 16 replacing the previously loaded master key. The crypto engine controls are then set to an encipher mode of operation by the ENC command and the data parameter of the function, consisting of clear data, is loaded into the crypto engine 16 by means of 8 successive PIOW data commands. The crypto engine 16 then performs an encipher operation to encipher the data parameter under the present operational key. The enciphered result is then transferred by a series of 8 PIOR commands from the crypto engine 16 for storage in designated fields of the terminal memory 3. The notation ECPH[E$_{KM}$KO,DATA]→E$_{KO}$ DATA is used to describe this operation whereby the term ECPH indicates the function, the contents of the bracket indicate the key parameter and data parameter inputs to the crypto engine and the arrow points to the results.

Figure 11:
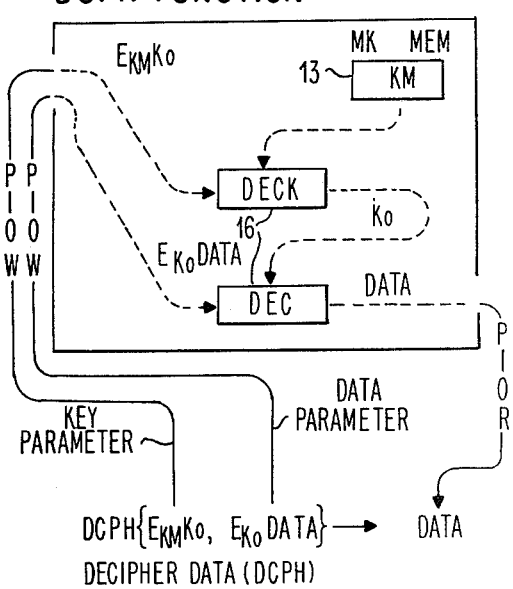
FIG. 11 illustrates in block diagram form a DCPH function.

Referring now to FIG. 11, there is shown a simplified block diagram of a decipher data (DCPH) function. This function is a combination of the DECK function and the DEC function and is carried out by the following sequence of commands: (1) DECK, (2) 8 PIOW's, (3) DEC, (4) 8 PIOW's and (5) 8 PIOR's. The first part of this function is identical to that for the encipher data function insofar as loading an operational key in clear form as the working key of the crypto engine 16. After the operational key loading is completed, the crypto engine controls are then set to a decipher mode of operation by the DEC command and the data parameter of the function, consisting of DATA enciphered under the operational key, is loaded into the crypto engine 16 by means of 8 successive PIOW data commands. The crypto engine 16 then performs the decipher operation to decipher the data parameter under control of the present operational key. The deciphered result is then transferred by a series of 8 PIOR commands from the crypto engine 16 for storage in designated fields of the terminal memory 3. The notation DCPH[E$_{KM}$KO,E$_{KO}$DATA]→DATA is used to describe this operation whereby the term DCPH indicates the function, the contents of the bracket indicate the key parameter and the data parameter inputs to the crypto engine and the arrow points to the result.

COMMUNICATION AND FILE SECURITY APPLICATIONS

The previous section provides a description of the various basic function, command and order capabilities of a terminal having a data security device capable of performing enciphering and deciphering operations. Accordingly, the following descriptions will provide an explanation of how such a terminal may be used in various communication and file security applications. While the diagrams used to illustrate these applications are simplified block diagrams, it should be understood that the networks represented by these diagrams are far more complex than that shown. However, this type of representation is used merely to simplify and aid in the understanding of the applications to be described. It should be further understood that the host system contains a full complement of known programming support including an operating system, application programs, a telecommunications access method which, in the case of single domain networks, directs the transmission of data between host application programs and terminals and, in the case of multiple domain networks, includes a multi system networking facility to permit cross domain communication, network control programs for routing data through the network(s) and a storage access method which directs storage and retrieval of data files.

SESSION LEVEL COMMUNICATION SECURITY IN SINGLE DOMAIN NETWORKS

Figure 12:
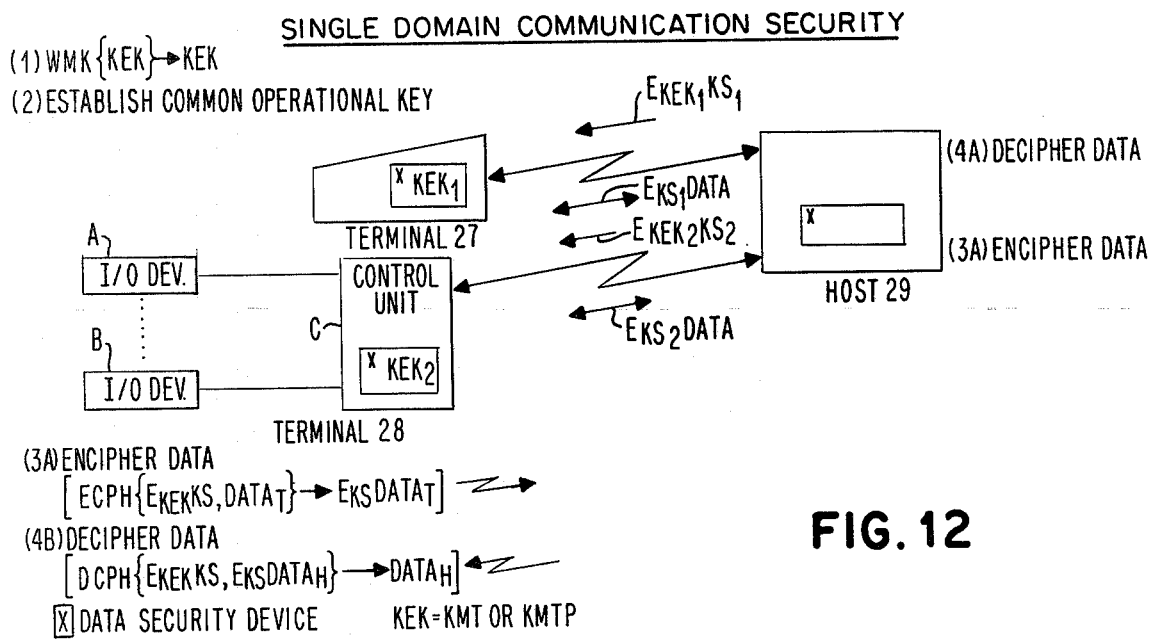
FIG. 12 is a block diagram illustrating cryptographic communication security in a single domain network using a system or private key as a key encrypting key.

Referring now to FIG. 12, there is shown a simplified block diagram of a single domain data communication network comprising a terminal 27 and a cluster type terminal 28, both of which contain data security devices, connected via communication lines to a host system 29, also having a data security device contained therein. The data security device of the host system 29 and the manner in which it is used to generate and manage cipher keys and perform encipher/decipher operations is more fully described in the aforementioned co-pending application Ser. No. 857,532.

At host system initialization time, a primary key encrypting key KMH is generated in some random manner, as by coin or dice throwing, and then written into the MK memory of the host DSD. Following this, secondary communication key encrypting keys $KEK_1$ and $KEK_2$ are generated in clear form which, if system generated, are designated as terminal master keys $KMT_1$ and $KMT_2$ or, if privately generated, are designated as private terminal master keys $KMTP_1$ and $KMTP_2$. The clear system or private generated terminal master keys $KEK_1$ and $KEK_2$ are then distributed in a secure manner, as by courier, registered mail, public phone etc. to the authorized terminal users and retained at the host system in enciphered form. At the terminals 27 and 28, the first step of initializing the terminals for communication sessions is to secure the terminal master keys. This is accomplished by loading the KEK's into the MK memory of the respective terminal DSD's by manual or terminal control means as previously described. To establish a communication session between a terminal such as terminal 27 and the host system 29, the next step is to generate a primary communication operational or data encrypting key as the common session key KS. This is initiated at terminal 27 by the authorized terminal user LOGON or SIGNON procedure which causes a message to be transmitted to the host system identifying itself and the application program with which it wishes to communicate and a request to initiate a communication session. The host system 29, in response thereto, communicates with the identified application program to determine whether it is available for a communication session with the requesting terminal 27. If available, the host system 29 causes a pseudo random number to be generated which is defined as being the system session key enciphered under the system master key. This is in keeping with the rule that no key shall ever appear in the clear. The enciphered session key is retained at the host system for encipher/decipher operations during the communication session. Additionally, in order to distribute the session key to the requesting terminal 27 the host system 29, using the enciphered terminal master key encrypting key and the enciphered session key, performs a transformation function which reenciphers the session key from encipherment under the system master key (primary key encrypting key) to encipherment under the terminal master key i.e. from $E_{KMH}KS$ to $E_{KEK}KS$ where KEK may be a system generated terminal master key KMT or a private generated terminal master key KMTP. A detailed description of this transformation function is provided in the aforementioned application Ser. No. 857,532. Since the session key is now enciphered under the terminal master key i.e. $E_{KEK}KS$, it may be transmitted over the communication line to bind the requesting terminal 27 to the requested application program in host system 29 for a communication session. Now, having bound the session, whereby the requesting terminal 27 can communicate with the application program in host system 29, the terminal 27 may perform the following encipher data ECPH function: ECPH[$E_{KEK}KS$, $DATA_T$]→$E_{KS} DATA_T$ In executing this function, a decipher key operation is first performed to obtain the session key in clear form as the working key, after which an encipher operation may be performed on the data to be transmitted over the communication line to the application program in host system 29. At the host system 29, the enciphered common session key is deciphered to obtain the session key in clear form for use as the working key, after which the enciphered data received from the terminal 27 may be deciphered to obtain the terminal data in clear form. Alternatively, host data may be enciphered under the session key at the host system 29 for transmission over the communication line to the terminal 27. In this case, the terminal 27 performs the following decipher data (DCPH) function to obtain the host data in clear form:

DCPH [$E_{KEK}KS$, $E_{KS} DATA_H$]→$DATA_H$

It should be noted that when the communication session is terminated, the terminal 27 must reinitiate a new request to the host system 29 for a new communication session and cause the host system 29 to generate a new session key enciphered under the terminal master key for establishing a new common operational key for the new communication session. This procedure provides increased security for the system since the primary communication keys are time variant and dynamically generated for each new communication session.

It should be further noted that in the case of cluster type of terminals such as terminal 28 there may be multiple communication sessions concurrently in progress requiring more frequent operational key changes for the concurrent multiple communication sessions. Thus, in this arrangement, a different terminal master key $KEK_2$ is loaded into the control unit C of the terminal 28. A terminal user at device A of terminal 28 uses session key $KS_{2,1}$ to encipher/decipher data, the session key being generated at the host system 29 and communicated in enciphered form as $E_{KEK2}KS_{2,1}$ to terminal 28. A terminal user at device B of terminal 28 uses a different session key $KS_{2,2}$ to encipher/decipher data, this session key also being generated at the host system 29 and communicated in enciphered form as $E_{KEK2}KS_{2,2}$ to terminal 28, with the session key $KS_{2,2}$ replacing the previous session key $KS_{2,1}$. Thus, it should be apparent that there will be frequent operational key changes for subsequent communications sessions thereby providing increased security for the system.

PRIVATE LEVEL COMMUNICATION SECURITY IN SINGLE DOMAIN NETWORKS

Figure 13:
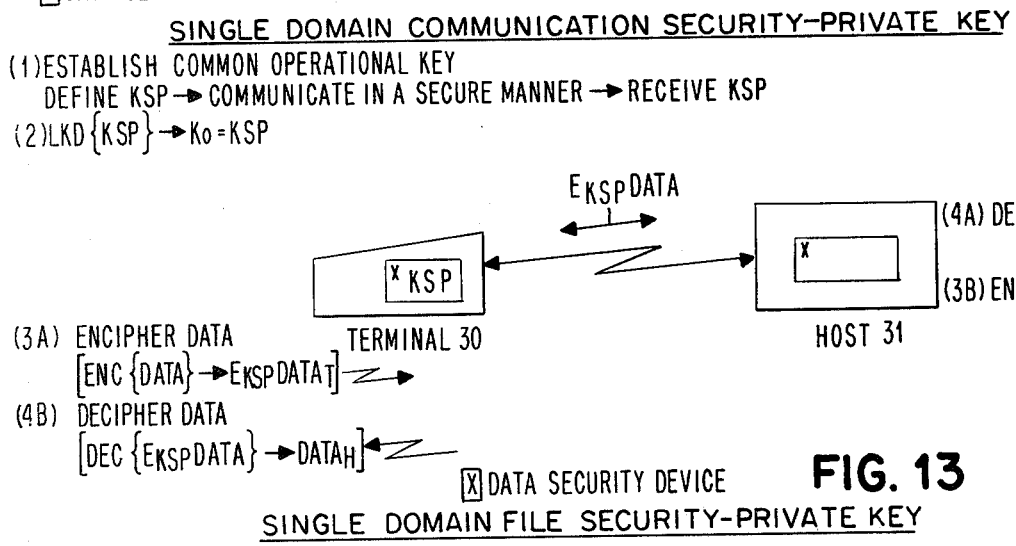
FIG. 13 is a block diagram illustrating cryptographic communication security in a single domain network using a private key as a data encrypting key.

Referring now to FIG. 13, there is shown a simplified block diagram of a single domain data communication network comprising a terminal 30, containing a data security device, connected via a communication line to a host system 31 also having a data security device contained therein. There are many situations where it is desired to provide data transmissions through a data communication network using a private protocol and a private primary communication operational (data encrypting) key KSP. The private session key may be defined by the terminal user in a random manner, as by coin or dice throwing, and communicated in a secure manner to the authorized host user. The private session key may be loaded as the working key into the host system 31 and the terminal 30 by load key direct operations. A communication session may now be established between the terminal 30 and the host system 31 in the normal manner. After the session is bound, the terminal 30 may now encipher data to be transmitted to the host system 31 by means of the ENC function ENC-[DATA$_T$]→E$_{KSP}$DATA$_T$ since the private session key KSP is already present as the working key. At the host system 31, the enciphered terminal data may be deciphered using the KSP working key to obtain the terminal data in clear form. Alternatively, host data may be enciphered under the private session key KSP at the host system 31 for transmission over the communication line to the terminal 30. In this case, the terminal 30 performs a DEC function DEC[E$_{KSP}$DATA$_H$]→DATA$_H$ to obtain the host data in clear form.

It should be apparent that a similar application may be used where direct communication is desired between two crypto terminals each connected at opposite ends of a communication line. In this case, the pre-defined private session key KSP is loaded as the working key into both terminals so that data enciphered at one terminal by the ENC function and communicated over the communication line can be directly deciphered at the other terminal by the DEC function or visa versa.

PRIVATE LEVEL COMMUNICATION SECURITY IN MULTIPLE DOMAIN NETWORKS

Figure 14:
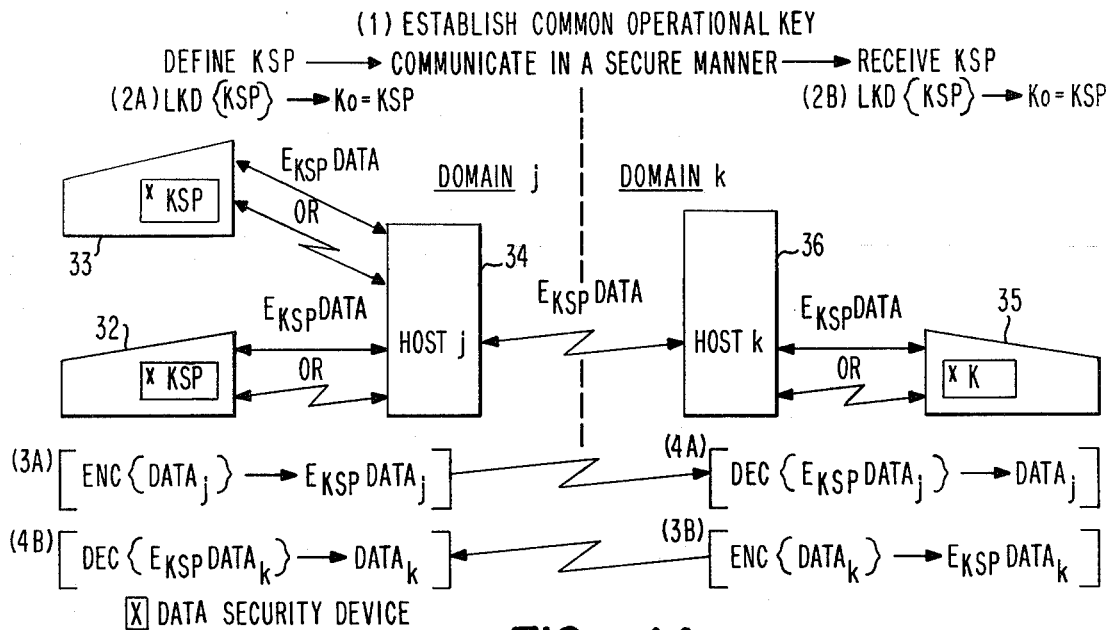
FIG. 14 is a block diagram illustrating cryptographic communication security in a multiple domain network using a private key as a data encrypting key.

Referring now to FIG. 14, there is shown a simplified block diagram of a multiple domain data communication network. Domain j of the network includes terminals 32 and 33, each containing a data security device, with the terminals 32 and 33 being locally attached or remotely, via communication lines, to the host system 34. Domain k of the network includes a terminal 35 containing a data security device connected locally or remotely, via a communication line, to the host system 36. With a multi-system networking facility in each of the host systems 34 and 36, cross domain communications may be established between the two host systems 34 and 36 which allow data communications between either of the terminals 32 or 33 in domain j and the terminal 35 in domain k.

In multiple domain data communication networks, there are many instances where it is desirable to establish a private cryptrographic system which is independent of the cryptographic capabilities of the host systems in the network but which uses the data communication facilities of the network. In such an arrangement, where the end users use a private protocol unknown to the host systems, communication security is obtained by the use of a private session key KSP. The private session key KSP may be defined by the terminal user at terminal 32 in a random manner and communicated in a secure manner to the authorized terminal user at terminal 35. The private session key KSP may then be loaded as the working key in the respective terminals 32 and 35 by a load key direct operation. A cross domain communication session may then be established by the normal multi-system networking facilities of the respective host systems 34 and 36 to allow data communications between the respective terminals 32 and 35. Accordingly, after the session is bound, terminal 32 may then encipher data to be transmitted to terminal 35 by means of the ENC function ENC[DATA$_J$]→E$_{KSP}$DATA$_j$ since the private session key KSP is already present as the working key. At the terminal 35, the enciphered data received from terminal 32 may be deciphered using the KSP as the working key to obtain the enciphered data from terminal 32 in clear form. Alternatively, data may be enciphered under the private session key KSP at terminal 35 and transmitted through the communication network to the terminal 32. In this case, terminal 32 performs a DEC function DEC[E$_{KSP}$DATA$_k$]→DATA$_k$ to obtain the enciphered data from terminal 35 in clear form.

It should be noted that a similar type of private cryptographic data communication arrangement may be established between terminals 32 and 33 within the single domain j, where the terminals are remote from the host system 34 or at least one is remote and the terminals wish to communicate with one another using a private protocol and the private primary communication key KSP. By loading the pre-defined private session key KSP as the working key in the respective terminals, data enciphered at one terminal by the ENC function and communicated over the network can be deciphered at the other terminal by the DEC function or visa versa.

PRIVATE LEVEL FILE SECURITY IN SINGLE DOMAIN NETWORKS

Figure 15:
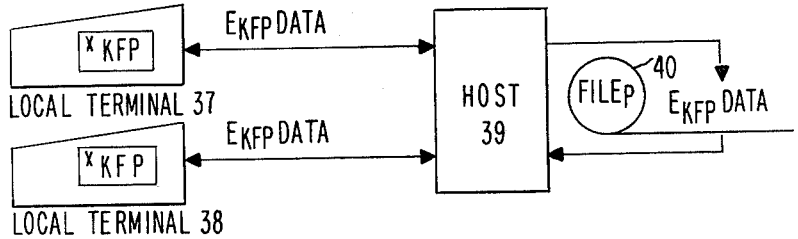
FIG. 15 is a block diagram illustrating cryptographic file security in a single domain network using a private key as a data file encrypting key.

Referring now to FIG. 15, there is shown a simplified block diagram of a single domain data processing network comprising terminals 37 and 38, each containing a data security device, with the terminals 37 and 38 being locally attached (or remotely) to a host system 39. Also locally attached to the host system 39 is a storage media 40 such as a magnetic tape or disc for storing data files. Private cryptographic systems are finding increasing use where sensitive data generated by data processing systems is stored in data files on secondary storage media for prolonged periods of time. In such systems, file security may be obtained by the use of a private primary file key KFP. Thus, at the time a data file is to be created, the private file key KFP may be defined by the terminal user at, for example, terminal 37 in a random manner. The private file key KFP may then be loaded into the terminal 37 data security device as a working key by a load key direct operation. Following this, data which is to be stored in the data file may be enciphered by means of the ENC operation ENC-[DATA$_T$]→E$_{KFP}$DATA$_T$. The enciphered data may then be transmitted to the host system 39 for storage as a private data file on the storage media 40. Thus, by maintaining the data file in enciphered form on the storage media, file security is provided for sensitive data even though the data file is not recovered for a prolonged period of time. Subsequently, when the data file is to be recovered, the user which created the file may again load the private file key KFP into the same terminal 37 or the other terminal 38 as a working key by means of a load key direct operation. The host system 30 may then read the enciphered data file and transmit it to the terminal at which recovery is desired. At the requesting terminal, recovery may be accomplished by performing the decipher operation DEC[E$_{KFP}$-DATA$_T$]→DATA$_T$ to obtain the data in the data file in clear form.

PRIVATE LEVEL FILE SECURITY IN MULTIPLE DOMAIN NETWORKS

Terminals are frequently used to generate sensitive data for storage in a portable data file which may subsequently be transported from one domain through an unprotected environment for recovery at a terminal in another domain. Because of the fact that the sensitive data file is transported through an unprotected environment, it becomes necessary to provide file security for such a portable data file. By using terminals having ciphering capabilities, a private cryptographic system can be provided, using a private protocol which is unknown to the host systems in the multiple domains, to obtain file security by the use of a private primary file key KFP.

Figure 16:
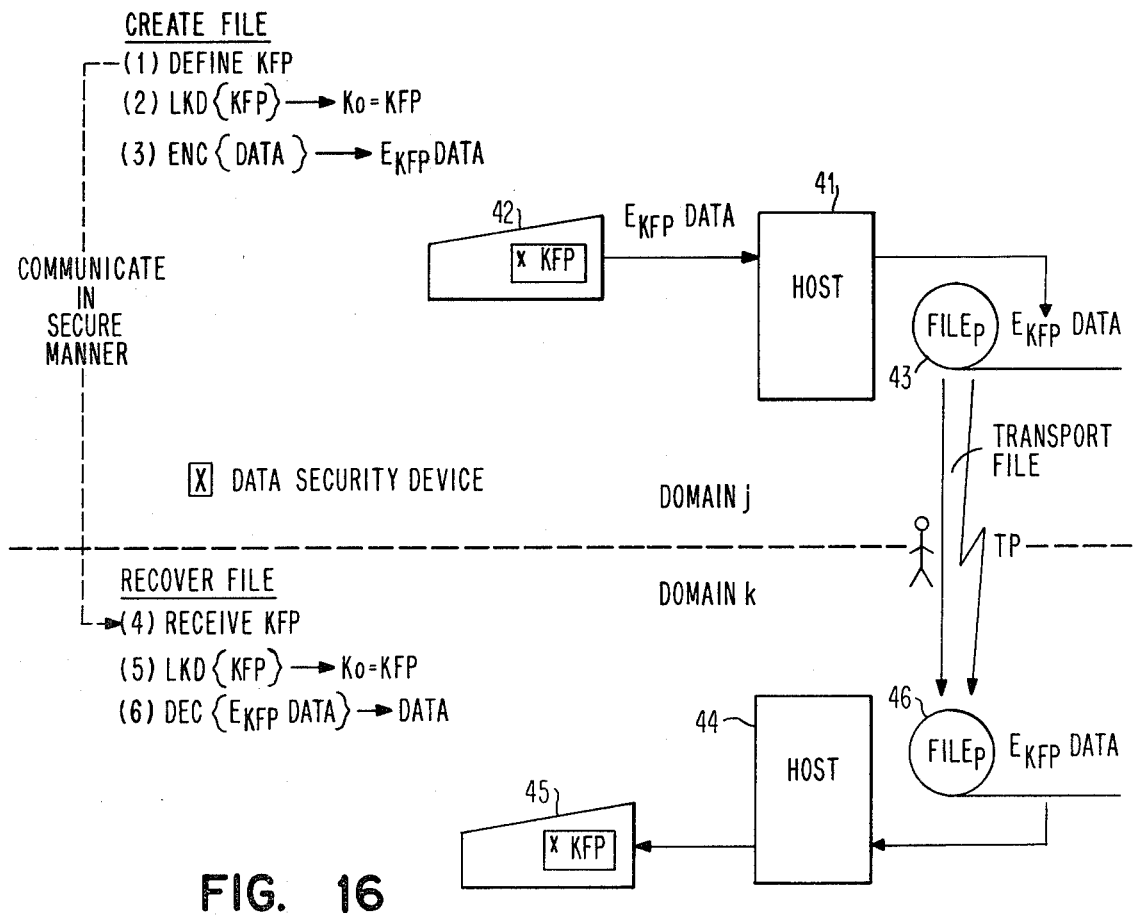
FIG. 16 is a block diagram illustrating cryptographic file security in a multiple domain network using a private key as a data file encrypting key.

Referring now to FIG. 16, there is shown a simplified block diagram of a multiple domain data processing network. Domain j of the network includes a host system 41 having associated therewith a terminal 42 containing a data security device and a storage media 43 for storing a data file. Domain k of the network also includes a host system 44 having associated therewith a terminal 45 containing a data security device and a storage device 46 for a storage media. Thus, at the time the data file is to be created, the private file key KFP may be defined by the terminal user at terminal 42, in a random manner, which may then be loaded into the data security device of the terminal as a working key by a load key direct operation. Following this, the data which is to be stored in the data file may be enciphered by means of the ENC operation ENC [DATA]→$E_{KFP}$-DATA. The enciphered data may then be transmitted to the host system 41 for storage as a private data file on the storage media 43. Thus, by maintaining the data file in enciphered form on the storage media, file security is provided for sensitive data even though it may be subsequently transported from domain j to domain k. Subsequently, the portable storage media 43 in which the data file is contained is transported by an authorized person or by teleprocessing means for installation in the storage device associated with the host system 44 in the domain k. When the data file is to be recovered, the user which created the file or one to whom he has communicated the private file key KFP may load this key into the terminal 45 as a working key by means of a load key direct operation. The host system 44 may then read the enciphered data file from the storage media 43 and transmit it to the terminal 45 for recovery. At the terminal 45, recovery may be accomplished by performing the decipher function DEC[$E_{KFP}$DATA]→DATA to obtain the data in the data file in clear form.

DETAILED DESCRIPTION—TERMINAL DATA SECURITY DEVICE

TERMINAL CLOCK

Figures 17, 18:
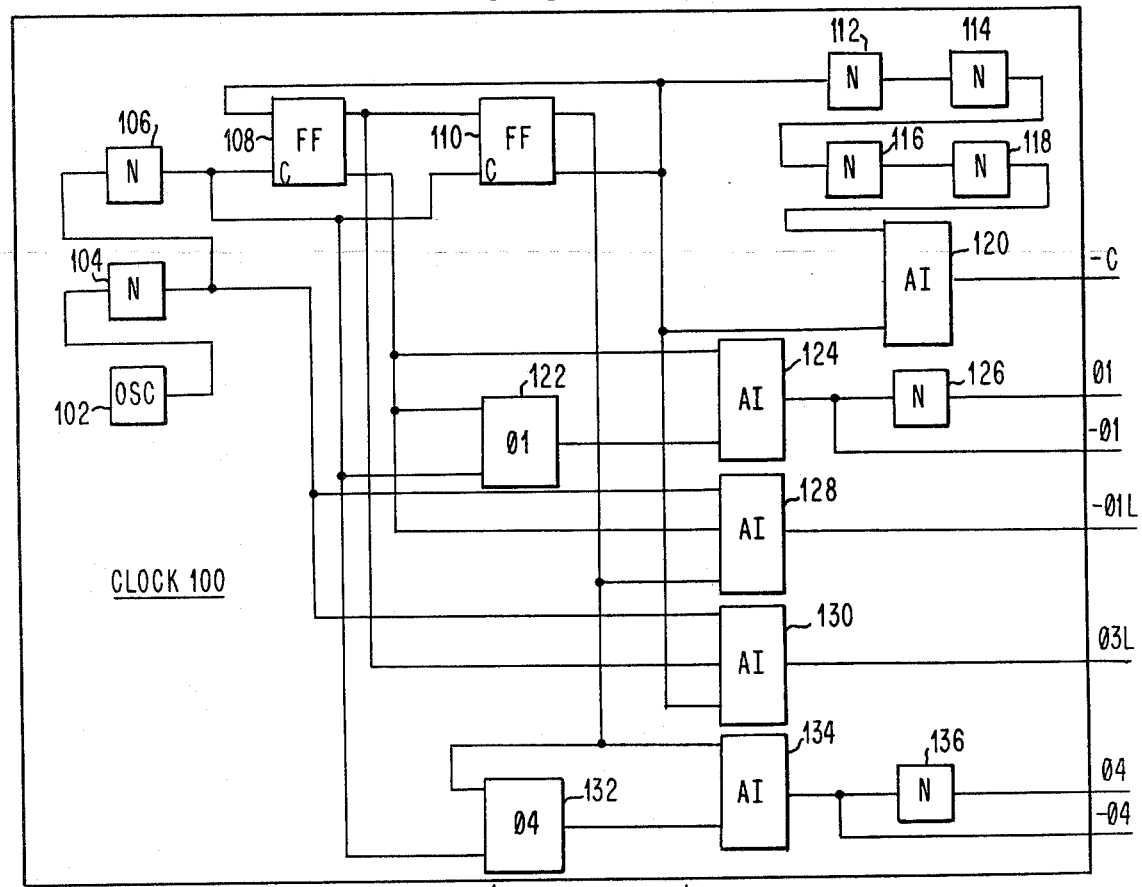
FIG. 17 illustrates the details of a clock circuit used in the data security device of the present invention.
FIG. 18 is a timing diagram explaining the operation of the clock circuit illustrated in FIG. 17.

Referring now to FIG. 17, there is shown the logic details of a clock pulse generator 100 used in the terminal of the present invention. The primary input is a square wave oscillator whose nominal repetition rate is 4 MHz, having approximately a 50% duty cycle. The oscillator 102 effectively drives a ring counter made up of two D-type flip-flops 108 and 110 which are used for controlling other logic circuits within the clock 100. The clock 100 produces a clock signal −C derived from the flip-flop 100 and additionally produces four basic clock pulses from a ring counter and the oscillator pulses on the phase 1, −phase 1, −phase 1 late, phase 3 late and phase 4 lines, each being nominally 125 ns in duration and having the relationships shown in FIG. 18.

More specifically, the flip-flops 108 and 110 are initially in an off state with the flip-flop 110 applying a positive signal to one input of the AND circuit 130 and to condition the flip-flop 108 for being turned on. The leading edge of a pulse from the oscillator 102 is applied via inverters 104 and 106 to turn on the flip-flop 108 which, in being turned on, applies a positive signal to a second input of the AND circuit 130 and to condition the flip-flop 110 for being turned on. At the trailing edge of the first oscillator pulse, a positive signal is applied from the inverter 104 to render the AND circuit 130 effective to apply a positive pulse on the ∅3L line having a 125 ns duration. The leading edge of the next oscillator pulse is applied via the inverters 104 and 106 to turn on the conditioned flip-flop 110 which, in being turned on, applies a positive signal to condition the AND invert circuit 134 and to turn on the ∅4 latch 132. The latch 132, in being turned on, applies a positive signal to render the AND invert circuit 134 effective to apply a negative pulse on the −∅4 line and, via inverter 136, a positive pulse on the ∅4 line, both pulses being of 125 ns duration. The flip-flop 110 in being turned on also applies a negative signal to condition the flip-flop 108 for being turned off and to render the AND invert circuit 120 effective to apply a positive signal to the −C line. The leading edge of the next oscillator pulse is effective via the inverters 104 and 106 to turn off the flip-flop 108 which, in being turned off, applies a positive signal to condition the AND invert circuit 124, to turn on the ∅1 latch 122 and to one input of the AND invert circuit 128 and also applied a negative signal to condition the flip-flop 110 for being turned off. The latch 122 in being turned on applies a positive signal to render the AND invert circuit 124 effective to apply a negative pulse to the ∅1 line and, via the inverter 126, a positive pulse to the ∅1 line, both being of 125 ns duration. The flip-flop 110 still being on applies a positive signal to a second input of the AND invert circuit 128. Accordingly, at the trailing edge of the third oscillator pulse, a positive signal is applied from inverter 104 to render the AND invert circuit 128 effective to apply a negative pulse on the ∅1L line having a duration of 125 ns. The trailing edge of the third oscillator pulse is also effective via the inverter 106 to apply a negative pulse to reset the latch 122. The leading edge of the fourth oscillator pulse is effective, via the inverters 104 and 106, to reset the flip-flop 110 which returns the ring counter back to its initial condition. The flip-flop 110 in being reset applies a positive signal to one input of the AND invert circuit 120 and after a delay provided by the inverters 112, 114, 116 and 118 to render the AND invert circit 120 effective to apply a negative signal on the −C line. At the end of the fourth oscillator cycle, the clock 100 is back at the initial condition to repeat the generation of the various clock pulses in successive phase times as shown in FIG. 18.

MANUAL WRITE MASTER KEY (WMK) OPERATION

The write master key operation consists of manually writing 16 half-bytes (4 bits) constituting the master key into the master key (MK) memory via 4 bit lines. Enable write (EW) and manual write (MW) switches are provided to initialize and control the 16 cycles needed for loading the individual half-bytes into the MK memory. Bit switches are also provided for producing the binary coded numbers 0 through F with all outputs being low for 0 and high for F. The master key is pre-generated, in a random manner, as 16 hexadecimal numbers to be written into the 16 locations of the MK memory. The following is a generalized step-by-step procedure of manually writing the master key into the MK memory.

Step 1: Set the EW switch to the on or enable write master key (EWMK) position.

Step 2: Press the MW switch once to reset the MK memory address counter to 0 and to overwrite the master key presently stored in the MK memory.

Step 3: Set the bit switches to the half-byte to be written into the MK memory location 0.

Step 4: Press the MW switch once.

Step 5: Set the bit switches to the next half-byte to be written into the next succeeding location of the MK memory.

Step 6: Press the MW push button once.

Steps 7-34: Repeat Steps 5 and 6 in succession until the last half-byte has been written into the last location of the MK memory.

Step 35: Set the EW switch to the off position.

At any time during the execution of this procedure, as when there is uncertainty that it has been correctly done, a restart can be accomplished by doing Step 35 and beginning again with Step 1.

Figure 20:
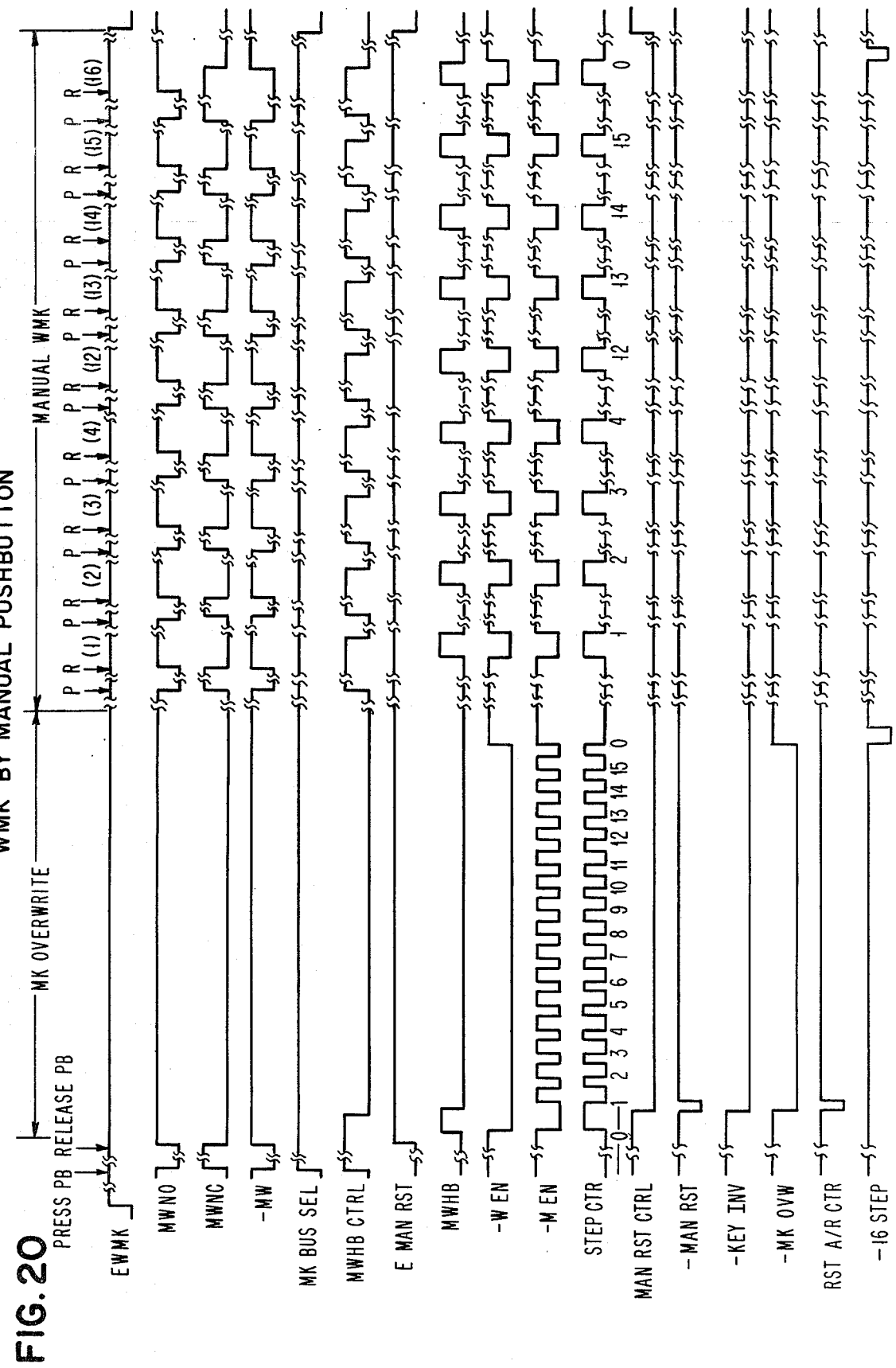
FIG. 20 is a timing diagram of the manual WMK operation.

Referring now to FIG. 19c1 and the timing diagram of FIG. 20, a more detailed description of the manual WMK operation will be given in the following. To initiate this operation, the Enable Write (EW) switch, which may be a SPDT switch activated by a physical key lock to prevent the key from being changed by unauthorized persons, is set to the ON position. Following this, the Manual Write (MW) switch, which may be a push-button switch, may be pressed to the MWNO position causing a negative pulse to be applied to turn on the MW latch 138. The latch 138 in being turned on applies a negative signal via the −MW line to turn on the MK BUS SELECT latch 140 and the manual write half byte (MWHB) control latch 154. The latch 140 in being turned on applies a positive signal to condition the AND circuits 164 in FIG. 19d1 for passing a half byte (4 bits) from the bit switches SW0-SW3. When the MW switch is released, it returns to the MWNC position causing a negative signal to be applied to reset the MW latch 138. The MW latch 138 in being reset applies a positive signal on the −MW line which together with the positive signal from the latch 140 renders the AND invert circuit 142 effective to apply a negative signal to turn on the ENABLE MAN RST latch 144. At ∅1 time of the next clock cycle, a ∅1 clock pulse together with the positive signal now on the −MW line and a positive signal from the latch 154 render the AND invert circuit 156 effective to apply a negative signal to the inverter 160 where it is inverted to a positive signal on the MWHB line. The positive signal on the MWHB line is applied to condition the AND invert circuits 152 and 158. The AND invert circuit 158 is effective to maintain the positive signal on the MWHB line until the next ∅1 time when a −∅1 clock pulse is applied to decondition the AND invert circuit 158 causing the positive signal on the MWHB line to be terminated thereby providing a 1 microsecond positive signal on the MWHB line. The AND invert circuit 152 is rendered effective by a ∅4 clock pulse in the present clock cycle for resetting the MWHB CTRL latch 154.

Referring now to FIG. 19c2, the positive signal on the MWHB line is inverted to a negative signal by inverter 162 to decondition the AND circuit 380 causing a negative signal to be applied to the −W ENABLE line and to decondition the AND inverter 376 which, in turn, applies a positive signal to the inverter 378 where it is inverted to a negative signal on the −M ENABLE line.

Signals on the −M ENABLE and −W ENABLE lines are used to enable the MK memory for writing and reading operations. The MK memory 700 shown in block form in FIGS. 19e1 and 19c2 is a 16 word by 4 bit CMOS random access memory (RAM) which is used for storing the master key. The MK memory 700 is addressed by a 4-bit value on the address lines −ADR1, −ADR2, −ADR3 and −ADR4 from the setting of the address counter 390 in FIG. 19d2. When negative signals are applied to both the −W ENABLE and −M ENABLE lines, the information present on the 4 bit input lines 0, 1, 2 and 3 is written into the MK memory 700 at the designated address. A transistor switch 139 is provided in series with the −W ENABLE line to control writing into the MK memory 700. The potential at the base of this switch is controlled by the setting of the EW switch. Accordingly, when the EW switch is set on and a negative signal is applied to the −W ENABLE line, the transistor 139 is turned on to produce a negative signal on the −W ENABLE line to enable writing into the MK memory 700 whereas when the EW switch is set OFF the transistor switch 139 is biased off causing a positive signal to be maintained on the −W ENABLE line to prevent writing into the MK memory 700. Addressing of the MK memory 700 for reading is accomplished in the same manner as that for writing. When a positive signal is applied to the −W ENABLE line and a negative signal is applied to the −M ENABLE line, the information which was written into the designated address of the MK memory 700 is read out in inverted form to the 4 bit output lines of the MK memory 700 and applied to a buffer register consisting of the 4 shift registers 702.

Referring now to FIGS. 19c1 and 19c2, during ∅3 time, a positive ∅3L clock pulse together with positive signals from the latches 144 and 146 render the AND invert circuit 148 effective to apply a negative signal to turn on the MAN RST latch 150 which remains set until the next clock cycle when a −∅1L clock pulse is applied to reset latch 150 thereby providing a negative signal on the MAN RST line from ∅3L time to ∅1L time. The MAN RST latch 150 in being turned on applies a negative signal via the −MAN RST line to reset the latch 146, to decondition the AND circuit 382, and to turn on the master key overwrite (MK OVW) latch 276 and the KEY INVALID latch 278 in FIG. 19c3. The AND circuit 382 in being deconditioned is effective to apply a negative signal to the reset inputs of the address counter 390 resetting the counter to an address of 0. The latch 276 in being set applies a negative signal on the −MK OVW line to decondition the AND circuit 380 to maintain a negative signal on the −W ENABLE line during the entire period of the master key overwrite operation. The negative signal on the −MK OVW line is also applied to decondition the AND invert circuit 368 which, in turn, applies a positive signal to condition the AND invert circuits 370 and 374 during the entire period of the MK overwrite operation. Referring now to FIG. 19c1, at ∅1 time of the next clock cycle, a ∅1 clock pulse is applied to decondition the AND invert circuit 158 and apply a positive signal to the inverter 160 where it is inverted to a negative signal on the MWHB line which is maintained thereon for the balance of the overwrite operation. The negative signal is inverted to a positive signal and applied to one input of the AND invert circuit 376. However, at this time, namely, ∅1 time, positive signals are maintained at the inputs to the AND invert circuit 374 which is therefore effective to apply a negative signal to the other input of the AND invert circuit 376 to maintain the AND invert circuit 376 deconditioned despite the signal change on the MWHB line. As a result, the AND invert circuit 376 maintains a positive signal output therefrom until ∅1L time when the −∅1L clock pulse is applied to decondition the AND invert circuit 374 causing a positive signal to be applied to the AND invert circuit 376. Therefore, at this ∅1 time, the AND invert circuit 376 is rendered effective to apply a negative signal to the STEP CTR line and to the inverter 278 where it is inverted to a positive signal on the −M ENABLE line.

It should be apparent that from the time the address counter 390 is reset to address 0, namely, at ∅3L time, until the present ∅1L time negative signals are maintained on both the −W ENABLE and −M ENABLE lines to allow a 4 bit value to be written into the MK Memory 700 at address 0. Referring now to FIG. 19d1, whatever the bit switches SW0 to SW3 happen to be set at are applied as a half byte value via the conditioned AND circuits 164 and OR invert circuits 168 to the bit inputs of the MK memory 700. For example, if the bit switch SW0 is set to the 1 position, a positive signal is applied to render the AND circuit 164a effective to apply a positive signal to the OR invert circuit 168a which, in turn, applies a negative signal as a 1 bit input to the MK memory 700. If the bit switch SW0 is set to the 0 position then a positive signal is applied as a 0 bit input to the MK memory 700.

Returning now to FIGS. 19c2 and 19d2, the negative signal applied to the −STEP CTR line, at ∅1L time, is inverted by inverter 388 to a positive signal and applied via the STEP CTR line to step the address counter to an address count of 1 in preparation for writing the half byte value setting of switches SW0 to SW3 into the next location of the MK memory 700. AND invert circuits 374 and 376 are connected in a latching arrangement such that the negative signal output of the AND invert circuit 376 is effective to maintain the AND invert circuit 374 deconditioned after termination of the −∅1L clock pulse and thereby maintain a positive signal input to the AND invert circuit 376 which together with the positive signal from the inverter 162 (due to the negative signal now maintained on the MWHB line) maintain the AND invert circuit 376 effective to maintain a negative signal output thereof (and a positive signal on the −M ENABLE line). This condition will be maintained until ∅1L time, when a ∅3L clock pulse is applied to render the AND invert circuit 370 effective to apply a negative signal to now decondition the AND invert circuit 376. The AND invert circuit 376 in being deconditioned applies a positive signal to the inverter 378 where it is inverted to a negative signal on the −M ENABLE line. The positive signal output of the AND invert circuit 376 will be operative in the latching arrangement of AND invert circuits 374 and 376 to maintain this signal output until ∅1L time of the next clock cycle when the −∅1L clock pulse is applied to decondition the AND invert circuit 374. Accordingly, a negative signal will be maintained on the −M ENABLE line from ∅3L time of the present clock cycle which together with the negative signal maintained on the −W ENABLE line, due to the AND circuit 380 being maintained deconditioned by the MK OVW latch 276, allows writing of the half byte value setting of the switches SW0 to SW3 into the MK Memory 700 at address 1.

In a similar manner, each succeeding ∅1L clock pulse will be effective to control stepping of the address counter 290 to the next address of the MK memory 700 and each succeeding ∅3L clock pulse will be effective to control writing the half byte value setting of the switches SW0 to SW3 into the MK memory 700 at the next address. After 16 such operations, the master key previously stored in the MK memory 700 will have been overwritten. Disclosure of the master key through unauthorized writing of trial half bytes into the MK memory 700 is thwarted by this overwriting operation of the previously stored master key when the MW switch is first pressed.

Referring now to FIG. 19d2, when the address counter 390 steps to a count of 15 ( the 16th location in MK memory 700) a negative signal from the −C8 output is applied to set the 16 STEP latch 404 which, in being set, applies a positive signal to condition the AND circuit 406. After the 16th half byte is written into the MK memory 700, the address counter 390 is again stepped, at ∅1L time, back to an address count of 0 and a positive signal is applied via the −C8 output to render the AND circuit 406 effective to apply a positive signal to the inverter 408 where it is inverted to a negative signal on the −16 STEP line. The negative signal on the −16 STEP line is applied to reset the MK OVW latch 276 in FIG. 19c2 which, in being reset, applies a positive signal via the −MK OVW line to render the AND circuit 380 effective to apply a positive signal to the −W ENABLE line thereby inhibiting further writing into the MK memory 700. The positive signal on the −MK OVW line is also applied to render the AND invert circuit 368 effective to apply a negative signal to decondition the AND invert circuits 370 and 374 so that the −∅1L and ∅3L clock pulses will have no further effect. The jointly deconditioned AND invert circuits 370 and 374 will jointly apply a positive conditioning signal to one input of the AND invert circuit 376.

This completes the master key overwrite operation and the terminal operator may now proceed to load the new master key into the MK memory 700 a half byte at a time, for 16 times, in order to completely load the 64 bit master key into the MK memory 700. Referring to FIGS. 19c1 and 19d1 the terminal operator sets the switches SW0 to SW3 according to the first half byte of the master key to be loaded. Following this, the MW switch set to the MWNO position causing a negative pulse to be applied to turn on the MW latch 138. The MW latch 138 in being turned on applies a negative signal via the −MW line to set the MWHB CTRL latch 154 which, in being set, applies a positive signal to one input of the AND invert circuit 156. When the MW switch is released to the MWNC position, a negative signal is applied to reset the MW latch 138 which, in being reset, applies a positive signal to a second input of the AND invert circuit 156. Therefore, at ∅1 time of the next clock cycle, a ∅1 clock pulse is applied to render the AND invert circuit 156 effective to apply a negative signal to the inverter 160 where it is inverted to a positive signal on the MWHB line. The positive signal on the MWHB line is applied to the inverter 162 in FIG. 19c2 where it is inverted to a negative signal and applied to decondition the AND circuit 380 which, in turn, applies a negative signal to the −W ENABLE line. The negative signal from the inverter 162 is also applied to decondition the AND invert circuit 376 which, in turn, applies a positive signal to the inverter 378 where it is inverted to a negative signal on the −M ENABLE line. The combination of negative signals on the −W ENABLE and −M ENABLE lines permits the first half byte of the new master key to be passed via the AND circuits 164 in FIG. 19d1 and the OR invert circuits 168 to be loaded into the MK memory 700 at location 0. Referring now to FIG. 19c1, at ⌀4 time, a ⌀4 clock pulse in combination with the positive signal on the MWHB line renders the AND invert circuit 152 effective to apply a negative signal to reset the MWHB CTRL latch 154 which, in being reset, applies a negative signal to decondition the AND invert circuit 156. At ⌀1 time of the next clock cycle, a −⌀1 clock pulse is applied to decondition the AND invert circuit 158 which, in turn, applies a positive signal to the inverter 160 where it is inverted to a negative signal on the MWHB line. The negative signal on the MWHB line is applied to the inverter 162 in FIG. 19c2 where it is inverted to a positive signal to render the AND circuit 380 effective to apply a positive signal to the −W ENABLE line to terminate the writing operation into the MK memory 700. The positive signal from the inverter 162 is also applied to render the AND invert circuit 376, conditioned by the positive signal output from the AND invert circuits 370 and 374, effective to apply a negative signal via the −STEP CTR line to the inverter 378 where it is inverted to a positive signal on the −M ENABLE line. The negative signal on the −STEP CTR line is also inverted by inverter 388 in FIG. 19d2 to a positive signal to step the address counter 390 to an address count of 1 in preparation for writing into the next location of the MK memory 700. Referring now to FIG. 19d1, the bit switches SW0 to SW3 are now set in accordance with the second half byte of the master key for loading into the MK memory 700. The MW switch is again set and the circuitry operates in the same manner as described above with respect to writing the first half byte for writing the next half byte of the new master key and stepping the address counter 390 to the next address. This operation is repeated for a total of 16 times in order to write the 16 half bytes of the master key into the MK memory 700.

After the last half byte of the new master key is loaded into the MK memory 700, the EW switch in FIG. 19c1 is switched off to terminate the manual write operation. The EW switch in being turned off applies a negative signal to reset the MK BUS SELECT latch 140 and to reset the ENABLE MAN RESET latch 144 which, in being reset, applies a negative signal to set the MAN RST CTRL latch 146 in preparation for the next time a manual write master key operation is to be performed.

ADDRESS DECODING AND SELECTION

Referring now to FIGS. 19a1 and 19a2, when an IO operation is to be performed, a negative signal is applied to the −IO tag line. The convention to be used in the following descriptions are that all lines are down level active i.e. the active state is the presence of a negative signal and, in the case of data, a 1 bit is represented as a negative signal and a 0 bit as a positive signal. Information is received by the DSD on a −DATA BUS OUT and may include address information, command information or data to be processed. Tag signals are used as control signals to identify the nature of the information being provided on the Data Bus. Thus, when an address is placed on the −DATA BUS OUT, a −TA signal is provided on the −TA tag line to identify the information as being address information, when a command is placed on the bus, a −TC signal is provided on the −TC tag line to identify the information as being a command and when data is placed on the bus, a −TD signal is provided on the −TD tag line to identify the information as being data. The −IO signal is inverted to a positive signal by the inverter 182 and applied to one input of the AND invert circuit 190. At TA time, address information is received on the −DATA BUS OUT and a −TA signal is applied to the inverter 184 where it is inverted to a positive signal and applied as a second input to the AND invert circuit 190.

The data security device can be personalized to be responsive to any one of 40 possible addresses. This is accomplished by jumpering each of the 3 pins, J5, J6 and J7 to either ground or +5 v, and by jumpering one pin JU to any one of five others J0, J1, J2, J3 or J4. In the example shown, the wiring is such that the DSD responds to the address 1xxxx010. The 8 bit address is passed via the inverters 170 to the parity generator 178 which generates a parity bit which is compared with the parity bit received with the address. If the generated parity bit is equal to the received parity bit a positive signal is applied via the PARITY GOOD line to a third input of the AND invert circuit 190. Additionally, the personalized bits from the jumpers J5, J6 and J7 are compared with the inverted incoming bits on lines 5, 6 and 7 by the exclusive OR and inverter combinations 172 and 174 which produce positive signal inputs to the AND circuit 176 if a match is found. The personalized bit on the JU jumper is applied as the remaining positive input to render the AND circuit 176 effective for applying a positive signal to the remaining input of the AND invert circuit 190. Accordingly, if the personalized address having good parity has been detected, then the AND invert circuit 190 is rendered effective to apply a negative signal to set the SEL latch 192 and to decondition the AND circuit 216 in FIG. 19b1 which, in turn, produces a −VALID B signal indicating a valid address byte presentation. The SEL latch 192 remains set throughout the I/O operation unless reset subsequently by the occasion of a command error which will be described hereafter. The SEL latch 192, in being set, applies a positive signal via the SEL line to condition the AND invert circuits 204, 206 and 208. Referring now to FIG. 19a1, at the end of TA time, a positive signal is applied to the −TA line which is inverted to a negative signal by inverter 184 to decondition the AND invert circuit 190. Accordingly, AND invert circuit 190 applies a positive signal to render AND circuit 216 effective to terminate the negative signal on the −VALID B line.

COMMAND DECODING

At TC time, command information is received on the −DATA BUS OUT and a −TC signal is provided to indicate this condition. The low order command bit (bit 7) specifies the direction of the data transfer, i.e., whether the I/O operation is a read (bit 7=1) or a write (bit 7=0) operation. Referring now to FIG. 19a2, the I/O command byte is passed via the inverters 170 to the AND invert circuits 222 and to the parity generator 178 where a parity bit is generated and compared with the parity bit provided with the command byte by the exclusive or 180. If the parity bit generated by the parity generator 178 is equal to the parity bit associated with the command byte then the exclusive OR 180 provides a positive signal on the PARITY GOOD line as a second input to the AND invert circuit 206. The −TC signal is inverted by the inverter 188 to a positive TC signal and applied to the remaining inputs of the AND invert circuits 206 and 209. The AND invert circuit 206 is rendered effective to apply a negative signal via −TC SEL line to the inverter 214 and to decondition the AND circuit 216. The AND circuit 216 in being deconditioned applies a −VALID B signal to indicate that a valid command byte has been received. The inverter 214 inverts the negative signal to a positive signal on the TC SEL line which is applied to procedural error circuitry, which will be described hereafter, and to the other inputs of the AND invert circuits 222 in FIG. 19a2 to allow the I/O command byte to be loaded into the command register 224. The positive signal on the TC line in combination with the positive signal on the SEL line render the AND invert circuit 208, in FIG. 19b1, effective to apply a negative signal to set the TC END latch 210 which in being set, applies a positive signal to condition the AND circuit 218.

Referring now to FIGS. 19b2 and 19b3, the command and order codes of the command byte stored in the command register 224 during TC time are decoded by a series of AND invert circuits. Bits 4, 5 6, and 7 are decoded to produce one of the seven defined commands described in the section DSD COMMANDS AND ORDERS. Thus, the AND invert circuit 226 decodes the PIOW data command (PIOW), the AND invert circuit 232 decodes the set basic status command (SET BS), the AND invert circuit 238 decodes the reset basic status command (RST BS), the AND invert circuit 242 decodes the read basic status command (RD BS), the AND invert circuit 250 decodes the reset adapter command (RST), the AND invert circuit 262 decodes the PIOR data command (PIOR) and the AND invert circuit 266 decodes the write DSD order command (WR DSD). Detailed description of the operation of these commands will be provided hereafter.

In addition to the command code provided by bits 4, 5, 6 and 7 an order code WXYZ is provided by the other four bits, namely, bits 0, 1, 2 and 3 if the command is a WR DSD command. Thus, bits 0, 1, 2 and 3 of the order code are decoded to produce one of the three previously defined cipher handling orders or one of the two previously defined data processing orders. Accordingly, the AND invert circuit 280 decodes a portion of the cipher key handling orders for write master key (WMK) and load key direct (LKD), the AND invert circuit 288 decodes the cipher key handling order decipher key (DECK) and the AND invert circuit 302 decodes a portion of the data processing orders for encipher (ENC) and decipher (DEC). Detailed description of the operation of these orders will be provided hereafter.

Referring now to FIG. 19a1, at the end of TC time, a positive signal is applied to the −TC tag line which is inverted to a negative signal by the inverter 188 and applied via the TC line to decondition the AND invert circuits 206 and 208. Accordingly, deconditioned AND invert circuit 206 applies a positive signal to render AND circuit 216 effective to terminate the negative signal on the −VALID B line. The positive signal from deconditioned AND invert circuit 206 is also applied to inverter 214 where it is inverted to a negative signal on the TC SEL line and applied to the procedural error circuitry and to decondition the AND invert circuits 222 associated with the command register 224 in FIG. 19a2. The deconditioned AND invert circuit 208 applies a positive signal to render the AND circuit 218 conditioned by the positive signal ouput of the TC End latch 210, effective to apply a positive signal on the TC END line. If bit 7 of the decoded command code is a 1, indicating a read operation, then positive signals on the bit 7 line and the TC END line are applied to render the AND invert circuit 220 effective to produce a −P Valid signal to indicate that the parity of the data byte to be subsequently presented to the −DATA BUS IN is valid. This is so because the DSD always provides correct parity for data bytes it applies to the −DATA BUS IN for read type commands. The positive signal on the TC END line is also applied, in FIG. 19b2, to the inverter 244, AND circuit 254, inverter 258 to control the operation of the READ BS, RST and PIOR commands, respectively, and to AND invert circuit 356 in FIG. 19c4 to control the command error detection, all of which will be described in greater detail hereafter.

COMMAND ERROR DETECTION

Referring now to FIGS. 19b3 and 19c4 if one of the legal commands has been decoded, then a negative signal is applied to decondition either AND circuit 350 or AND invert circuit 352 to apply a positive signal to the LEGAL CMD line. The positive signal on the LEGAL CMD line is inverted by inverter 354 to a negative signal which is applied via the NO LEGAL CMD line to decondition the AND invert circuit 356. The AND invert circuit 356 in being deconditioned applies a positive signal which has no effect on the CMD ERR latch 358. On the other hand, if none of the legal commands are decoded, then the AND invert circuit 352 is rendered effective to apply a negative signal to the inverter 354 where it is inverted to a positive signal and applied via the NO LEGAL CMD line to condition the AND invert circuit 356. At the end of TC time, the positive signal on the TC END line is applied to render the AND invert circuit 356 effective to apply a negative signal to set the CMD ERR latch 358 which in being set, applies a negative signal via the −CMD ERR line to reset the SEL latch 192 in FIG. 19a1 thereby deselecting the DSD due to the command error. Referring now to FIG. 19i2, the negative signal on the −CMD ERR line is also applied to set the machine check bit latch 954 E (bit 5) of the status register 952.

SYNC TD

At TD time, a −TD signal is provided to indicate that a data byte is present on the −DATA BUS OUT or that a data byte is on the −DATA BUS IN depending upon whether a write or read operation is to be performed. Additionally, because the clock 100 may run asynchronously with respect to the processor, it is necessary to provide a special timing signal for use during certain operations, this signal being called the SYNC TD signal. This signal begins at ∅1 time of a clock cycle coinciding with or following the beginning of a TD time and lasts until ∅1 time of the next clock cycle. It then remains inoperative until the next occurring TD time.

Referring now to FIG. 19a1, at TD time, the −TD signal is applied to the inverter 186 where it is inverted to a positive TD signal and applied in combination with a positive signal from the SYNCH latch 196 to condition the AND invert circuit 198. At ∅1 time, a ∅1 clock pulse is applied to render the AND invert circuit 198 effective to apply a negative signal to the inverter 202 where it is inverted to a positive signal on the SYNCH TD line. At ∅4 time, a ∅4 clock pulse in combination with the positive signal on the SYNCH TD line render the AND invert circuit 194 effective to apply a negative signal to reset the SYNCH latch 196. At ∅1 time of the next clock cycle, a −∅1 signal is applied to decondition the AND invert circuit 200 causing a positive signal to be applied to the inverter 202 to terminate the positive signal on the SYNCH TD line, the positive signal having been present for a 1 usec clock cycle period. The positive signal on the SYNCH TD line is used to synchronize the PIOW data and WR DSD commands as will be described in greater detail hereafter.

Referring now to FIGS. 19a1 and 19b1, if the SEL latch 192 has not been reset by a command error, then positive signals on the SEL and TD lines are applied to render the AND invert circuit 204 effective to apply a negative signal via the −TD SEL line to the inverter 212 and to decondition the AND circuit 216 causing a −VALID B signal to be produced indicating that the DSD was selected and a legal command was decoded. The inverter 212 inverts the negative signal to a positive signal on the TD SEL line which is used to determine whether there was a crypto engine data error during the execution of a PIOR Data command which will be described in greater detail hereafter and for controlling write error detection which will be described in the next section.

Referring now to FIG. 19a1, at the end of TD time, a positive signal is applied to the −TD tag line which is inverted to a negative signal by the inverter 186 and applied via the TD line to decondition the AND invert circuit 204. The AND invert circuit 204 in being deconditioned causes a positive signal to be applied to the −TD SEL line which, in turn, is applied to the inverter 212 and to render the AND circuit effective to terminate the negative signal on the −VALID B line. The inverter 212 inverts the positive signal to a negative signal on the TD SEL line which is applied to decondition the engine error circuitry in FIG. 19h3, to control circuitry in FIG. 19b2 for terminating the operation of the SET BS or RST BS commands and to decondition the write error circuitry in FIG. 19b3.

Following the end of TD time, the IO operation ends and a positive signal is applied via the −IO tag line to the inverter 182 where it is inverted to a negative signal to reset the SEL latch 192 and the WR ERR latch 364 in FIG. 19c4. The SEL latch 192 in being reset applies a negative signal to reset the command register 224 in FIG. 19a2 to reset the TC END latch 210 which, in being reset, applies a negative signal to decondition the AND circuit 218 thereby terminating the positive signal on the TC END line. The deconditioned AND circuit 218 causes a negative signal to be applied via the TC END line to decondition the AND invert circuit 220 thereby terminating the negative signal on the −P Valid line. The command register 224 in being reset deconditions all of the decoder circuitry in FIGS. 19b2 and 19b3.

WRITE ERROR DETECTION

Referring now to FIGS. 19b3 and 19c4, if a legal command has been decoded, indicated by a positive signal on the LEGAL CMD line, and the command is of the write type, indicated by a positive signal on the −7 line, and if the data byte on the BUS IN has bad parity, indicated by a positive signal on the PARITY BAD line, then, at TD time, the positive signal on the TD SEL line is applied to render the AND invert circuit 362 effective to apply a negative signal to set the WR ERR latch 364. This latch will remain set for the duration of the IO operation or until the end of TD time for a RST command. The WR ERR latch 364 in being set applies a positive signal to set the status bit 3 latch 954D in the status register 952 in FIG. 19i2 to record the fact that a write error was detected.

ILLEGAL ORDER

If the DSD has been properly addressed and selected and if the command byte specifies an order code not recognized by the DSD, then this condition will be detected and the status bits 0 and 2 of the status register set to indicate this illegal order condition. More specifically, referring to FIG. 19b2, if a WR DSD command is decoded by the AND invert circuit 266, a negative signal is applied to the inverter 268 where it is inverted to a positive signal and applied via the WR DSD ORDER line to condition the AND circuit 270. At TD time, the positive signal on the SYNCH TD line is applied to render the AND circuit 270 effective to apply a positive signal via the WR ORD TIME line to one input of the AND invert circuit 348 in FIG. 19b3. The other inputs to the AND invert circuit 348 are the legal order codes recognized by the DSD. If none of these order codes occur, then positive signals are applied to the remaining inputs of the AND invert circuit 348 rendering it effective to apply a negative signal via the minus ILG ORD line to set the status bit 0 and 2 latches 954a and 954c of the status register 952 in FIG. 19i2.

WRITE MASTER KEY ORDER OPERATION

A general description of this operation will first be given followed by a more detailed description. Provided that the EW switch has been previously set to the on position, three latches are set when this order is decoded, namely, the WMK latch 274 in FIG. 19c3, the key invalid latch 278 and the master key overwrite latch (MW OVW) 276 in FIG. 19c2. The master key overwriting function, which is provided to destroy the previously stored contents of the MK memory 700, is accomplished by activating the write enable line, pulsing the memory enable line and stepping the address counter 390 in FIG. 19b2. Whatever happens to be present as bits 0, 1, 2 and 3 on the BUS IN will be written into the MK memory in all locations. The MK OVW latch 276 remains set for 16 microseconds and is reset after the 16th MK memory location has been overwritten. Thereafter, the actual master key is written with bits 0, 1, 2 and 3 from the data fields in a series of 16 PIOW data commands with one microsecond write enable and memory enable signals being provided for each SYNCH TD time. The address counter 390 is stepped at the conclusion of each pulse. There is no automatic termination of the write master key order. After the 16th half bit has written into the MK memory 700, a RST command must be issued to reset the WMK latch 274 and regardless of whether the operation is under terminal control or manual control the EW switch must be set to the off position. The key invalid latch 278 is left set and no data can be processed until after a valid key is installed in the crypto engines by either a LKD or DECK order. If the WMK order is issued while the EW switch is set in the off position, there is no action other than recording a procedural error. The WMK order is performed infrequently and is done only under physically secure conditions, as the master key appears in clear form in the machine at this time.

A more detailed description of the write master key order operation will now be given and should be followed in conjunction with the timing diagram of FIG. 21. After address selection at TA time and loading of the WR DSD command register 224 at TC time, the command code is decoded by the AND inverter circuit 266 in FIG. 19b2 to produce a negative signal which is inverted to a positive signal by the inverter 268 on the WR DSD ORDER line thereby indicating the presence of a WR DSD order command. The positive signal on the WR DSD ORDER line is applied to condition the AND circuit 270. At the same time, a portion of the order code is decoded by the AND invert circuit 280 to apply a negative signal via the −(WMK+LKD) DEC line to the inverter 282 where it is inverted to a positive signal and applied via the WMK+LKD line to one input of the AND invert circuit 272. A positive signal on the −Y line personalizes this order as a WMK order and is applied to a second input of the AND invert circuit 272. Referring now to FIG. 19c1, the EW switch will have previously been set to the on position, thereby permitting a positive signal from the +5V source to be applied as a third input to the AND invert circuit 272 in FIG. 19b2. At TD time, a positive signal is applied via the SYNCH TD line to render the conditioned AND circuit 270 effective to apply a positive signal via the WR ORD TIME line to the remaining input of the AND invert circuit 272. Accordingly, the AND invert circuit 272 is rendered effective to apply a negative signal via the −SET WMK line to set the WMK latch 274 in FIG. 19c3 and to set the MK OVW 276 in FIG. 19c2. The MK OVW latch 276 in being set applies a negative signal via the −MK OVW line to decondition the AND circuit 380 and the AND invert circuit 368. The deconditioned AND circuit 380 applies a negative signal to the −W ENABLE line to prepare the MK memory 700 for a writing operation. The AND invert circuit 368 in being deconditioned applies a positive signal to condition the AND invert circuit 370 and 374, in a manner as previously described in the manual WMK operation, for producing the successive signals on the −M ENABLE line during the memory overwrite operation. The WMK latch 274 remains set for the remainder of this operation and applies a positive signal to the WMK line and a negative signal to the −WMK line. The positive signal on the WMK line is applied to condition the AND invert circuit 366 in FIG. 19c2 in preparation for writing the new master key into the MK memory 700. The negative signal on the −WMK line is applied to set the KEY INVALID latch 278 which remains set for the remainder of this operation and will be reset only after a valid key is installed in the crypto engines by either a LKD or DECK order, either of which will cause a reset of this latch. The negative signal on the −WMK line is also applied to decondition the AND invert circuit 298 in FIG. 19c4 causing a positive signal to be applied to the K ORD line and via inverter 300 a negative signal to the −K ORD indicating that a key order operation is being performed.

Referring now to FIG. 19c2, a ∅3L time, a ∅3L clock pulse is applied to render the AND invert circuit 370 effective to apply a negative signal to decondition the AND invert circuit 376 which, in turn, applies a positive signal which is inverted by the inverter 378 to a negative signal on the −M ENABLE line. Accordingly, the presence of negative signals on the −W ENABLE and −M ENABLE lines enables the MK memory 700 for a write operation. Referring now to FIG. 19c1, since the MW switch has not operated, the MW latch 138 remains reset and likewise the MK BUS SELECT latch 140. The MK BUS SELECT latch 140 in being in a reset state applies a positive signal to condition the AND circuits 166 and a negative signal to decondition the AND circuits 164 in FIG. 19d1. In this case, the half byte value is not taken from the manual switches SW0 to SW3 but rather from whatever happens to be present on the bits 0, 1, 2 and 3 line of the BUS IN which will now be written into location 0 of the MK memory 700. Referring now to FIG. 19c2, the positive signal produced by the AND invert circuit 376 is applied to the AND invert circuit 374 the other inputs of which have positive signals maintained thereon at this time causing a negative signal to be applied to the AND invert circuit 376 to maintain the positive signal output thereof until ∅1L time of the next clock cycle. At that time, a −∅1L clock pulse is applied to decondition the AND invert circuit 374 which, in turn, applies a positive signal to render the AND circuit 376 effective to apply a negative signal to the −STEP CTR line and to the inverter 378 where it is inverted into a positive signal on the −M ENABLE line. The negative signal on the −STEP CTR line is inverted by the inverter 388 in FIG. 19d2 to a positive signal which is applied via the −STEP CTR line to step the address counter 390 to an address count of 1 indicating the next location of the MK memory 700. In a similar manner each successive ∅3L clock pulse is effective to control the application of a negative signal on the −M ENABLE line to permit half byte value on the BUS IN to be written into and overwrite the previous master key half byte at that location and each succeeding −∅1L clock pulse is effective to control the termination of the negative signal on the −M ENABLE line and to step the address counter 390 to the next location as previously described in connection with the manual write master key operation. Similarly, when a count of 16 is reached and the address counter 390 returns to an address count of 0, the negative signal on the −16 STEP line is applied to reset the MK OVW latch 276 to thereby terminate the MK overwrite operation.

Following the end of the MK overwrite operation, the first of 16 PIOW data commands is provided to the DSD. After address selection during the TA time and loading of the command byte in the command register during TC time, in a manner previously described, the AND invert circuit 226 in FIG. 19b2 decodes this command and applies a negative signal via the −PIOW DATA DEC line to one input of the OR invert circuit 230. At TD time, a positive signal on the SYNCH TD line is inverted by the inverter 228 to a negative signal to the other input of the OR invert circuit 230 which, in turn, applies a positive signal to the PIOW DATA line. The positive signal on the PIOW DATA line is applied to the AND invert circuit 366 in FIG. 19c2 which in combination with the positive signal on the WMK line renders the AND invert circuit 366 effective to apply a negative signal to decondition the AND circuit 380 and the AND invert 376 for the period of the SYNC TD pulse. The AND circuit 380 in being deconditioned applies a negative signal to the −W ENABLE line. The AND invert circuit 376 in being deconditioned applies a positive signal which is inverted by inverter 378 to a negative signal on the −M ENABLE line. The combination of negative signals on the −W ENABLE and −M ENABLE lines permit the bits 0, 1, 2 and 3 of the data field associated with the PIOW command, which is the first half byte of the new master key, to be written into location 0 of the MK memory 700. At the end of SYNC TD time, a negative signal is applied to the SYNC TD line which is inverted by inverter 228 in FIG. 19b2 to a positive signal which renders the AND invert circuit 230 effective to apply a negative signal via the PIOW DATA line to decondition the AND invert circuit 366 in FIG. 19c2. Accordingly, AND invert circuit 366, in being deconditioned, applies a positive signal to condition the AND circuit 380 and the AND invert circuit 376. The AND circuit 380 in being conditioned applies a positive signal on the −W ENABLE line while the AND invert circuit 376 in being conditioned applies a negative signal to the −STEP CTR line and is inverted by the inverter 378 to a positive signal on the −M ENABLE line. The positive signals on the −W ENABLE AND −M ENABLE lines inhibit further writing operations into the MK memory 700. The negative signal on the −STEP CTR line is inverted by inverter 388 in FIG. 19d2 to a positive signal on the STEP CTR line to step the address counter 390 to an address count of 1 representing the next address for the MK memory 700. In a similar manner, succeeding negative signals on the −W ENABLE and −M ENABLE lines are provided for succeeding SYNC TD times to write the succeeding half bytes of the new master key into the MK memory 700 with the address counter 390 being stepped at the conclusion of each succeeding SYNC TD signal.

After the sixteenth half-byte value has been written into the MK memory 700, the WMK order operation is completed by setting the EW switch in FIG. 19c1 to the off position which, in turn, causes a negative signal to be applied to decondition the AND invert circuit 272 in FIG. 19b2 and inhibit the performance of any subsequent WMK order operation so long as the EW switch remains off. This concludes the description of the WMK order operation. However, it should be noted that the WMK latch 274 in FIG. 19c3 remains set until such time as a RST command is issued to reset this latch and that the KEY INVALID latch 278 also remains set and no data can be processed until after a valid key is installed in the crypto engine by either a LKD or DECK order as will be described in greater detail hereafter.

RESET ADAPTER COMMAND OPERATION

The execution of this command causes a RST signal to be created from the end of TC time until the end of I/O operation. This signal is used to reset all counters, flip-flops and latches in the adapter and control section. Nothing in the crypto engines are reset and the data field associated with this command is ignored. The same reset signal can also be created by a discrete reset signal on the −RESET line from the I/O interface.

A more detailed description of the reset adapter command operation will now be given in conjunction with the timing diagram in FIG. 21. After the address selection is performed during TA time and the command byte is loaded into the command register during the TC time, as previously described, the AND invert circuit 250 in FIG. 19b2 decodes the RST command code and produces a negative signal which is applied to the inverter 252 where it is inverted to a positive signal and applied to one input of the AND circuit 254. At TC time, a positive signal on the TC END line is applied to render the AND circuit 254 effective to apply a positive signal to the OR invert circuit 256 which, in turn, applies a negative signal on the RST line. A similar operation may be initiated by a discrete negative signal on the −RESET line from the I/O interface in FIG. 19a2 which is inverted by the inverter 248 to apply a positive signal to the OR invert circuit 256 which, in turn, applies a negative signal to the −RST line. As mentioned above, this signal is used to reset all counters, flip-flops and latches in the adapter and control sections that are not automatically reset by the clock 100 or tag signals. If this command is issued after a WMK order command, then the negative signal on the −RST line is applied to reset the WMK latch 274 which, in being reset, applies a positive signal on the −WMK line to render the AND invert circuit 298 in FIG. 19c5 effective to apply a negative signal on the K ORD line and via the inverter 300 a positive signal on the −K ORD line.

INPUT/OUTPUT MANAGEMENT AND CONTROLS

Before proceeding to various order commands which involve the use of the crypto engine, a description will be given of the I/O management technique used in the DSD as well as some of the major controls used in such management. Referring now to FIGS. 19f1 and 19g1, one of the crypto engines is shown in block form and includes a 64-bit input/output buffer register divided into an upper buffer register UBR 100 and a lower buffer register LBR 150 of 32 bits each. The buffer register is used for both input and output operations in a mutually exclusive manner for receiving an input block of data by a series of 8 PIOW DATA commands, termed an input cycle or for producing an output block of data by a series of 8 PIOR data commands, termed an output cycle. During each input cycle, an 8 byte block of input data is written into the buffer register on a serial-by-byte basis from the terminal memory and during each output cycle an 8 byte block of output data is read from the buffer register on a serial-by-byte basis to the terminal memory. During the input cycle, each received byte is parity checked for odd parity over nine bits and during the output cycle to each byte is appended a parity bit to achieve odd parity over nine bits. Principal input/output controls which are used for the I/O management include: (1) an input cycle latch 454 in FIG. 19e3 which is set by a PIOW data command, except during the execution of a WMK order command, and remains set until after 8 PIOW data commands have been counted by a byte counter 488 in FIG. 19d4; (2) an output cycle latch 464 in FIG. 19e3 which is set by a PIOR data command, by the conclusion of the input cycle during the LKD order operation or by the conclusion of the deciphering process during the execution of the DECK order operation, and remains set until after the 8 PIOR data commands have been counted or until after 8 buffer to key register shifts have been counted by the byte counter; (3) a byte counter 448 which counts the number of shifts of the buffer register as it is being loaded or unloaded by PIOW or PIOR data commands, respectively, or as a cipher key is being transferred from the buffer register to the key register; and (4) a block counter 414 in FIG. 19d3 which is set at the end of every input cycle and is reset at the end of every output cycle.

CRYPTO ENGINE CONTROLS

Figure 22:
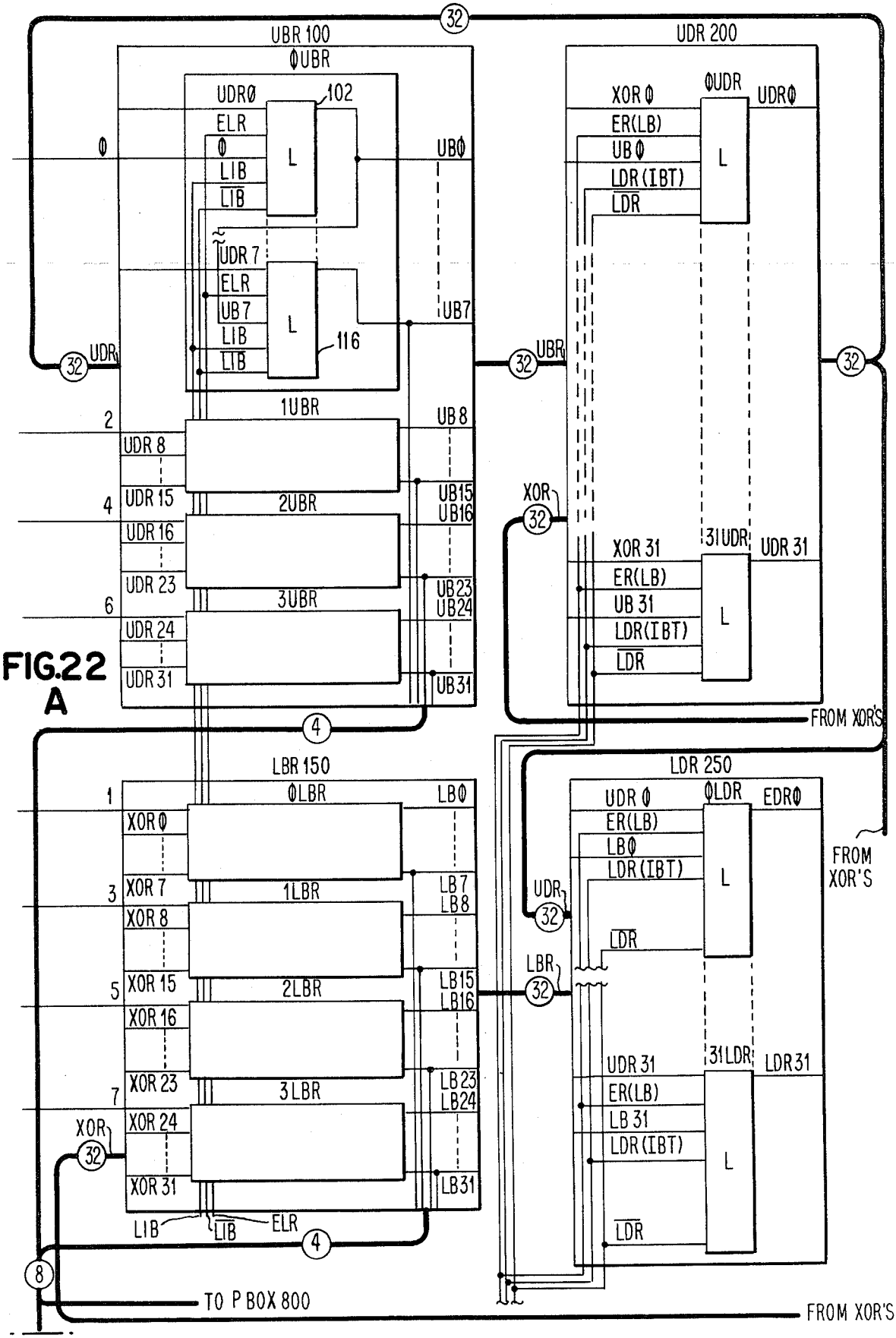
FIG. 22 illustrates logic details of the crypto engine used in the data security device of the present invention.
Figure 22C:
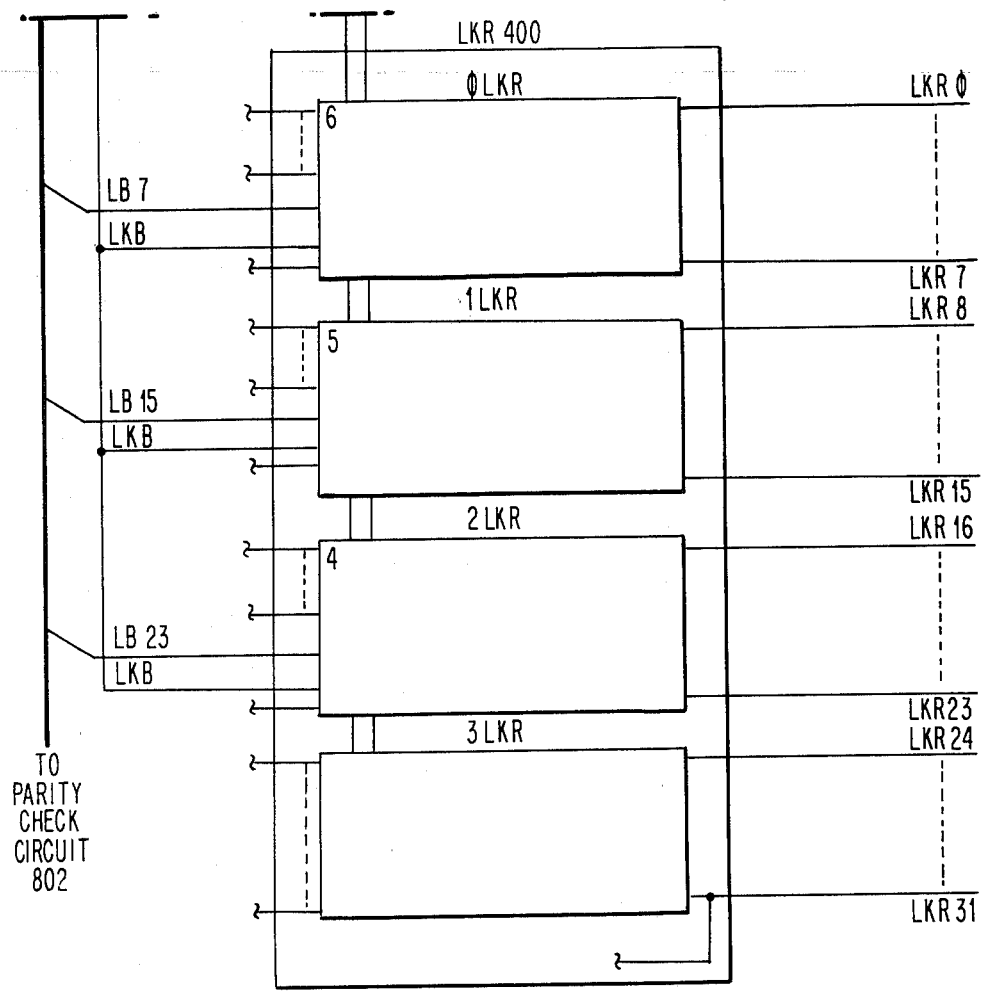

The crypto engine used in the present invention is similar in detail to that shown and described in the afore-mentioned U.S. Pat. No. 3,598,081. One difference between the engine shown in the aforementioned patent and that in the present invention is that in the aforementioned patent the crypto engine is provided with separate input and output buffer registers whereas in the crypto engine of the present invention a single input/output buffer register is provided and used, in a mutually exclusive manner, for input/output operations. However, while there is a difference in design detail between the previous and the present crypto engine, the algorithm performed by both is identical. Additionally, the crypto engine of the aforementioned patent discloses how the basic encipher/decipher operations are performed with the cipher key being loaded directly into the key register as a working key whereas, in the present invention, in addition to being loaded directly into the key register from the MK memory 700, it is also loaded as a working key into the key register via the input/output buffer register when the cipher key is provided from the terminal memory during an LKD operation or as the result of the DECK operation. The details of these modifications of the prior crypto engine are shown in FIG. 22a to FIG. 22c and correspond to FIGS. 3a to 3d of the aforementioned patent with the notations used being identical for both except for the lines labeled ER and LDR which correspond to lines labeled LB and IBT in the aforementioned patent. The various control signals used in the crypto engine and their function will be generally described in the following and the operation of the modified crypto engine will be described in conjunction with the detailed descriptions of the various command operations which will be described hereafter.

Load Input Buffer (LIB)—This signal is used for loading and unloading the buffer registers UBR 100 and LBR 150. During an input cycle, this signal causes a data byte presently on the BUS IN to be latched in and simultaneously shifted in the buffer registers. After eight such actions, the loading operation is complete. During an output cycle, a data byte is outputted, after which this signal causes the buffer registers UBR 100 and LBR 150 to be shifted in preparation for outputting the next data byte. After eight such actions, the unloading operation is complete.

Load Key Register From Buffer (LKB)—This signal is essentially identical to the LIB signal and is produced during the output cycle of LKD or DECK operations causing the buffer register outputs to be latched into the key registers UKR 350 and LKR 400.

Load Data Register (LDR) and End of Last Round (ELR)—These signals are simultaneously produced from the same source with LDR causing the content of the buffer register UBR 100 and LBR 150 to be transferred to the data registers UDR 200 and LDR 250 and ELR causing the contents of the data registers UDR 200 and LDR 250 (via the cipher function circuits) to be transferred to the buffer registers UBR 100 and LBR 150, the simultaneous action constituting a swap of the contents of the buffer and data registers.

Engine Busy (EB)—This control signal is produced during actual data ciphering operations and occurs from the end of the input cycle to the end of the last of the 16 rounds of the cipher function.

End of Round (ER)—This signal is used to latch up the intermediate results of each round in the data registers UDR 200 and LDR 250.

Load Master Key (LDK)—This signal causes the contents of the MK memory buffer 702 to be latched into the key registers UKR 350 and LKR 400.

Shift Right (SR), Shift Right and Recirculate (SRR) and Shift Left (SL)—The SR signal is used to shift the key registers UKR and LKR 400 to the right when a cipher key is being loaded from either the MK memory 700 or the buffer registers UBR 100 and LBR 150. The SRR signal configures the key register UKR 350 and LKR 400 into two recirculating right shifting registers. During the decipher process, the SR and SRR control signals cause the key registers to be shifted to the right. During the encipher operation, the SL control signal configures the key registers UKR 350 and LKR 400 into two recirculating left shifting registers which are shifted to the left.

LOAD KEY DIRECT ORDER OPERATION

The function of this operation is to load a new cipher key in clear form via the buffer registers of the crypto engines directly into the key registers. When the order code specifying this order is decoded, a LKD latch is set and the key invalid latch is reset to permit data to be subsequently processed since a new working key is to be written into the crypto engines by the present operation. The setting of the LKD latch enables parity checkers in the crypto engines from permitting odd parity checks to be made for each cipher key byte to be loaded into the key registers from the buffer registers. Following the LKD order command, the terminal processor issues a series of 8 PIOW data commands, with the data fields associated with the commands being loaded into the buffer registers of crypto engines. The first such command initiates an input cycle and a byte counter counts each such command received. After the 8 PIOW commands have been received and the 8th byte written into the buffer registers, then, at the 8th count, the input cycle ends, a block counter is set and an output cycle is started. During the output cycle, the buffer registers and key registers are shifted in synchronism, once for each clock cycle, causing the cipher key presently stored in the buffer registers to be shifted into the key registers. During this transfer, a parity check is made of each byte as it is transferred to the key registers. The byte counter counts clock cycles and at the 8th count, the output cycle ends, the block counter is reset and the LKD latch is reset to end the operation.

Figure 23A:
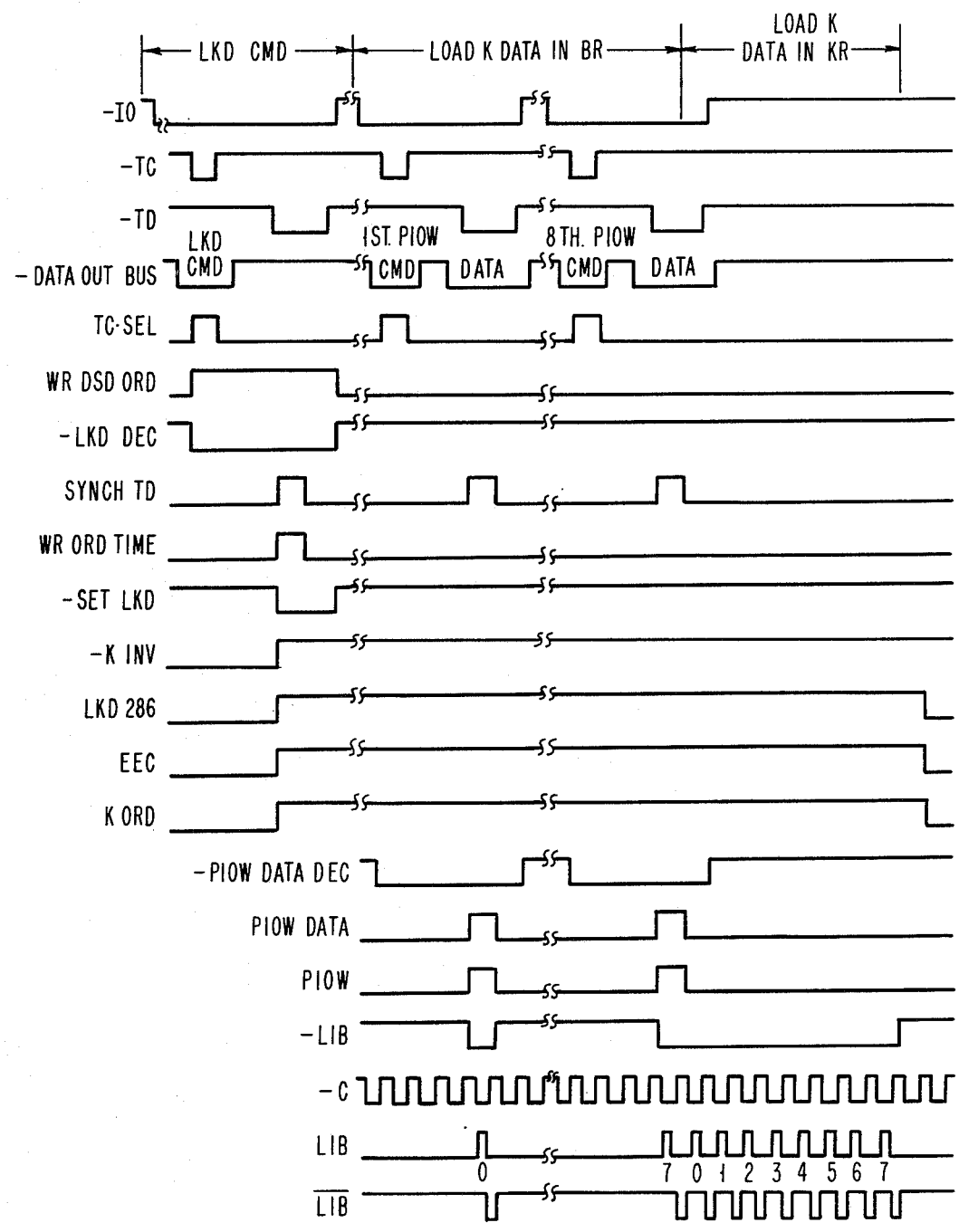
FIGS. 23a and 23b, taken together, comprise a timing diagram of the LKD operation.
Figures 23, 23A, 23B:
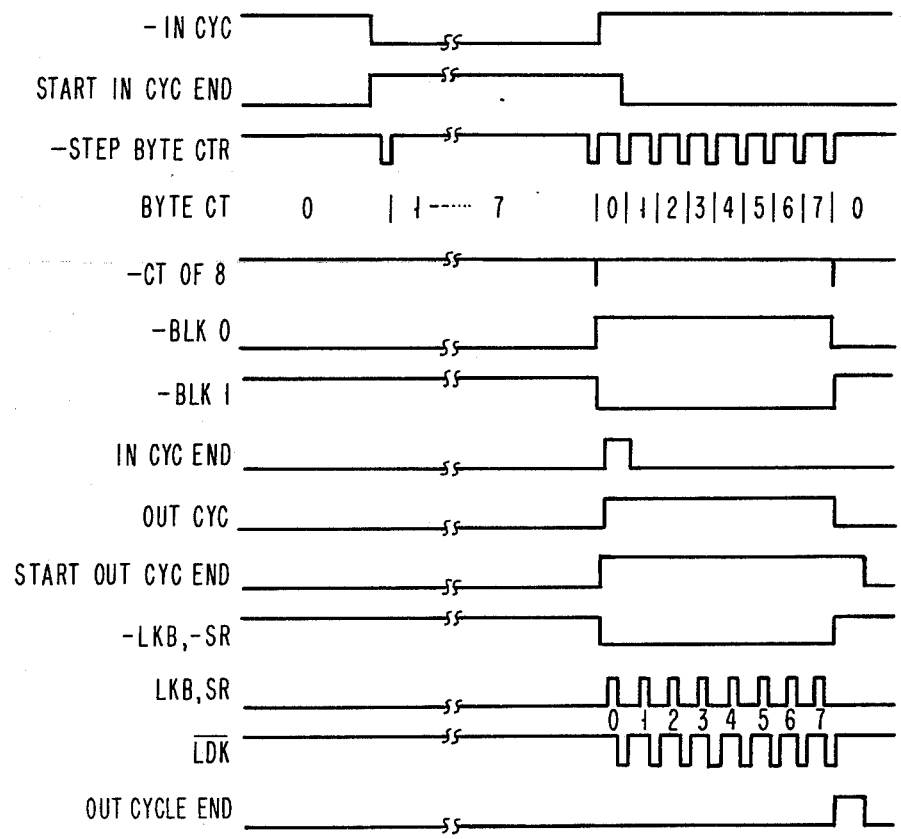
FIG. 23 illustrates how FIGS. 23a and 23b may be placed to form a composite timing diagram.

A more detailed description of the Load Key Direct operation will now be given in conjunction with the timing diagram of FIG. 23. After address selection at TA time and loading the command byte into the command register at TC time, the command code is decoded by AND invert circuit 266 in FIG. 19b2 to produce a negative signal which is inverted to a positive signal or WR DSD ORDER line thereby indicating the presence of a WR DSD order command. At the same time, a portion of the order code is decoder by the AND invert circuit 280 to apply a negative signal via the −(WMK+LKD) DEC line to the inverter 282 where it is inverted to a positive signal and applied via the WMK+LKD line to one input of the AND invert circuit 284. A positive signal on the Y line personalizes this order as a LKD order and is applied as a second input to the AND invert circuit 284. At TD time, a positive signal is applied via the SYNCH TD line to render the AND circuit 270, conditioned by the positive signal on the WR DSD ORDER line, effective to provide a positive signal on the WR ORDER TIME line which is applied to the remaining input of the AND invert circuit 284 to render it effective to produce a negative signal on the −SET LKD line. The negative signal on the −SET LKD line is applied to set the LKD latch 286 in FIG. 19c3 and to reset the KEY INVALID latch 278. The LKD latch in being set applies a positive signal to the LKD line and a negative signal to the −LKD line while the KEY INVALID latch in being reset applies a positive signal to the −KEY INVALID line. The negative signal on the −LKD line is inverted by the inverter 601 in FIG. 19g3 to a positive signal on the EEC line which is applied via the control line bus to the crypto engines which, in FIG. 19g1, is shown as being applied to one input of the AND circuit 806 in preparation for allowing a parity check operation. The negative signal on the −LKD line is also applied to decondition the AND invert circuit 298 in FIG. 19c4 which, in turn, applies a positive signal to the K ORD line and via inverter 300 a negative signal on the −K ORD line thereby providing indications that this is a key order operation.

The first of a series of 8 PIOW data commands is now received by the DSD and after address selection at TA time and command loading into the command register at TC time, the AND invert circuit 226 decode this command causing a negative signal to be applied to one input of the OR invert circuit 230. At TD time, a positive signal on the SYNCH TD line is inverted by inverter 228 to a negative signal to the other input of the OR invert circuit 230 which, in turn, applies a positive signal to the PIOW data line. The positive signal on the PIOW data line is applied to the AND invert circuit 426 in FIG. 19d3 which is presently conditioned by a positive signal on the −WMK line. Accordingly, the AND invert circuit 426 is rendered effective to apply a negative signal to one input of the OR invert circuit 430. At this time, positive signals are maintained at the input of the AND invert circuit 428 causing a negative signal to be applied to the other input of the OR invert circuit 430. The negative signal inputs to the OR invert circuit 430 causes a positive signal to be applied via the PIOW line to condition the AND invert circuit 431, to condition the AND invert circuit 444, in FIG. 19d4, and to be applied to the inverter 596 in FIG. 19g3 where it is inverted to a negative signal to decondition the AND circuit 600 which, in turn, applies a negative signal on the −LIB line to one input of the OR invert circuit 602. At −C time, a −C clock pulse is applied to the other input of the OR invert circuit 602. The negative signal inputs to the OR invert circuit 602 causes a positive signal to be applied via the LIB line and the control line bus to the crypto engines and to the OR invert circuit 648 in FIG. 19h4. The OR invert circuit 648 is rendered effective to apply a negative signal to the delay circuit 650, which provides a 250 ns time delay, and via the $\overline{LIB}$ line and the control line bus to the crypto engines. Referring now to FIGS. 19f1 and 19g1 the combination of signals on the LIB and $\overline{LIB}$ lines are effective to permit the data field associated with the first PIOW data command to be loaded from the BUS IN via the P box 50 into the buffer registers UBR 100 and LBR 150 in each crypto engine.

Referring now to FIG. 19e3, at ∅3L time of the clock cycle, a ∅3L clock pulse is applied to render the conditioned AND invert circuit 431 effective to apply a negative signal to set the INPUT CYCLE latch 454 to start the input cycle operation. The INPUT CYCLE latch 454 in being set applies a negative signal via the −IN CYCLE line to set the START IN CYCLE END latch 530 which, in being set, applies a positive signal to one input of the AND invert circuit 532. Referring now to FIG. 19d4, at ∅4 time, a ∅4 clock pulse is applied to render the conditioned AND invert circuit 444 effective to apply a negative pulse to the STEP BYTE CTR line, the positive trailing edge of which is effective to step the byte counter 448 to a count of one.

In a similar manner, succeeding ones of the data fields associated with the series of 8 PIOW data commands are loaded into the buffer registers UBR 100 and LBR 150 with the previous byte being simultaneously shifted and the byte counter 448 counting each such byte received. After the 8th byte is written into the buffer registers, the byte counter 448 steps from a count of 7 back to a count of 0 causing a negative signal to be produced to set the COUNT 8 latch 450 which, in turn, applies a negative signal to the −CT8 line. The negative signal on the −CT8 line is applied to reset the INPUT CYCLE latch 454 in FIG. 19e3 thereby ending the input cycle. The INPUT CYCLE latch 454 in being reset applies a positive signal via the −IN CYCLE line to the AND invert circuit 410 in FIG. 19d3. The combination of positive signals on −IN CYCLE and −OUT CYCLE lines are applied to render the AND invert circuit 410 effective to apply a negative signal to reset the COUNT 8 latch 450 in FIG. 19d4 and is inverted by inverter 412 to a positive signal to set the BLOCK COUNT flip flop 414 producing a positive signal on the −BLK0 line and a negative signal on the −BLK1 line.

Referring now to FIGS. 19e3 and 19f3, positive signals in the −IN CYCLE line and from the START IN CYCLE END latch 530 are applied to condition the AND invert circuit 532. At the next ∅1 time, the AND invert circuit 524 is rendered effective to apply a negative pulse, from ∅1 time to ∅1L time, on the −∅1/L line to inverter 526 where it is inverted to a positive pulse which is applied via the ∅1 DEL line to render the now conditioned AND invert circuit 532 effective to apply a negative pulse to set the IN CYCLE END latch 534 which, in being set, applies a positive signal to the IN CYCLE END line. This latch will remain set until the next ∅1 time when a negative pulse is applied to the −∅1/L line to reset the latch which therefore remains set for approximately one clock cycle.

Referring now to FIG. 19e3, the positive signal on the IN CYC END line in combination with the positive signal on the LKD line are applied to render the AND invert circuit 460 effective to apply a negative signal to set the OUTPUT CYCLE latch 464 producing a positive signal on the OUT CYCLE line and a negative signal on the −OUT CYCLE line thereby initiating the output cycle. The negative signal on the −OUT CYCLE line is applied to set the START OUT CYCLE END latch 580 which, in being set, applies a positive signal to one input of the AND invert circuit 582. Referring now to FIG. 19g4, since this is a key order operation, a negative signal on the −K ORD line is inverted by inverter 594 and applied as a positive signal to one input of the AND invert circuit 590. The positive signal on the OUT CYCLE line is applied to the other input of the AND invert circuit 590 to render it effective to apply a negative signal to decondition the AND circuit 600, to decondition the AND circuit 572 and to one input of the OR invert circuit 604. The deconditioned AND circuit 600 applies a negative signal via the −LIB line to one input of the OR invert circuit 602 while the deconditioned AND circuit 572 applies a negative signal via the −SR line to one input of the OR invert circuit 574. A −C clock pulse is applied to the other inputs of the OR invert circuits 602, 604 and 574 to decondition them causing positive signals to be applied via the LIB, LKB and SR lines, respectively, to the control signal cable connected to the crypto engines. The positive signal on the SR line is also applied to the OR invert circuit 606 in FIG. 19h4 causing a negative signal, delayed by a 250 ns time delay circuit 608, to be applied via the $\overline{\text{LDK}}$ line to the control signal cable.

Referring now to the crypto engines in FIG. 19g1, these signals are effective to cause the buffer and key registers to shift in synchronism with a data byte being transferred from the buffer registers UBR 100 and LBR 150 to the key registers UKR 350 and LKR 400. A parity check of the byte is made by the parity check circuit 802 with the result being applied to the AND circuit 806 conditioned by positive signals on the LKB and EEC lines. If a parity error is detected, a positive signal is applied to render the AND circuit 806 effective to cause a positive signal to be applied via the OR circuit 808 to the KEY BUS A ERR line. A similar parity check is made in the crypto engine B and if an error is detected in this engine a positive signal is applied to KEY BUS B ERR line. Referring now to FIGS. 19h4 and 19i2 positive signals on either or both of the KEY BUS ERR lines are applied to condition the AND invert circuits 936 and 938. At ∅3L time, a ∅3L clock pulse is applied to render either or both of the AND invert circuit effective to apply a negative signal to set the bit 1 and 2 latches 954b and 954c of the status register 952 to record the occurrence of a parity error in the byte transferred to the key registers in either or both of the crypto engines.

Referring now to FIGS. 19e3 and 19f3, at ∅4 time, a ∅4 clock pulse in combition with a positive signal on the IN CYCLE END line are applied to render the AND invert circuit 528 effective to apply a negative signal to reset the START IN CYCLE END latch 530. At the same time, referring to FIG. 19d4, the ∅4 clock pulse in combination with positive signals on the OUT CYCLE and K ORD line are applied to render the AND invert circuit 442 effective to apply a negative pulse to the STEP BYTE CTR line, at the trailing edge of which a positive signal is effective to step the byte counter to a count of one. At ∅1 time of the next clock cycle, the combination of positive signals on the ∅1L lines are applied to render the AND invert circuit 524 effective to apply a negative signal via the −∅1/2 line to reset the IN CYCLE END latch 534.

In a similar manner to that described above, the buffer registers and the key registers of the crypto engines are shifted in synchronism, once for each clock cycle, causing successive bytes of the cipher key to be transferred from the buffer registers to the key registers with a parity check made of each byte transferred. The byte counter 448 counts the clock cycles and when the count steps from a count of 7 back to a count of 0, a negative signal is applied to set the COUNT 8 latch 450 which, in being set, applies a negative signal via the −CT8 line to reset the OUTPUT CYCLE latch 464 in FIG. 19e3. The OUTPUT CYCLE latch 464 in being reset applies a positive signal on the −OUT CYCLE line and a negative signal on the OUT CYCLE line. Referring now to FIG. 19d3, the combination of positive signals on the −OUT CYCLE line and the −IN CYCLE line render the AND invert circuit 410 effective to apply a negative signal to reset the COUNT 8 latch 450 in FIG. 19d4 and is inverted by the inverter 412 to a positive signal to reset the BLOCK COUNT flip flop 414 producing a negative signal on the −BLK 0 line and a positive signal on the −BLK 1 line. At the same time, the negative signal on the OUT CYCLE line is applied to decondition the AND invert circuit 590 in FIG. 19g4 causing a positive signal to be applied via the −LKB line to the OR invert circuit 604 and to render the AND circuits 600 and 572 effective to apply positive signals via the −LIB and −SR lines to the OR invert circuits 602 and 574. As a result, negative signals are now maintained on the LIB, LKB and SR lines to terminate further shifting of the buffer and key registers in the crypto engines.

Referring to FIG. 19f3, at ∅1 time of the next clock cycle, a ∅1 DEL clock pulse in combination with the positive signal on the −OUT CYCLE line and the positive signal output of the START OUT CYCLE END latch 580 are applied to render the AND invert circuit 582 effective to produce a negative signal to set the OUT CYCLE END latch 584 which, in being set, applies a positive signal on the OUT CYCLE END line to condition the AND invert circuit 578 in FIG. 19e3. The OUT CYCLE END latch 584 also applies a negative signal on the −OUT CYCLE END line to reset the LKD latch 286 in FIG. 19c3. The LKD latch 286 in being reset applies a positive signal to render the AND invert circuit 298 in FIG. 19c4 effective to apply a negative signal on the K ORD line and via the inverter 300 a positive signal on the −K ORD line indicating the end of the key order operation. The positive signal on the −LKD line is also inverted by the inverter 601 in FIG. 19g3 to a negative signal on the EEC line which is applied via the control line bus to to decondition the parity check circuits of the crypto engines. Referring now to FIGS. 19e3 and 19f3, at ∅4 time, a ∅4 clock pulse is applied to render the AND invert circuit 578 effective to apply a negative signal to reset the START OUT CYCLE END latch 580. At ∅1 time of the next clock cycle, a ∅1L clock pulse is applied to reset the OUT CYCLE END latch 584 and thereby end the load key direct order operation.

DECIPHER KEY ORDER OPERATION

The function of this operation is to decipher an enciphered operational key and then load the operational key in clear form as the working key in the key registers of the crypto engines for subsequent data processing operations.

When the order code specifying this order is decoded, a decipher key (DECK) latch is set, a load master key (LMK) latch is set, the key invalid latch is reset (having been set and remain set by a previous WMK order command if that command preceded the present one) to permit data to be subsequently processed since a new working key is to be written into the key registers of the crypto engines by the present operation and an encipher (ENC) latch is reset so that the processing mode is set for a decipher operation. With the LMK latch set, the contents of the MK memory is caused to be read out and transferred, a byte at a time, to the crypto engines. The master key is parity checked, a byte at a time, and loaded as a working key directly into the key registers of the crypto engines. Concurrently with (or after) loading the master key into the key registers, a series of 8 PIOW commands are received with the data fields associated with the commands, constituting the enciphered operational key to be deciphered under control of the master key, being loaded into the buffer registers of the crypto engines. The first such command initiates an input cycle and a byte counter counts each such command received. After the 8 PIOW commands have been received and the 8th byte written into the buffer registers, then, at the 8th count, the input cycle ends, the enciphered operational key is transferred from the buffer registers to the data registers of the crypto engines, a block counter is set and the crypto engines start a decipher operation which is indicated by the generation of an engine busy signal. At the end of the decipher operation, the operational key, now in clear form, is loaded into the buffer registers of the crypto engines and an output cycle is started. During the output cycle, the buffer registers and the key registers are shifted in synchronism, once for each clock cycle, causing the operational key presently in the buffer registers to be shifted into the key registers. During this transfer, the byte counter counts the clock cycles and after the 8th count, the output cycle ends, the block counter is reset and the DECK latch is reset to end the operation. Any attempt to read the contents of the buffer registers while the operational key is present in clear form will be detected and cause a procedural error as will be described in greater detail hereafter.

Figure 24A:
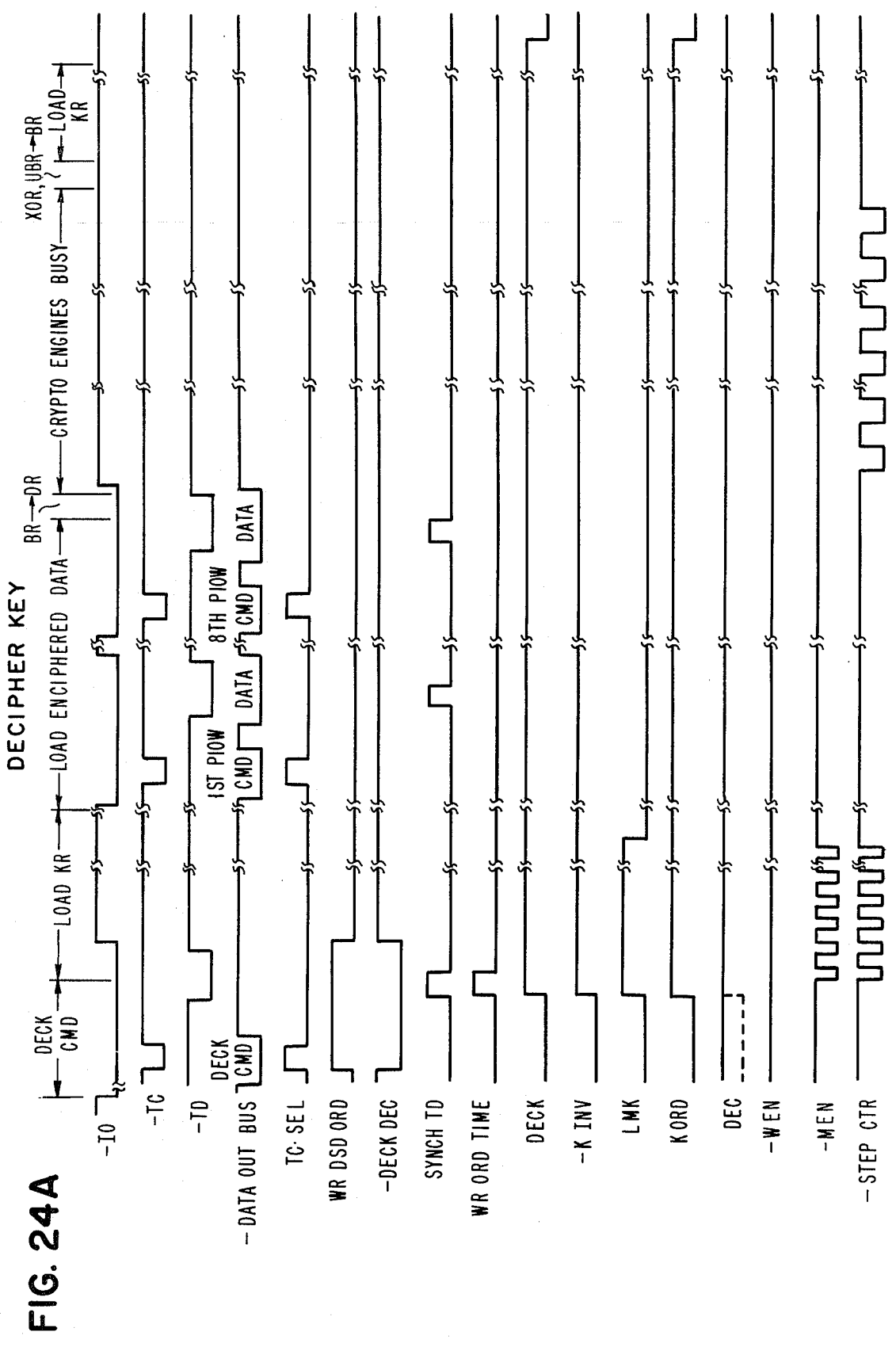
Figure 24B:
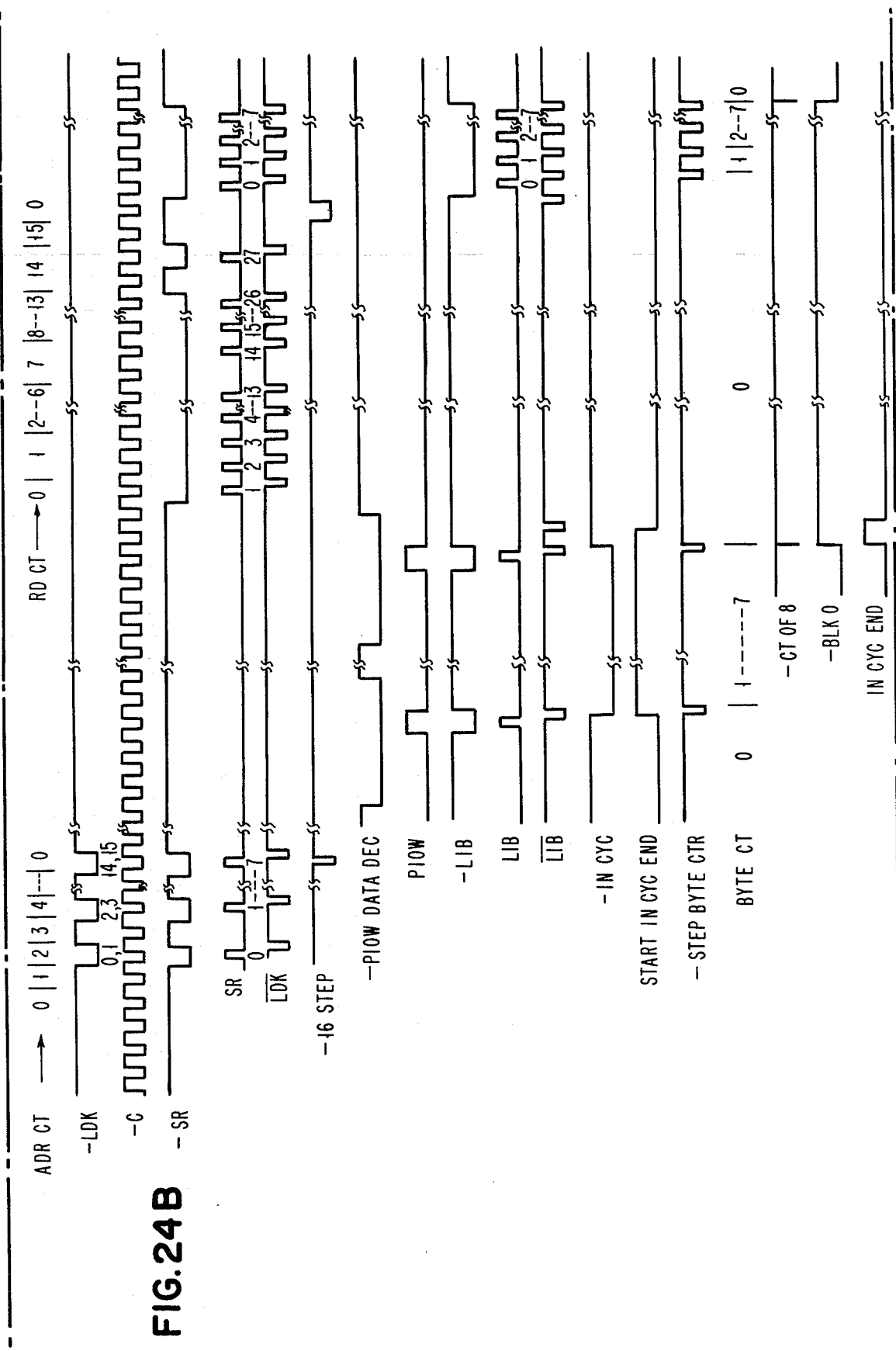

A more detailed description of the decipher key operation will now be given in conjunction with the timing diagram of FIG. 24. After address selection at TA time and loading the command byte into the command register at TC time, the command code is decoded by AND invert circuit 266 in FIG. 19b2 to produce a negative signal which is inverted by inverter 268 to a positive signal on the WR DSD ORDER line thereby indicating the presence of a WR DSD order command. At the same time, the order code is decoded by the AND invert circuit 288 to apply a negative signal via the −DECK DEC line to the inverter 290 where it is inverted to a positive signal and applied to one input of the AND invert circuit 292. At TD time, a positive signal is applied via the SYNCH TD line to render the AND circuit 270, conditioned by the positive signal on the WR DSD ORDER line, effective to provide a positive signal on the WR ORD TIME line which is applied to the remaining input of the AND invert circuit 292 to render it effective to produce a negative signal on the −SET DECK line. The negative signal on the −SET DECK line is applied to set the DECK latch 296 in FIG. 19c3, to reset the key invalid latch 278, to set the LMK latch 566 in FIG. 19g4 and to decondition the AND invert circuit 368 in FIG. 19c2. The AND invert circuit 368 in being deconditioned applies a positive signal to condition the AND invert circuits 370 and 374 which will be used for controlling a MK memory readout as will be described hereafter. The LMK latch 566 in being set applies a negative signal via the −LMK line, in FIG. 19c2, to maintain the AND invert circuit 368 deconditioned and thereby maintain the AND invert circuits 370 and 374 conditioned while the LMK latch remains set i.e. during the MK memory read out time. Referring now to FIGS. 19c3 and 19c4, the DECK latch 296 in being set applies a negative signal via the −DECK line to decondition the AND invert circuit 298 which, in turn, applies a positive signal on the K ORD line and via inverter 300 a negative signal on the −K ORD line thereby providing indications that this is a key order operation. The negative signal on the −K ORD line is applied to reset the ENC latch 312 which, in being reset, applies a negative signal to the ENC line which, in FIG. 19g3 is inverted to a positive signal by the inverter 546 to provide a positive signal on the DEC line indicating a decipher mode of operation.

Referring now to FIG. 19c2, negative signals are applied to the inputs of the AND invert circuit 366 and a negative signal is applied to the inverter 162 both of which cause a positive signal to be applied to one input of the AND circuit 380 and to condition the AND invert circuit 376. Additionally, the MK OVW latch 276, presently in a reset state, causes a positive signal to be applied via the −MK OVW line to the other input of the AND circuit 380 rendering it effective to apply and maintain a positive signal on the −W ENABLE line. At ∅3L time, a ∅3L clock pulse is applied to render the AND invert circuit 370 effective to apply a negative pulse to decondition the AND invert circuit 376 which, in turn, applies a positive signal to the inverter 378 where it is inverted to a negative signal on the −M ENABLE line. The positive signal on the −W ENABLE line together with the now negative signal on the −M ENABLE line are effective to cause the first half byte at location 0 of the MK MEMORY 700 to be read out. At ∅1 time of the next clock cycle, a ∅1 clock pulse is effective to shift the half byte into the shift registers 702 in FIG. 19e1. Referring now to FIG. 19c2, at ∅1L time, a −∅1L clock pulse is applied to decondition the AND invert circuit 374 which, in turn, applies a positive signal to render the AND invert circuit 376 effective to apply a negative signal to the −STEP CTR line and to the inverter 378 to apply a positive signal on the −M ENABLE line. The negative signal on the −STEP CTR line is applied to the inverter 388 where it is inverted to a positive signal to step the address counter 390 to an address count of 1 and cause a positive signal to be provided on the C1 line. At ∅3L time, a ∅3L clock pulse is again applied to render the AND invert circuit 370 effective to initiate production of a negative signal, via the AND invert circuit 376 and the inverter 378, on the −M ENABLE line. The positive signal on the −W ENABLE line in combination with the negative signal on the −M ENABLE line is again effective to cause the next half byte at location 1 of the MK memory 700 to be read out. At ∅1 time of the next clock cycle, a ∅1 clock pulse is effective to shift the next half byte into the first stages of the shift register 702 and to shift the previous half byte read out of the MK MEMORY 700 to the second stages of the shift registers 702. As a result of this action, the first full byte of the cipher key is now stored in the shift registers 702.

Referring now to the AND invert circuit 568 in FIG. 19g4, a ∅1 DEL clock pulse in combination with positive signals on the C1, −STEP CTR and LMK lines are applied to render the AND invert circuit 568 effective to apply a negative signal to set the LDK latch 570 which, in being set, applies a negative signal via the −LDK line to decondition the AND circuit 572 and to one input of the OR invert circuit 576. The deconditioned AND circuit 572 causes a negative signal to be applied via the −SR line to one input of the OR invert circuit 574.

Referring to the AND invert circuit 374 in FIG. 19c2, at ∅1L time, a −∅1L clock pulse is applied to decondition the AND invert circuit 374 causing a positive signal to be applied to render the AND invert circuit 376 effective to apply a negative signal to the −STEP CTR line and via the inverter 378 to a positive signal on the −M ENABLE line. The negative signal on the —STEP CTR line is inverted by the inverter 388 to a positive signal to step the address counter to an address count of 2 and causing a negative signal to now be applied to the C1 line.

Referring now to the OR invert circuits 574 and 576 in FIG. 19g4, at ∅2 time, a −C clock pulse is applied to the other inputs of the OR circuits 574 and 576 causing them to apply positive signals via the SR and LDK lines respectively, to the control signal cable connected to the crypto engines. The positive signal on the SR line is also applied to the OR invert circuit 606 in FIG. 19h4 causing a negative signal, delayed by delay circuit 608, to be applied via $\overline{\text{LDK}}$ line to the control signal cable.

Referring now to the crypto engines in FIG. 19g1, the positive signal on the LDK line is applied to condition the AND circuit 807 to permit a parity check to be made of the first byte of the cipher key stored in the shift registers 702 to be checked for a parity error. The positive signals on the SR, LDK and $\overline{\text{LDK}}$ lines are applied as control signal inputs to the key registers UKR 350 and LKR 400 to shift the key register and allow the first byte of the cipher key, passed via the P box 300, to be latched into the key registers.

Referring now to FIG. 19c2, at ∅3L time, a ∅3L clock pulse is again applied to render the AND invert circuit 370 effective to initiate production of a negative signal on the −M ENABLE line to permit the third half byte to be read out of the MK memory 700 from location 2. Referring now to FIG. 19g4, at ∅1 time of the next clock cycle, a −∅1 clock pulse is applied to reset the LDK latch 570 to inhibit production of the control signals for the crypto engine during this clock cycle in order to permit the next half byte to be read out of the MK memory 700 and shifted into the shift registers 702 in FIG. 19e1. Accordingly, referring to FIG. 19e1, at the same time that the LDK latch 570 is reset, a ∅1 clock pulse is applied to shift the next half byte from the MK memory 700 into the shift registers 702.

In a similar manner, during each succeeding clock cycle, a half byte of the cipher key is read out of the MK memory 700 and shifted into the shift registers 720 and the address counter 390 stepped to the next address count. After each second clock cycle, when a full byte of the cipher key is loaded into the shift registers 720, control signals are provided on the LDK, SR and $\overline{\text{LDK}}$ lines to parity check the cipher key byte and to simultaneously shift the previously loaded byte one position to the right and to latch up the newly entered byte in the key registers in the crypto engine.

Referring now to FIG. 19d2, when the address counter 390 steps to an address count of 7 (the 8th address location), a negative signal is produced on the −C8 line to set the 16 STEP latch 404 which, in being set, applies a positive signal to one input of the AND circuit 406. After the 8th byte is loaded into the key registers, the address counter 390 steps from an address count of 15 back to an address count of 0 (count of 16) causing a positive signal to be produced on the −C8 line which is applied to condition the AND invert circuit 402 and to the other input of the AND circuit 406. The AND circuit 406 is rendered effective to produce a positive signal which is inverted by inverter 408 to a negative signal on the −16 STEP line to reset the LMK latch 566 in FIG. 19g4. The LMK latch 566 in being reset applies a negative signal via the LMK to decondition the AND invert circuit 568 and inhibit further setting of the LDK latch 570 and further production of crypto engine control signals on the LDK, SR and $\overline{\text{LDK}}$ lines. Referring to FIG. 19d2, at ∅4 time of the 16 clock cycle, a ∅4 clock pulse is applied to reset the 16 STEP latch 404.

After loading the master key into the key registers of the crypto engines a series of 8 PIOW commands are issued with the data fields associated with the commands, constituting the enciphered operational key to be deciphered under control of the master key, being loaded into the buffer registers of the crypto engines. The loading operation of the enciphered operational key into the buffer registers of the crypto engines by a series of 8 PIOW commands is identical to the loading operation described in connection with the input cycle of the LKD order operation and reference may be made to that section for a detailed description. Generally, the first of such commands initiates the input cycle and the byte counter counts each such command received. After the 8 PIOW commands have been received and the 8th byte written into the buffer registers, then, at the 8th count, the input cycle ends with the block count flip flop 414 being set to produce a positive signal on the −BLK0 line and to set the IN CYCLE END latch 534 causing a positive signal to be produced on the IN CYCLE END line to indicate the end of the input cycle.

Referring now to FIG. 19f4, the positive signal on the IN CYCLE END line together with the positive signal on the −LKD line is applied to render the AND invert circuit 622 effective to apply a negative signal to turn on the START EB latch 628 and to the AND invert circuit 638 where it is inverted to a positive signal and applied to the OR invert circuit 640 which produces negative signals on the −ELR and −LDR lines. The negative signal on the −ELR line is applied to one input of the OR invert circuit 642 and, in FIG. 19c2 to decondition the AND circuit 382 causing a negative signal to be applied to reset the counter 390 in FIG. 19d2 in preparation for this counter to operate as a round counter for the 16 rounds of operation of the cipher engines. The negative signal on the −LDR line is applied to one input of the OR invert circuit 644. At ∅2 time, a −C clock pulse is applied to the other inputs of the OR invert circuit 642 and 644 causing positive signals to be applied via the ELR and LDR lines, respectively, to the control signal cable connected to the crypto engines. The positive signal on the ELR line is also applied to the OR invert circuit 648 causing a negative signal, delayed by the 250 ns time delay circuit 650, to be applied via the $\overline{\text{LIB}}$ line to the control signal cable. The positive signal on the $\overline{\text{LDR}}$ line is applied to the OR invert circuit 652 causing a negative signal, delayed by the 250 ns time delay circuit 654 to be applied via the LDR line to the control signal cable.

Referring now to the crypto engines in FIG. 19g1, the control signals LDR and $\overline{\text{LDR}}$ are effective for parallel transferring the contentus of the buffer registers UBR 100 and LBR 150 to the data registers UDR 200 and LDR 250. The control signals ELR and $\overline{\text{LIB}}$ are effective for causing the contents of the upper data register UDR 200 and the lower data register LDR 250 (via the cipher function circuits) to be transferred to the upper buffer register UBR 100 and the lower buffer register LBR 150, the transfer to the buffer registers being of no consequence at this time but will be of consequence at the end of the 16th round of operation of the crypto engines. At this time, with the enciphered operational key presently stored in the data registers and the cipher key stored in the key registers, the crypto engines are now effective to perform a decipher function in a manner described in detail in the aforementioned U.S. Pat. No. 3,958,081 and generally described in the previous section entitled, TERMINAL. Reference may be made to the aforementioned patent for a more detailed description of the decipher function.

A description of the manner in which the crypto engine control signals are produced will now be given and can be followed in conjunction with the timing diagram in FIG. 24. Referring now to FIG. 19f3, at ∅1/L time, a −∅1/L clock pulse is applied to reset the IN CYCLE END latch 534 which, in being reset, applies a negative signal to decondition the AND invert circuit 622 in FIG. 19f4. The AND invert circuit 622 in being deconditioned applies a positive signal which together with the positive signal from the set START EB latch 628 renders the AND invert circuit 630 effective to apply a negative signal to set the EB latch 632 indicating the start of the crypto operation. The EB latch 632 in being set applies a positive signal to the EB line and a negative signal to the −EB line. The positive signal on the EB line is applied to one input of the AND invert circuit 398 in FIG. 19d2 and to condition the ER flip flop 384 in FIG. 19c2 while the negative signal on the −EB line is applied to set the START EB END latch 612.

The cipher function is performed by repeating a product cipher function 16 times, termed 16 rounds, with each round being carried out in two clock cycles for a total of 32 clock cycles per cipher function. During each round, the data contents of the upper data register UDR 200 is ciphered (in the present case deciphered) under control of the contents of the key registers UKR 350 and LKR 400 with the results being added to the contents of the lower data register LDR 250 by modulo-2 adders 650–664. At the end of each round, the outputs of the modulo-2 adders are parallel transferred to the upper data registers UDR 200 while the contents of the upper data registers UDR 200 are parallel transferred to the lower data register LDR 250 to form the arguments for the next round.

Referring now to FIG. 19d2, during the cipher function operation the counter 390 functions as a round counter. The round counter 390 is stepped every 2 clock cycles from a count value of 0 to a count value of 15 providing a total count of 16 for the 16 rounds. Stepping of the round counter 390 is accomplished under control the ER flip flop 384 after being enabled by the positive signal on the EB line. Thus, at ∅1 time following the conditioning of the ER flip flop 384, a ∅1 clock pulse is applied to set the flip flop 384 and at ∅1 time of the succeeding clock cycle, a ∅1 clock pulse is again applied to reset the flip flop 384 which in being reset applies a negative signal to inverter 386 where it is inverted to a positive signal and applied to step the round counter 390. Therefore, it should be apparent, that the round counter 390 is stepped to the next count every 2 clock cycles. Additionally, during the first clock cycle of each round, ER flip flop 384 being in a reset state, applies a positive signal via the −ER FF line to one input of the AND invert circuit 400. The other input to the AND invert circuit 400 is connected to a round count decoder consisting of AND invert circuits 392, 394, 396 and 398 which is effective, while a positive signal is maintained on the EB line, to produce a positive signal at the output of the AND invert circuit 398 when the round count is 0, 7, 14 or 15 and a negative signal at all other times. Thus, during the first clock cycle of rounds 0, 7, 14 and 15, the combination of positive signals on the −ER FF line and the output of the AND invert circuit 398 will render AND invert circuit 400 effective to apply a negative signal on the CT 0, 7, 14, 15 line whereas during the first clock cycle of all other rounds the negative signal output of the AND invert circuit 398 deconditions the AND invert circuit 400 causing a positive signal to be applied to the CT 0, 7, 14, 15 line. During the second clock cycle of every round, the ER flip flop 384 is in a set state causing a negative signal to be applied to decondition the AND invert circuit 400, which, in turn, applies a positive signal to the CT 0, 7, 14, 15 line. Thus, it should be apparent, that a positive signal is maintained on the CT 0, 7, 14, 15 line during every round count except during the first clock cycle of round count 0, 7, 14 and 15 with one exception, namely, during the second cycle of the round count 15 (16th round). This is so because of the fact that the EB latch 632 in FIG. 19f4 is reset at the end of the first clock cycle of the 16th round to terminate the positive signal on the EB line and thereby inhibit production of a positive signal on the CT 0, 7, 14, 15 line during the second clock cycle. Therefore, a positive signal is maintained on the CT 0, 7, 14, 15 line from the beginning of the second clock cycle of round count 0 to the end of the second clock cycle of round count 6, then from the beginning of the second clock cycle of round count 7 to the end of the second clock cycle of round count 13 and during the second clock cycle of round count 14.

Referring now to the AND invert circuit 548 in FIG. 19g3, during the time that the positive signal is maintained on the CT 0, 7, 14, 15 line, that positive signal in combination with the positive signal on the DEC line are applied to render the AND invert circuit 548 effective for applying a negative signal via the −SRR line to one input of the OR invert circuit 550 and to decondition the AND circuit 572 in FIG. 19g4. The AND circuit 572 in being deconditioned causes a negative signal to be applied via the −SR line to one input of the OR invert circuit 574. Thus, negative signals are maintained on the −SRR and −SR line during times corresponding to the positive signal maintained on the CT 0, 7, 14, 15 line. During each succeeding −C time, while such negative signals are maintained on the −SRR and −SR lines, −C clock pulses are applied to the other input of the OR invert circuits 550 and 574 causing positive signals to be applied via the SRR and SR lines, respectively, to the control signal cable connected to the crypto engines. The positive signals on the SR lines are also applied to the OR invert circuit 606 causing negative signals delayed by delay circuit 608 to be applied via the $\overline{\text{LDK}}$ line to the control signal cable. Therefore, a total of 27 positive signals are produced on the SRR, SR and $\overline{\text{LDK}}$ lines during 15 rounds of the cipher function. Referring now to the crypto engines in FIG. 19g1, each combination of positive signals on the SR, SRR and $\overline{\text{LDK}}$ lines are effective for shifting the key register right one position. Thus, with this key shifting schedule arrangement the key registers are shifted twice each round except during round counts 0, 7 and 14 when the key registers are shifted once and during round count 15 where the key registers are not shifted at all as shown in the timing diagram of FIG. 23.

Referring now to the ER flip flop 384 in FIG. 19c2, since the ER flip flop 384 is switched every clock cycle, a negative signal is applied to the −ER FF line during every second clock cycle of each round except the last round. This is so because of the fact that the EB latch 632 in FIG. 19f4 is reset at the end of the first clock cycle of the round count 15 (16th round) to terminate the positive signal EB line and thereby inhibit ER flip flop 384 in FIG. 19c2 from being set during the second clock cycle of the round count 15. The successive negative signals on the −ER FF line are applied to one input of the OR invert circuit 542. Accordingly, during every second clock cycle of a round, a −C clock pulse is applied to the other input of the OR invert circuit 542 causing positive signals to be applied on the ER line to the control signal cable connected to the crypto engines. The positive signals on the ER line are also applied to render the OR invert circuit 652 in FIG. 19h4 effective to apply negative signals, delayed by a 250ns delay circuit 654, via the $\overline{\text{LDR}}$ line to the control signal cable. Referring now to the crypto engine in FIG. 19g1, the positive signals on the ER and $\overline{\text{LDR}}$ line are applied to the upper and lower data registers UDR 200 and LDR 250 at the end of each round and are effective to cause the intermediate result of the cipher function to be transferred from the output of the modulo-2 adders 650–664 to the upper data register UDR 200 while the output of the upper data register UDR 200 are transferred to the lower data register LDR 250 in preparation for the next round of the cipher function.

Referring now to the AND invert circuit 624 in FIG. 19f4, at ∅4 time of the first clock cycle of the round count 15, a ∅4 clock pulse in combination with positive signals on the C1 and 14, 15 line render the AND invert circuit effective to apply a negative signal to reset START EB and EB latches 628 and 632, respectively. The EB latch 632 in being reset applies a negative signal on the EB line to decondition the ER flip flop 384 in FIG. 19c2 and a positive signal on the −EB line which together with a positive signal from the START EB END latch 612 condition the AND invert circuit 614. At ∅1 time of the second clock cycle of round count 15, a ∅1 DEL clock pulse is applied to render the AND invert circuit 614 effective to apply a negative signal to set the EB END latch 616 producing a positive signal on the EB END line and a negative signal on the −EB END line. The positive signal on the EB END line is applied to condition the AND invert circuit 610 in FIG. 19e4 and together with the positive signal on the DECK line to condition the AND invert circuit 618 and to render the AND circuit 636 in FIG. 19g4 effective to apply a positive signal to the OR invert circuit 640 causing negative signals to be applied via the −ELR and −LDR line to one input of the OR invert circuits 642 and 644, respectively. The negative signal on the −EB END line is applied to decondition the AND circuit 382 in FIG. 19c2, causing a negative signal to be applied to reset the round counter 390 in FIG. 19d2 back to a count of 0.

Referring now to FIG. 19g4, at ∅2 time of the second clock cycle of round 16, a −C clock pulse is applied to the other input of the OR invert circuit 642 and 644 causing positive signals to be applied via ELR and LDR lines to the control signal cable connected to the crypto engines. The positive signals on the ELR and LDR lines are also applied to the OR invert circuits 648 and 652, respectively, causing negative signals, delayed by delay circuits 650 and 654, to be applied via the $\overline{\text{LIB}}$ and $\overline{\text{LDR}}$ lines to the control signal cable. Referring now to the crypto engine in FIG. 19g1, the signals on the ELR and $\overline{\text{LIB}}$ lines and on the LDR and $\overline{\text{LDR}}$ lines cause a swapping action between the data registers and the buffer registers as previously described. However, the significance at this time is to transfer the contents of the upper data register UDR 200 to the upper buffer register UBR 100 and to transfer the outputs of the modulo-2 adders 650–664 to the lower buffer register LBR 150 so that the result of the cipher function, namely, the operational key in clear form is now stored in the buffer registers.

Referring now to FIG. 19e4, at ∅4 time of the second clock cycle of the 16th round, a ∅4 clock pulse is applied to render the AND invert circuit 610 effective to apply a negative signal to reset the START EB END latch 612 in FIG. 19f4. At the same time, the ∅4 clock pulse is also applied to render the AND invert circuit 618 in FIG. 19e4 effective to apply a negative signal to the OR invert circuit 620 in FIG. 19f4 where it is inverted to a positive signal on EB END L line. The positive signal on the EB END L line is applied to the AND invert circuit 619 the other inputs of which have positive signals maintained thereon so as to render the AND invert circuit 619 effective to maintain a negative signal input to the OR invert 620 thereby latching the positive signal on the EB END L line until a negative signal is subsequently applied to the −OUT CYCLE START line. The positive signal on the EB END L line is also applied to condition the AND invert circuit 458 in FIG. 19e3. At ∅1 time of the next clock cycle, a ∅1 clock pulse is applied to render the AND invert circuit 458 effective to apply a negative signal to set the OUTPUT CYCLE latch 464 producing a positive signal on OUT CYCLE line and a negative signal on the −OUT CYCLE line thereby initiating an output cycle with the negative signal on the −OUT CYCLE line being applied to set the START OUT CYCLE END latch 580. Referring now to FIG. 19g4, the positive signal on the OUT CYCLE line together with a positive signal on the K ORD line render the AND invert circuit 598 effective to apply a negative signal to decondition the AND circuit 600, to decondition the AND circuit 572 and via the −LKB line to one input of the OR invert circuit 604. The deconditioned AND circuit 600 applies a negative signal via the −LIB line to one input of the OR invert circuit 602 while the deconditioned AND circuit 572 applies a negative signal via the −SR line to one input of the OR invert circuit 574. Referring now to FIG. 19f4, at ∅11/L time, a −∅1/L clock pulse is applied to reset the EB END latch 616. Referring now to FIG. 19g4, at ∅2 time, a −C clock pulse is applied to the other input of the OR invert circuits 602, 604 and 574 causing them to be deconditioned and apply positive signals via the LIB, LKB and SR lines, respectively, to the control signal cable connected to the crypto engines. The positive signals on the SR line is also applied to the OR invert circuit 606 in FIG. 19h4 causing a negative signal, delayed by delay circuit 608, to be applied via the $\overline{\text{LDK}}$ line to the control signal cable.

Referring now to the crypto engines in FIG. 19g1, these signals are effective to cause the buffer and key registers to shift in synchronism with a data byte being transferred from the buffer registers UBR 100 and LBR 150 to the key registers UKR 350 and LKR 400. Referring now to FIG. 19d4, at ∅4 time, a ∅4 clock pulse in combination with positive signals on the OUT CYCLE and K ORD lines are applied to render the AND invert circuit 442 effective to apply a negative pulse to the STEP BYTE CTR line, at the trailing edge of which a positive signal is effective to step the byte counter to a count of 1. In a similar manner to that described above, the buffer registers and the key registers of the crypto engine are shifted in synchronism, once for each clock cycle, causing successive bytes of the operational key in clear form to be transferred from the buffer registers to the key registers.

The byte counter 448 counts the clock cycles and when the count steps from a count of 7 back to a count of 0, a negative signal is applied to set the COUNT 8 latch 450 which, in being set, applies a negative signal via the −CT8 line to reset the OUTPUT CYCLE latch 464 in FIG. 19e3. The OUTPUT CYCLE latch 464, in being reset, applies a positive signal on the −OUT CYCLE line and a negative signal on the OUT CYCLE line. Referring now to FIG. 19d3, the combination of positive signals on the −OUT CYCLE line and the −IN CYCLE line render the AND invert circuit 410 effective to apply a negative signal to reset the COUNT 8 latch 450 in FIG. 19d4, and is inverted by the inverter 412 to a positive signal to reset the BLOCK COUNT flip flop 414 producing a negative signal on the −BLK0 line and a positive signal on the −BKL1 line. At the same time, the negative signal on the OUT CYCLE line is applied to decondition the AND invert circuit 598 in FIG. 19g4 causing a positive signal to be applied via −LKB line to the OR invert circuit 604 and to render the AND circuits 600 and 572 effective to apply positive signals via the −LIB and −SR line to the OR invert circuits 602 and 574. As a result, negative signals are now maintained on the LIB, LKB and SR line to terminate further shifting of the buffer and key registers in the crypto engines.

Referring now to FIG. 19f3, at ∅1 time of the next clock cycle, a ∅1 DEL clock pulse in combination with the positive signal on the −OUT CYCLE line and the positive signal output of the START OUT CYCLE END latch 580 are applied to render the AND invert circuit 582 effective to produce a negative signal to set the OUT CYCLE END latch 584. The OUT CYCLE END latch 584, in being set, applies a positive signal on the OUT CYCLE END line to condition the AND invert circuit 578 in FIG. 19e3 and a negative signal on the −OUT CYCLE END line to reset the DECK latch 296 in FIG. 19c3. The DECK latch 296 in being reset applies a positive signal to render the AND invert circuit 298 in FIG. 19c4 effective to apply a negative signal on the K ORD line and via the inverter 300 a positive signal on the −K ORD line indicating the end of the key order operation. Referring now to FIGS. 19e3 and 19f3, at ∅4 time, a ∅4 clock pulse is applied to render the AND invert circuit 578 effective to apply a negative signal to reset the START OUT CYCLE END latch 580. At ∅1 time of the next clock cycle, a −∅1/L clock pulse is applied to reset the OUT CYCLE END latch 584 and thereby end the decipher key order operation with the operational key presently stored in the key registers in preparation for a subsequent data processing operation.

ENCIPHER ORDER OPERATION

The function of this operation is to encipher a message, which may consist of one or more 8 byte blocks of plaintext, into a corresponding message of ciphertext. After a valid operational key is installed in the crypto engines there is no need to issue any further key handling orders for successive blocks of plaintext so long as that same operational key is used. A valid operational key is loaded in the key registers of the crypto engine by one of two ways, either by performing a LKD operation or a DECK operation, as previously described.

When the order code specifying the encipher order is decoded, a ENC latch is set to signal the encipher mode of operation. Following the ENC order command, a first series of 8 PIOW data commands is issued, with the data fields associated with the commands, being loaded into the buffer registers of the crypto engines as the first message block of plaintext to be enciphered. The first such command initiates an input cycle and a byte counter counts each such command received. After the 8 PIOW commands have been received and the 8th byte of the message block written into the buffer registers, then, at the 8th count the input cycle ends, a block counter is set and the crypto engines start an encipher function which is indicated by the generation of an engine busy signal. At the end of the encipher operation, half of the ciphertext block of data is present in the upper data register and the other half is present at the outputs of the cipher function circuits. Following the encipher operation, a series of 8 PIOR data commands are issued for reading the enciphered message block of ciphertext. The first such command initiates an output cycle and the byte counter counts each such command received. During the execution of the first PIOR data command, while the block count is at a count of 1, the message block of ciphertext is parallel transferred from the upper data register and the outputs of the cipher function circuits to the buffer registers where it is now available for reading, a byte at a time. At the end of the execution of each PIOR command, the buffer registers are shifted one position to present the next byte of the message block of ciphertext for reading. At the 8th count of the byte counter, the output cycle ends, the block counter is reset and the ENC latch remains set to end the encipher order operation. The ENC latch in remaining set permits one or more succeeding message block of plaintext to be enciphered in a similar manner as that described above.

Figure 25C:
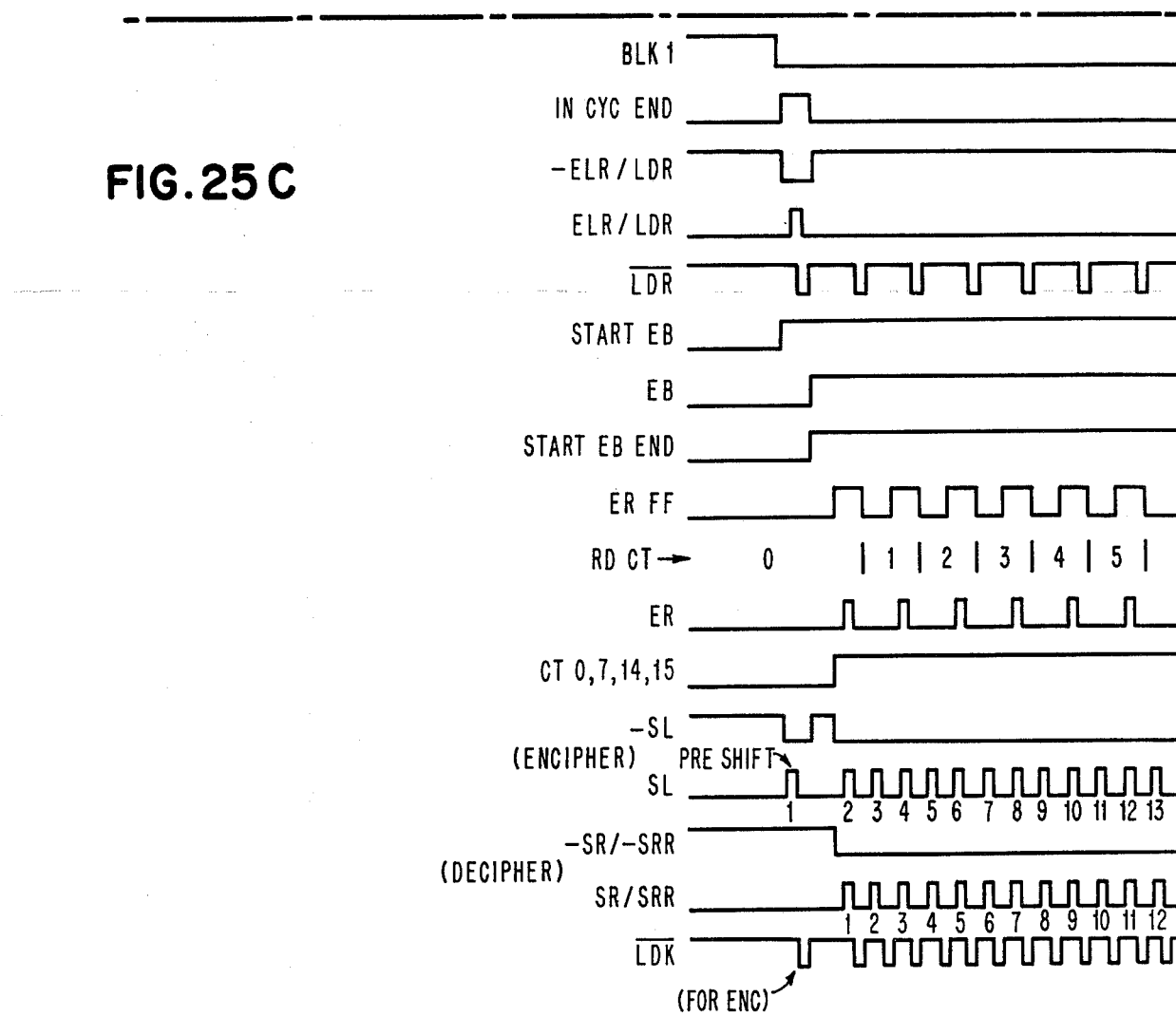
Figure 25:
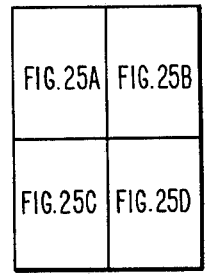
FIG. 25 illustrates how FIGS. 25a to 25d may be placed to form a composite timing diagram.
Figure 25D:
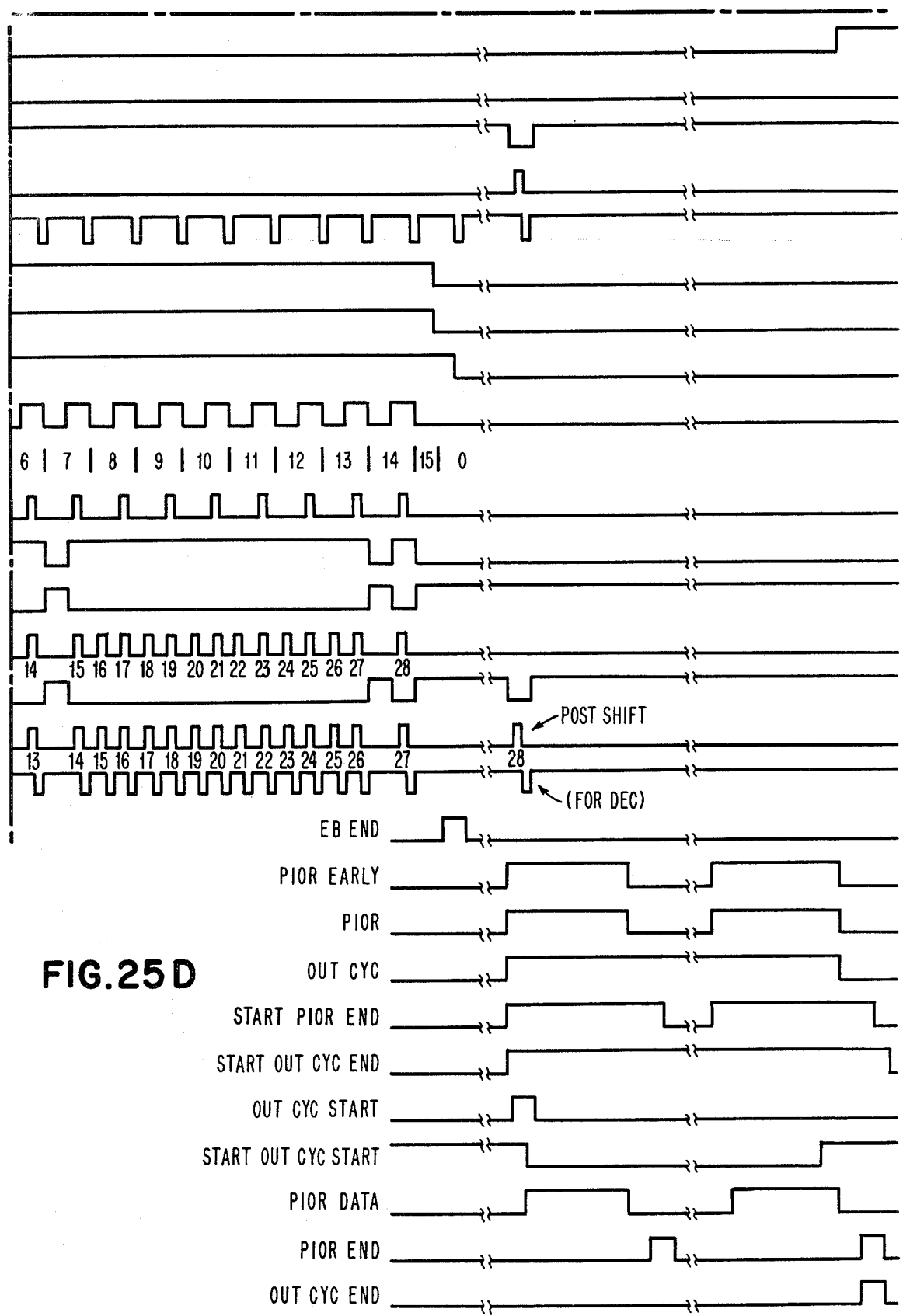

A more detailed description of the encipher order operation will now be given in conjunction with the timing diagram of FIG. 25. After address selection at TA time and loading the command byte into the command register at TC time, the command code is decoded by AND invert circuit 266 in FIG. 19b2 to produce a negative signal which is inverted by inverter 268 to a positive signal on the WR DSD ORDER line thereby indicating the presence of a WR DSD ORDER command. At the same time, a data processing order code is decoded by the AND invert circuit 302 to apply a negative signal via the −DP DEC line to the inverter 304 where it is inverted to a positive signal and applied to one input of the AND invert circuit 306. At TD time, a positive signal is applied via the SYNCH TD line to render the AND circuit 270, conditioned by the positive signal on the WR DSD ORDER line, effective to produce a positive signal on the WR ORD TIME line which is applied to the remaining input of the AND invert circuit 306 to render it effective to produce a negative signal which is applied via the −RST ENC line to reset the ENC latch 312 in FIG. 19c4 and to the inverter 308 where it is inverted to a positive signal and applied to one input of the AND invert circuit 310. A positive signal on the −Y line from the command register 224 personalizes the present order as an ENC order and is applied to the other input of the AND invert circuit 310 to render it effective to apply a negative signal via the −SET ENC line to set the ENC latch 312. The ENC latch 312 in being set applies a positive signal via the ENC line to FIG. 19g3 where it is effective to condition the AND circuit 536 an is inverted to a negative signal by the inverter 546 to apply a negative signal on the DEC line to decondition the AND invert circuits 548 and 560.

The series of 8 PIOW data commands is now received and processed in a similar manner to that described in the DECK order operation i.e. an input cycle is initiated, the byte counter 448 is conditioned to count each PIOW data command received and the message block of plaintext is loaded, a byte at a time, per PIOW data command, into the buffer registers UBR 100 and LBR 150. After the 8th byte has been written into the buffer registers, then, at the 8th count, the input cycle ends, the block count flip flop 414, in FIG. 19d3, is set and the IN CYCLE END latch 534 in FIG. 19f3 is set. The IN CYCLE END latch 534 in being set initiates the swapping action between the buffer registers and the data registers of the crypto engines which, in this case, causes the message block of plaintext to be transferred from the buffer registers UBR 100 and LBR 150 to the data registers UDR 200 and LDR 250 preparatory to performing the encipher operation. At the same time, referring to the AND circuit 538 in FIG. 19g3, positive signals on the IN CYCLE END and ENC lines render the AND circuit 538 effective to apply a positive signal to the OR invert circuit 540 causing a negative signal to be applied via the −SL line to one input of the OR invert circuit 544. At −C time, a −C clock pulse is applied to the other input of the OR invert circuit 544 causing it to apply a positive signal via the SL line to the control signal cable and to one input of the OR invert circuit 606 in FIG. 19h4. The OR invert circuit 606 is rendered effective to apply a negative signal, delayed by the delay circuit 608, via the $\overline{LDK}$ line to the control signal cable connected to the crypto engines. Referring now to the crypto engines in FIG. 19g1, the signals on the SL and $\overline{LDK}$ line are applied to the key registers causing the contents thereof to be shifted one position to the left as a pre-shift operation prior to the encipher operation.

The encipher operation is similar to the decipher operation previously described in connection with DECK order operation except that in this case the key register is shifted to the left under control of SL control signals rather than the SRR and SR control signals as can be better seen by referring to the timing diagram of FIG. 25. Referring to FIG. 19g3, this is so because the signals on the CT 0, 7, 14, 15 line are used with the AND circuit 536 conditioned by the positive signal on the ENC line and inhibited from being used with the AND circuit 548 deconditioned by the negative signal on the DEC line. As a result of the single pre-shift signal on the SL line and the 27 additional signals on the SL line during the encipher operation, the key registers shift left exactly 28 times to return the operational key back to the initial condition in the key registers in preparation for enciphering the next block of a multi-block plaintext message. At the end of the cipher function, half of the ciphertext block of data is available at the output of the upper data register UDR 200 and the other half is available at the outputs of the cipher function circuits.

Referring now to FIG. 19b2, the first of a series of 8 PIOR data commands is now received and after address selection at TA time and command loading into the command register at TC time, the AND invert circuit 262 decodes this command and applies a negative signal to one input of the OR invert circuit 260 and to the inverter 264 where it is inverted to a positive signal on the PIOR EARLY line. Referring now to FIG. 19d3, the positive signal on the PIOR EARLY line is applied to the inverter 422 where it is inverted to a negative signal and applied to one input of the OR invert circuit 424. At this time, positive signals are maintained at the input of the AND invert circuit 416 causing a negative signal to be applied to the other input of the OR invert circuit 424 which therefore produces a positive signal on the PIOR line. The positive signal on the PIOR line is applied to the OR invert circuit 456 in FIG. 19e3 where it is inverted to a negative signal to set the OUTPUT CYCLE latch 464 producing a positive signal on the OUT CYCLE line and a negative signal on the −OUT CYCLE line to initiate an output cycle. The positive signal on the PIOR line is also applied to the inverter 462 where it is inverted to a negative signal and applied via the −PIOR line to set the START PIOR END latch 588 in FIG. 19f3. Referring now to FIGS. 19e3 and 19f3, the negative signal on the −OUT CYCLE line is applied to set the START OUT CYCLE END latch 580 while the positive signal on the OUT CYCLE line in combination with the positive signal output of the START OUT CYCLE START latch 554 in FIG. 19f3 are applied to condition the AND invert circuit 556. A ∅1 time of the next clock cycle, a ∅1 DEL clock pulse is applied to render the AND invert circuit 556 effective to apply a negative signal to set the OUT CYCLE START latch 558 which, in being set, applies a positive signal to the OUT CYCLE START line and a negative signal to the −OUT CYCLE START line. The positive signal on the OUT CYCLE START line is applied to condition the AND invert circuit 552 in FIG. 19e3 and is also applied to the AND circuit 634 in FIG. 19g4. Since this is not a key order operation and the block count is at a count of one, positive signals are maintained on the other inputs to the AND circuit 634 which, therefore, is rendered effective to apply a positive signal to the OR invert circuit 640 which, in turn, initiates production of the ELR and $\overline{LIB}$ control signals, in a manner previously described, to the crypto engines where they are effective to cause the enciphered block of data to be transferred from the outputs of the upper data register UDR 200 and the outputs of the modulo-2 adder 650-664 to the upper buffer register 100 and the lower buffer register 150, respectively, in preparation for reading the now enciphered block of ciphertext. Referring now to FIGS. 19e3 and 19f3, at ∅4 time, a ∅4 clock pulse is applied to render the AND invert circuit 552 effective to apply a negative signal to reset the START OUT CYCLE START latch 554. At ∅1/L time, a −∅1/L clock pulse is applied to reset the OUT CYCLE START latch 558.

Referring now to FIG. 19b2, at TC END time, a positive signal on the TC END line is applied to the inverter 258 where it is inverted to a negative signal to decondition the OR invert circuit 260 causing a positive signal to be applied to the PIOR DATA line. Referring now to the AND circuit 902 in FIG. 19h3, assuming there has been no procedural error, the positive signal on the PIOR DATA line is applied to render the AND circuit 902 effective to apply a positive signal to condition an array of exclusive OR circuits 906 in FIG. 19i1. The function of this array is to compare corresponding data bytes from the two crypto engines for equality.

Exclusive OR circuit 906A is representative of this array and will be described in detail. Byte outputs from the crypto engine are applied to the AND invert circuits 908, 910 and 912 with a positive signal on the bit line representing a bit 1 and a negative signal on the bit line representing a bit 0. If the output bits are both equal to 1, then positive signals are applied to render the AND invert circuit 908 effective to apply a negative signal to decondition both the AND invert circuits 910 and 912 causing a positive signal to be produced from the joint outputs thereof. Similarly, if the output bits are both equal to 0, then negative signals are applied to decondition the AND invert circuits 910 and 912 causing a positive signal to also be produced from the joint outputs thereof. On the other hand, if the output bits from the crypto engines are not equal, then the AND invert circuit 908 is deconditioned to apply a positive signal to condition the AND invert circuits 910 and 912, one of which will have a positive signal applied thereto from one of the crypto engines to render that AND invert circuit effective to apply a negative signal from the joint outputs thereof. Accordingly, it should be apparent that if the outputs of one crypto engine equal the outputs of the other crypto engine, then positive signals will be applied from the array of exclusive OR circuit 906 to render the AND invert circuit 916 effective to produce a negative signal to decondition the engine error detect AND invert circuit 918. On the other hand, if any bit of the cipher engines does not compare, then, a negative signal output from the exclusive OR circuit corresponding to the error bit will be applied to decondition the AND invert circuit 916 causing a positive signal to be applied to condition the engine error detect AND invert circuit 918.

During TC END time, while a positive signal is maintained on the PIOR DATA line, and assuming there is no engine errors, the byte output of the crypto engines is taken from the output of the AND invert circuits, such as AND invert circuit 908, of the array of exclusive OR circuits 906 and applied to the −DATA BUS IN. At the same time, parity generator circuit 914, which is responsive to the data byte output of the array of exclusive OR circuits 906, generates a parity bit for the data byte which is applied to the −P line of the −DATA BUS IN.

At TD time, a positive signal is applied via the TD SEL line to render the AND invert circuit 918 effective or not depending on whether an engine error has been detected. If an engine error is detected, the AND invert circuit 918 is rendered effective to apply a negative signal via the ENGINE ERR line to set the bit 1 latch 954B of the status register 952 to indicate the fact that an engine error was detected.

At the end of this IO operation, the command register 224 in FIG. 19a2 is reset to decondition the command decoder AND invert circuit 262 thereby causing a positive signal to be applied to the OR invert circuit 260 and the inverter 264 which, in turn, cause negative signals to now be applied to the PIOR DATA and PIOR EARLY lines, respectively. The negative signal on the PIOR EARLY line is applied to the inverter 422 in FIG. 19d3 where it is inverted to a positive signal to render the OR invert circuit 424 effective to apply a negative signal on the PIOR line. The negative signal on the PIOR line is applied to the inverter 446, in FIG. 19d4, where it is inverted to a positive signal on the STEP BYTE CTR line to step the Byte Counter 448 to a count of 1. The negative signal on the PIOR line is also applied to the inverter 462 in FIG. 19e3 where it is inverted to a positive signal and applied together with a positive signal from the START PIOR END latch 588 in FIG. 19f3 to condition the AND invert circuit 590. At $\emptyset 1$ time of the next clock cycle, a $\emptyset 1$ DEL clock pulse is applied to render the AND invert circuit 590 effective to produce a negative signal to set the PRIOR END latch 592 causing a positive signal to be produced on the PRIOR END line to condition the AND invert circuit 586 in FIG. 19e4 and a negative signal on the −PIOR END line which is applied to decondition the AND circuit 600 in FIG. 19g4. The AND circuit 600 in being deconditioned initiates the production of a LIB and $\overline{\text{LIB}}$ control signals, in a manner as previously described, via the control signal cable to the crypto engines to shift the buffer registers one position in preparation for outputting the next byte of ciphertext of the enciphered message block of data. Referring now to the AND invert circuit 586 in FIG. 19e4, at $\emptyset 4$ time, a $\emptyset 4$ clock pulse is applied to render the AND invert circuit 586 effective to rest the START PIOR END latch 588. At $\emptyset 1/L$ time of the next clock cycle, a $-\emptyset 1/L$ clock pulse is applied to reset the PIOR END latch 592.

In a similar manner, during each of the succeeding ones of the series of 8 PIOR data commands, the next data byte of cipher text is passed with an appended parity bit to the −DATA BUS IN, the data byte is checked for an engine error, the byte counter is stepped to the next count and the buffer registers of the crypto engines are shifted one position to provide the next succeeding data byte of ciphertext for processing.

After the 8th byte is read to the −DATA BUS IN, the byte counter 448 in FIG. 19d4 steps from a count of 7 back to a count of 0 causing a negative signal to be produced to set the COUNT 8 latch 450 which, in turn, applies a negative signal to the −CT 8 line. The negative signal on the −CT 8 line is applied to reset the OUTPUT CYCLE latch 464 in FIG. 19e3 thereby ending the output cycle. The OUTPUT CYCLE latch 464 in being reset applies a positive signal on the −OUT CYCLE line and a negative signal on the OUT CYCLE line.

Referring now to FIG. 19d3, the combination of the positive signals on the −OUT CYCLE line and the −IN CYCLE line render the AND invert circuit 410 effective to apply a negative signal to reset the COUNT 8 latch 450 in FIG. 19d4 and is inverted by inverter 412 to a positive signal to reset the BLOCK COUNT flip flop 414. The negative signal on the OUT CYCLE line is applied to set the START OUT CYCLE START latch 554 in FIG. 19f3. At the end of this IO operation, the command register is reset to effectively cause a positive signal to be applied on the −PIOR line, as in a manner previously described, which in combination with the positive signal output of the START PIOR END latch 588 are applied to condition the AND invert circuit 590 in FIG. 19f3. Accordingly, at $\emptyset 1$ time of the next clock cycle, a $\emptyset 1$ DEL clock pulse is applied to render the AND invert circuit 590 effective to apply a negative signal to set the PIOR END latch 592 which, in being set, applies a positive signal to the PIOR END line and a negative signal to the −PIOR END line. The negative signal on the −PIOR END line is applied to decondition the AND circuit 600 in FIG. 19g4 which initiates production of the LIB and $\overline{\text{LIB}}$ control signals, in a manner previously described, via the control cable to the crypto engines. Referring now to the crypto engine in FIG. 19g1, the LIB and $\overline{\text{LIB}}$ control signals are applied to shift the buffer register one more position to effectively clear the content thereof in preparation for receiving the next block of plaintext of a multi-block message for encipherment. Referring now to FIG. 19e4, at ∅4 time, a ∅4 clock pulse in combination with the positive signal on the PIOR END line are applied to render the AND invert circuit 586 effective to apply a negative signal to reset the START PIOR END latch 588 in FIG. 19f4. At ∅1/L time of the next clock cycle, a −∅1/L clock pulse is applied to reset the PIOR END latch 592 to terminate the encipher order operation.

DECIPHER ORDER OPERATION

The function of this operation is to decipher a message, which may consist of one or more 8 byte blocks of ciphertext, into a corresponding message of plaintext. After a valid operational key is installed in the crypto engine by either a LDK or DECK order operation there is no need to issue any further key handling orders for successive blocks of ciphertext so long as the same operational key is used.

When the order code specifying a decipher order is decoded, the ENC latch is reset to signal the decipher mode of operation. Following the DEC order command, a series of 8 PIOW data commands is issued, with the data fields associated with the commands, constituting the message block of ciphertext, being loaded into the buffer registers of the crypto engines. The first such command initiates an input cycle and a byte counter counts each such command received. After the 8 PIOW commands have been received and the 8 byte written into the buffer registers, then, at the 8th count, the input cycle ends, the block of ciphertext is transferred from the buffer registers to the data registers of the crypto engines, a block counter is set and the crypto engines start a decipher function which is indicated by the generation of an engine busy signal. At the end of the decipher operation, half of the cleartext block of data is present in the upper data register and the other half is present at the outputs of the cipher function circuits. Following the decipher operation, a series of 8 PIOR data commands are issued for reading the deciphered message block of cleartext. The first such command initiates an output cycle and the byte counter counts each such command received. During the execution of the first PIOR data command, while the block count is at a count of 1, the message block of cleartext is parallel transferred from the upper data register and the outputs of the cipher function circuits to the buffer registers where it is now available for reading, a byte at a time. At the end of the execution of each PIOR data command, the buffer registers are shifted one position to present the next byte of the message block of cleartext for reading. At the 8th count of the byte counter, the output cycle ends, the block counter is reset and the ENC latch remains reset to end the decipher operation. The ENC latch in remaining reset permits one or more succeeding message blocks of ciphertext to be deciphered in a similar manner as that described above.

The decipher operation is similar to the encipher operation in that an order code is decoded, a series of 8 PIOW data commands are issued to proceed into an input cycle for loading a data parameter into the crypto engines, a cipher function is performed on the data parameter under control of an operational key and a series of 8 PIOR data commands are issued to proceed into an output cycle for reading the results of the cipher function. The similarity between these two operations can be seen from the timing diagram of FIG. 25. The basic difference between these two operations is in the specification of the decipher order rather than an encipher order, which sets the device for the decipher mode of operation, and the key shifting schedule provided for the key registers during the decipher function performed by the crypto engines. It will be remembered that for an encipher operation the key registers are shifted to the left by one pre-shift SL control signal followed by 27 additional SL control signals during the 16 rounds of the encipher operation for a total of 28 SL control signals to restore the cipher key back to its initial home position in preparation for enciphering the next block of cleartext. In the decipher operation, the key registers, instead of being shifted to the left, as in the encipher operation, are shifted to the right by 27 SRR and SR control signals during the 16 rounds of the decipher function, as described in detail in the DECK order operation, followed by one post-shift SRR and SR control signals at the beginning of the output cycle for a total of 28 SRR and SR control signals to restore the cipher key back to its initial home position in preparation for deciphering the next block of ciphertext. It should be apparent that with this symmetry, the decipher rounds are performed in the reverse order of the encipher rounds i.e. the set of cipher key bytes used in the last round of an encipher operation is the set of cipher key bytes used in the first round of the decipher operation so that each round of the decipher operation undoes each round of the encipher operation, in reverse order.

Since the basic cipher operation has been described in detail in the previous section and the generation of the 27 control signals SRR and SR for a decipher function has been described in connection with the detailed description of DECK order operation, the following detailed description will be restricted to a description of how the device is set for the decipher mode of operation and how the 28th postshift SRR and SR control pulses are provided at the beginning of the output cycle of the decipher order operation.

After address selection at TA time and loading the command byte into the command register at TC time, the command code is decoded by and AND invert circuit 266 in FIG. 19b2 to produce a negative signal which is inverted by inverter 268 to a positive signal on the WR DSD ORDER line thereby indicating the presence of a WR DSD order command. At the same time, the order code for data processing operation is decoded by the AND invert circuit 302 in FIG. 19b3 to produce a negative signal on the −DP DEC line where it is inverted to a positive signal by inverter 304 and applied to one input of the AND invert circuit 306. At TD time, a positive signal is applied via the SYNCH TD line to render the AND circuit 270, conditioned by the positive signal on the WR DSD ORDER line, effective to produce a positive signal on the WR ORD TIME line which is applied to the remaining input of the AND invert circuit 306 to render it effective to produce a negative signal which is applied via the −RST ENC line to reset the ENC latch 312 in FIG. 19c4 and to the inverter 308 where it is inverted to a positive signal and applied to one input of the AND invert circuit 310. A negative signal on the −Y line from the command register 224 personalizes this data processor order as a DEC order and is applied to decondition the AND invert circuit 310, which in being deconditioned, maintains a positive signal on the −SET ENC line so that the ENC latch 312 remains in a reset condition. The ENC latch 312, in being in a reset condition, applies a negative signal via the ENC line to the inverter 546 in FIG. 19g3 where it is inverted to a positive signal on the DEC line to condition the AND invert circuits 548 and 560 each of which is effective for controlling the generation of the SRR and SR control signals used during the decipher operation.

After the decipher function has been completed and the key registers have been shifted 27 times under control of the 27 SRR and SR control signals, the first of a series of 8 PIOR data commands is issued to initiate an output cycle causing the OUTPUT CYCLE latch 464 in FIG. 19e3 to be set which, in being set, applies a positive signal to the OUT CYCLE line. The positive signal on the OUT CYCLE line in combination with a positive signal from the START OUT CYCLE START latch 554 in FIG. 19/3 are applied to condition the AND invert circuit 556. At the next $\emptyset1$ time, a $\emptyset1$ DEL clock pulse is applied to render the AND invert circuit 556 effective to apply a negative signal to set OUT CYCLE START latch 558. The OUT CYCLE START latch 558, in being set, applies a positive signal to the AND invert circuit 560 in FIG. 19g3 which, at this time, has positive signals maintained on the other input thereto thereby rendering the AND invert circuit 560 effective to apply a negative signal on the −SRR and via the AND circuit 572 in FIG. 19g4 a negative signal on the −SR line to initiate the generation of the post-shift SRR and SR control signals which are used to shift the key register the 28th time to restore the cipher key back to its initial home position in preparation for deciphering the next block of ciphertext. The remainder of the DEC order operation, namely, to read the 8 bytes of the block of cleartext is performed in a similar manner as that described in detail for the encipher order operation.

PROCEDURAL ERRORS

A procedural error is one in which the DSD receives a command out of sequence or at the wrong time, such that its execution would cause the destruction of loss of good data in the crypto engines or the providing of useless data from the crypto engines. There are three commands that may cause a procedural error, namely, the PIOW data command, the PIOR data command and the WR DSD order command. The various error conditions which may occur for these three commands are described in the following.

1. Procedural errors for a PIOW data command a. If a PIOW data command is issued while a read operation is being performed (an output cycle is in progress), this causes a procedural error since the buffer registers cannot be used concurrently for both reading and writing. Accordingly, referring to FIG. 19d3, while the output cycle is in progress, a negative signal is applied to decondition the AND invert circuit 428 causing a positive signal to be applied to one input of the AND invert circuit 432. Since a WMK order operation is not in progress, a positive signal is applied via the −WMK line to a second input of the AND invert circuit 432. Now, if an attempt is made to execute a PIOW data command before the end of the output cycle, a positive signal is applied via the PIOW DATA line to a third input of the AND invert circuit 432 thereby conditioning this circuit. At $\emptyset3L$ time of the same clock cycle in which the positive signal is applied to the PIOW DATA line, a $\emptyset3L$ clock pulse is applied to render the AND invert circuit 432 effective to apply a negative signal to decondition the AND circuit 438 which, in turn, applies a negative signal to the −PROC ERR line indicating a procedural error.

b. If a PIOW data command is issued while a block of data is contained in the buffer registers, this causes a procedural error since the buffer registers can only contain one block of data at a time. Accordingly, referring to FIG. 19d3, while a block of data is contained in the buffer registers, a negative signal is applied via the −BLK 1 line to decondition the AND invert circuit 428 causing a positive signal to be applied to one input of the AND invert circuit 432 and since a WMK order operation is not in progress and a PIOW data command is being attempted, positive signals are again applied via the −WMK and PIOW DATA lines to condition the AND invert circuit 432. At $\emptyset3L$ time, the $\emptyset3L$ clock pulse is again applied to render the AND invert circuit 432 effective to apply a negative signal to decondition the AND circuit 438 which then applies a negative signal to the −PROC ERR line indicating a procedural error.

c. After a reset or after a WMK order operation, the cipher key in the key registers is invalid and a new cipher key must be loaded into the key registers by either a LKD or DECK order command. If a PIOW data command is issued while an invalid key is present in the key registers, this causes a procedural error since a valid key is not present in the key registers. Accordingly, referring to FIG. 19d3, while an invalid key is present in the key registers, a negative signal is applied via the −key invalid line to decondition the AND invert circuit 428 causing a positive signal to be applied to one input of the AND invert circuit 432 and since a WMK order operation is not in progress and a PIOW data command is being attempted, positive signals are again applied via the −WMK and PIOW DATA lines to condition the AND invert circuit 432 to produce a procedural error signal at $\emptyset3L$ time on the −PROC ERR line.

d. If a PIOW data command is issued to write a new master key into the MK memory less than 16 microseconds after issuing a WMK order command, a procedural error will occur since a WMK overwrite operation is in progress for overwriting the old master key in the MK memory. Therefore, referring to FIG. 19d3 a positive signal on the MK OVW line in combination with a positive signal on the PIOW DATA line renders the AND invert circuit 427 effective to apply a negative signal to decondition the AND circuit 438 to produce a negative signal on the −PROC ERR line indicating a procedural error.

2. Procedural errors for a PIOR data command a. If a PIOR data command is issued while a write operation is presently being performed (an input cycle is in progress), this causes a procedural error since the buffer registers cannot be used concurrently for both reading and writing. Accordingly, referring to FIG. 19d3, while an input cycle is in progress, a negative signal is applied to decondition and AND invert circuit 416 causing a positive signal to be applied to condition and AND invert circuit 436. Now, if an attempt is made to execute a PIOR data command, a positive signal on the PIOR EARLY line is applied to render the conditioned AND invert circuit 436 effective to apply a negative signal to decondition the AND circuit 438 causing a negative signal to be applied to the −PROC ERR line indicating a procedural error.

b. If a PIOR data command is issued at a time when there is no data contained in the buffer registers of the crypto engines, this causes a procedural error since there is no data to be read. Accordingly, referring to FIG. 19d3, at a time when there is no data contained in the buffer registers of the crypto engines, the BLOCK COUNT flip flop 414 is in a reset condition causing a negative signal to be applied via the −BLK O line to decondition the AND invert circuit 416 causing a positive signal to be applied to condition the AND invert circuit 436. Consequently, if an attempt is made to execute a PIOR data command, a positive signal on the PIOR EARLY line is again applied to render the conditioned AND invert circuit 436 effective to apply a negative signal to decondition the AND circuit 438 causing a negative signal to be applied to the −PROC ERR line indicating a procedural error.

c. If a PIOR data command is issued at a time when any of the cipher key handling orders are in progress, this causes a procedural error since no data is to be read during these cipher key handling operations. Accordingly, referring to FIG. 19d3, whenever a key order operation is in progress a negative signal is applied via the −K ORD line to decondition the AND invert circuit 416 causing a positive signal to be applied to condition the AND invert circuit 436. Now, if an attempt is made to execute a PIOR data command, a positive signal on the PIOR EARLY line is applied to render the conditioned AND invert circuit 436 effective to apply a negative signal to decondition the AND circuit 438 causing a negative signal to be applied to the −PROC ERR line indicating a procedural error.

d. If a PIOR data command is issued at a time when a block of data is loaded in the buffer registers and fewer than 32 usec have elaspsed since the last PIOW data command was issued, a procedural error will result since the engine is still busy processing the block ot data. Therefore, referring to FIG. 19d3, while the engine is busy, a negative signal is applied via the −EB line to decondition the AND invert circuit 416 causing a positive signal to be applied to condition the AND invert circuit 436. Now, if an attempt is made to execute a PIOR data command, a positive signal on the PIOR EARLY is applied to render the conditioned AND invert circuit 436 effective to apply a negative signal to decondition the AND circuit 438 causing a negative signal to be applied to the −PROC ERR line indicating a procedural error.

3. Procedural errors for a WR DSD order command a. If a WR DSD order command is issued at a time when any of the cipher key handling orders are in progress, this causes a procedural error since a cipher key handling operation once begun must be completed. Accordingly, referring to FIG. 19d3, whenever a key handling order command is being performed a negative signal is applied via the −K ORD line to decondition the AND invert circuit 433 causing a positive signal to be applied to one input of the AND invert circuit 434. Now, if a WR DSD order command is given while a previous cipher key handling order is in progress, then, positive signals on the WR DSD ORDER and TC SEL lines are applied to render the AND invert circuit 434 effective to apply a negative signal to decondition the AND circuit 438 causing a negative signal to be applied to the −PROC ERR line indicating a procedural error.

b. If a WR DSD order command is issued at a time when data from the buffer registers of the crypto engines are being read, this causes a procedural error since unread data still remains in the crypto engines. Referring now to FIG. 19d3, while data is being read from the buffer registers of the crypto engines, the block count flip flop 414 is in a set state causing a positive signal to be applied via the −BLK 0 line to the inverter 418 where it is inverted to a negative signal to decondition the AND invert circuit 433 which, in being deconditioned, applies a positive signal to one input of the AND invert circuit 434. Now, when a WR DSD order command is issued, positive signals are applied via the WR DSD ORDER and TC SEL lines to render the AND invert circuit 434 effective to apply a negative signal to decondition the AND circuit 438 causing a negative signal to be applied to the −PROC ERR line indicating a procedural error.

c. If a WR DSD order command is issued at a time when a write operation is being performed (an input cycle is in progress), this causes a procedural error since a process once begun must be completed. Accordingly, referring to FIG. 19d3, while an input cycle is in progress, a negative signal is applied via the −IN CYCLE line to decondition the AND invert circuit 433 which, in turn, applies a positive signal to one input of the AND invert circuit 434, as described above, so that when a WR DSD order command is issued the AND invert circuit 434 is rendered effective to initiate generation of a negative signal on the −PROC ERR line indicating a procedural error.

d. If a WMK order command is issued at a time when the EW switch is off, this causes a procedural error since the command cannot be executed unless the EW switch is switched on. Referring now to FIG. 19c3, if the enable write switch is off, a negative signal on the EWMK line is applied to the inverter 423 where it is inverted to a positive signal and applied to one input of the AND invert circuit 425. Now, when a cipher key handling order command is decoded and further particularized as a WMK order command by a positive signal on the −Y line then, positive signals are applied via the (WMK +LKD) and −Y lines to condition the AND invert circuit 425. At SYNCH TD time of the WMK order operation, a positive signal is applied via the WR ORD TIME line to render the AND invert circuit 425 effective to apply a negative signal to decondition the AND circuit 438 in FIG. 19e3 causing a negative signal to be applied to the −PROC ERR line indicating a procedural error.

Referring now to FIG. 19i2, whenever a procedural error occurs because of any of the above conditions, the negative signal on the −PROC ERR line is applied to set the bit 0 and bit 1 latches 954A and 954B of the status register 952 to provide an indication of the procedural error.

ERROR CONDITIONS

Six different kinds of errors are detected in the data security device. Each kind, when it is detected, results in the setting of a unique combination of bits in the status register thereby providing information useable by the terminal processor in carrying out error recovery procedures. The combination of bits in the status register for the different kinds of errors is shown in the following table.

| ERROR CONDITIONS INDICATED IN STATUS REGISTER | | | | | |
|---|---|---|---|---|---|
| | STATUS BITS | | | | |
| Error Condition | 0 | 1 | 2 | 3 | 5 |
| Command Error | — | — | — | — | 1 |
| Illegal Order | 1 | — | 1 | — | — |
| Procedural Order | 1 | 1 | — | — | — |
| Write Error | — | — | — | 1 | — |
| Key Bus Error | — | 1 | 1 | — | — |
| Engine Error | — | 1 | — | — | — |

The contents of the status register, indicating error conditions, if any, are read back to the terminal processor under control of a READ BS command which will now be described.

READ BASIC STATUS COMMAND OPERATION

The function of this operation is to read the contents of the status register with correct parity, to provide information as to the occurrence of any of the six different kinds of errors indicated above. Therefore, this operation is performed periodically to check for error conditions.

Referring now to FIG. 19b2, after address selection is performing during TA time and the command byte is loaded into the command register during TC time, the AND invert circuit 242 decodes the READ BS command code and produces a negative signal which is applied to one input of the OR invert circuit 246. At TC END time, a positive signal on the TC END line is applied to the inverter 244 where it is inverted to a negative signal and applied to the other input of the OR invert circuit 246 which thereby causes the OR invert circuit 246 to apply a positive signal to the READ BS line. The positive signal on the READ BS line is applied to one input of the AND invert circuits 956 in FIG. 19i2, the other inputs of which are connected to the bit latches 954 of the status register 952. Accordingly, a pattern of bit signals, corresponding to the setting of the latches 954 of the status register, are applied to the −DATA BUS IN and to the parity generator 914. It should be noted that the status bits 4, 6 and 7 are not implemented and, therefore, are treated as 0 bits in the parity generator 914 to produce the correct parity bit on the −P line of the −DATA BUS IN. The setting of the status register 952, now present on the −DATA BUS IN, remains stable until the end of this IO operation when the command register is reset and the positive signal on the READ BS line is terminated.

SET/RESET BASIC STATUS COMMAND OPERATION

These commands are used for diagnostic purposes for testing the operation of the status register 952. Thus, in the case of the SET BS command, if the data field associated with the command has good parity, then the status latches 954 that correspond to 1's in the data field associated with the command are set to 1's whereas in the case of the RESET BS command, if the data field associated with the command has good parity, then the status latches 954 that correspond to 1's in the data fields associated with the command are set to 0's. If a parity error is detected during the execution of either of these commands a write error signal will be produced, in a manner previously described, to set the bit 3 status latch 954D of the status register 952 to indicate the occurrence of this error. After execution of either of these commands, a READ BS command may be issued to read the content of the status register 952 in a manner described above, for subsequent determination as to whether a previously defined value written by either the SET BS or RESET BS commands is identical to that read by the READ BS command.

Referring now to FIGS. 19a2 and 19b2, after the address selection is performed during TA time and the command bit is loaded into the command register during the TC time, the AND invert circuit 232 decodes the SET BS command while the AND invert circuit 238 decodes the RST BS command. The AND invert circuit 232 causes a negative signal to be applied to one input of the OR invert 236 while the AND invert circuit 238 causes the negative signal to be applied to one input of the OR invert circuit 240. At TD time, the data field to be loaded into the status register register is received via the −DATA BUS OUT and applied via the inverters 170 to the parity generator 178 to generate a parity bit which is compared with the parity bit received from the −DATA BUS OUT. If the parity bits do not compare then, at TD SEL time the AND invert circuit 362 in FIG. 19b3 will detect the bad parity to apply a negative signal to turn on the WR ERR latch 364 which, in being turned on, applies a positive signal to the AND invert circuit 944 in FIG. 19i2 which is conditioned by positive signal on the −RST line to cause a negative signal to be applied to set the bit 3 latch 954D of the status register 952 indicating the occurrence of the write error. Referring back to FIG. 19b2, if the parity is bad then a negative signal is maintained on the parity good line to decondition the AND invert circuit 234 causing a positive signal to be applied to the OR invert circuits 236 and 240 which, in turn, maintain negative signals on the SET BS or RST BS lines to inhibit execution of either of these commands. On the other hand if good parity is detected, then a positive signal is applied to the AND invert circuit 234 causing a negative signal to be applied to the other inputs of the OR invert circuits 236 and 240. Accordingly, depending on which command is being called for, a positive signal is applied to either the SET BS or RST BS lines. Referring now to FIGS. 19h4 and 19i2, if the command being executed is the SET BS command, then a positive signal is applied to condition the AND invert circuits 924, 928, 934, 942 and 948. Therefore, those bits of the data field which correspond to 1's render these AND invert circuits effective to apply negative signals to set corresponding ones of the latches of the status register 952. On the other hand, if the command being executed is the RESET BS command, then a positive signal on the RESET BS line is applied to condition the AND invert circuits 926, 932, 940, 946 and 950. Therefore, those bits of the data field which correspond to 1's render these AND invert circuits effective to apply negative signals to reset corresponding ones of the latches of the status register 952.

While the invention has been particularly shown and described with reference to the perferred embodiment thereof, it will be understood by those skilled in the art that several changes in form and detail may be made without departing from the spirit and scope of the invention.

We claim:

1. A data security device for performing a cryptographic operation comprising:
cipher key storage means storing a cipher key, working key storage means, means causing said cipher key to be transferred from said cipher key storage means to said working key storage means, data storage means, means storing data in said data storage means representing an operational key enciphered under said cipher key, cipher means operable to decipher said enciphered operational key under control of the cipher key stored in said working key storage means to obtain data representing said operational key in clear form for storage in said data storage means, and means causing said data representing said operational key in clear form to be transferred from said data storage means to said working key storage means as a working cipher key for subsequent cryptographic operations.

2. A data security device as defined in claim 1 wherein said cipher key storage means is battery powered to permit retention of the cipher key if said data security device loses power.

3. A data security device as defined in claim 1 including means for parity checking the cipher key being transferred from said cipher key storage means to said working key storage means and producing an error signal if a parity error in the cipher key is detected.

4. A data security device as defined in claim 3 including means responsive to said error signal for recording that a parity error was detected during the cipher key transfer.

5. A data security device for performing a cryptographic operation comprising:

cipher key storage means, means storing a cipher key in said cipher key storage means, working key storage means, means causing said cipher key to be transferred from said cipher key storage means to said working key storage means, data storage means, means storing data in said data storage means representing an operational key enciphered under said cipher key, cipher means for performing a cipher function, control means causing said cipher means to decipher the enciphered operational key stored in said data storage means under control of the cipher key stored in said working key storage means to obtain data representing the operational key in clear form for storage in said data storage means, and means causing said data representing the operational key in clear form to be transferred from said data storage means to said working key storage means as a working cipher key for subsequent cryptographic operations.

6. A data security device as defined in claim 5 wherein said means storing said cipher key includes manual means for defining the cipher key to be stored in said cipher key storage means.

7. A data security device as defined in claim 5 wherein said means storing said cipher key includes means for overwriting a cipher key previously stored in said cipher key storage means with an arbitrary value before said cipher key is stored in said cipher key storage means.

8. A data security device as defined in claim 5 wherein said storing means is effective thereafter to store plaintext in said data storage means, and further comprising:

encipher control means causing said cipher means to encipher said plaintext stored in said data storage means under control of said operational key in said working key storage means to obtain ciphertext corresponding to said plaintext.

9. A data security device as defined in claim 5 wherein said storing means is effective thereafter to store ciphertext representing plaintext enciphered under said operational key in said data storage means, and further comprising:

decipher control means causing said cipher means to decipher said ciphertext stored in said data storage means under control of said operational key stored in said working key storage means to obtain said plaintext in clear form.

10. A data security device as defined in claim 5 further comprising:

means producing a signal indicating a key handling cryptographic operation which is maintained while said cryptographic operation is being performed, read control means controlling the reading of data from said data storage means, and means responsive to said read control means producing a procedural error signal if a reading of said data storage means is attempted while said key handling cryptographic operation signal is maintained.

11. A data security device comprising:

cipher key storage means, manual enable write means enabling writing into said cipher key storage means, manual entry means for entering successive portions of a cipher key into said cipher key storage means, manual write means, and control means responsive to the first operation of said manual write means for coupling said manual entry means to said cipher key storage means and causing a cipher key overwrite operation to be performed to overwrite the cipher key presently stored in said cipher key storage means by writing whatever value is set by said manual entry means into successive locations of said cipher key storage means, said control means being effective thereafter for each successive operation of said manual write means to write a succeeding value set by said manual entry means into a succeeding location of said cipher key storage means to thereby write a new cipher key into said cipher key storage means.

12. A data security device as defined in claim 11 wherein said control means includes means rendered effective by said first operation of said manual write means producing a signal indicating an invalid cipher key condition, and further comprising:

means effective after writing said new cipher key into said cipher key storage means producing a signal designating a key handling operation is to be performed, and means responsive to said key handling operation signal for terminating said signal indicating an invalid cipher key condition.

13. A data security device comprising:

cipher key storage means, means enabling writing into said cipher key storage means, input means providing successive portions of a cipher key for writing into said cipher key storage means, means coupling said input means to said cipher key storage means, and control means causing a cipher key overwrite operation to be performed to overwrite the cipher key presently stored in said cipher key storage means by writing whatever value is present at said input means into successive locations of said cipher key storage means, said control means being effective thereafter for each successive portion of the cipher key provided by said input means to write said succeeding portion of said cipher key into a succeeding location of said cipher key storage means to thereby write a new cipher key into said cipher key storage means.

14. A data security device as defined in claim 13 wherein said control means includes means producing a signal indicating an invalid cipher key condition, and further comprising means effective after writing said new cipher key into said cipher key storage means producing a signal designating a key handling operation is to be performed, and means responsive to said key handling signal operation signal for terminating said signal indicating an invalid cipher key condition.

15. A data security device as defined in claim 14 wherein said key handling signal designates a decipher key operation.

16. A data security device as defined in claim 14 wherein said key handling signal designates a load key operation.

17. A data security device as defined in claim 13 wherein said control means includes means producing a signal indicating an invalid key condition and, further comprising:

data storage means, means controlling the writing of data to be ciphered into said data storage means, and means producing a procedural error signal if a writing into said data storage means is attempted while said signal indicating an invalid key condition is maintained.

18. A cryptographic data security device as defined in claim 13 further comprising:

means producing an overwrite signal which is maintained while said overwrite operation is being performed, and means responsive to said overwrite operation signal producing a procedural error if a writing operation is attempted while said overwrite operation signal is maintained.

19. A data security device as defined in claim 13 wherein said means enabling writing into said cipher key storage means comprises a manual enable write switch set to an on position for producing an enable write signal to enable said cipher key storage means for writing, and further comprising:

means producing a procedural error signal if a writing into said cipher key storage means is attempted while said enable write manual switch is set off.

20. A data security device for performing a cryptographic operation comprising:

cipher key storage means storing a cipher key, working key storage means, first transfer means causing said cipher key to be transferred from said cipher key storage means to said working key storage means, input/output storage means, input control means controlling the writing of data into said input/output storage means representing an operational key enciphered under said cipher key, data storage means, second transfer means causing said data stored in said input/output storage means to be transferred to said data storage means, cipher means for performing a cipher function, cipher control means causing said cipher means to decipher said data stored in said data storage means under control of said cipher key stored in said working key storage means to obtain data representing the operational key in clear form for storage in said input/output storage means, and third transfer means causing said data representing the operational key in clear form to be transferred from said input/output storage means to said working key storage means as a working cipher key for subsequent cryptographic operations.

21. A data security device as defined in claim 20 wherein said input control means is effective thereafter to store plaintext in said input/output storage means and said second transfer means is effective thereafter to cause said plaintext stored in said input/output storage means to be transferred to said data storage means, and further comprising:

encipher control means causing said cipher means to encipher said plaintext stored in said data storage means under control of said operational key stored in said working key storage means to obtain ciphertext for storage in said input/output storage means, and output control means controlling the reading of said ciphertext from said input/output storage means to a utilization device.

22. A data security device as defined in claim 20 wherein said input control means is effective thereafter for storing ciphertext representing data enciphered under said operational key in said input/output storage means and said second transfer means is effective thereafter causing the ciphertext stored in said input/output storage means to be transferred to said data storage means, and further comprising:

decipher control means causing said cipher means to decipher the ciphertext stored in said data storage means under control of said operational key stored in said working key storage means to obtain plaintext for storage in said input/output storage means, and output control means controlling the reading of said plaintext from said input/output storage means to a utilization device.

23. A data security device for performing a cryptographic operation comprising:

input/output storage means, input control means controlling the writing of a cipher key into said input/output storage means, working key storage means, control means causing said cipher key to be transferred from said input/output storage means to said working key storage means, said input control means being effective thereafter to store plaintext in said input/output storage means, data storage means, means causing said plaintext stored in said input/output storage means to be transferred to said data storage means, cipher means operable to encipher said plaintext stored in said data storage means under control of said cipher key stored in said working key storage means to obtain ciphertext for storage in said input-/output storage means, and output control means controlling the reading of said ciphertext from said input/output storage means to a utilization device.

24. A data security device for performing a cryptographic operation comprising:
input/output storage means,
input control means controlling the writing of a cipher key into said input/output storage means,
working key storage means,
control means causing said cipher key to be transferred from said input/output storage means to said working key storage means,
said input control means being effective thereafter to store ciphertext representing plaintext enciphered under said cipher key in said input/output storage means,
data storage means,
means causing said ciphertext stored in said input-/output storage means to be transferred to said data storage means,
cipher means operable to decipher said ciphertext stored in said data storage means under control of said cipher key stored in said working key storage means to obtain said plaintext in clear form for storage in said input/output storage means, and
output control means controlling the reading of said plaintext in clear form from said input/output storage means to a utilization device.

25. In a data communication network having a host system providing key synchronizing data representing an operational key enciphered under a key encrypting key for transmission over a communication line to a communication terminal which includes a data security device comprising:
key storage means,
means storing a key encrypting key in said key storage means,
working key storage means,
means causing said key encrypting key to be transferred from said key storage means to said working key storage means,
buffer storage means,
write control means controlling the writing of said synchronizing data received from said host system in said buffer storage means,
data storage means,
first transfer means causing said synchronizing data stored in said buffer storage means to be transferred to said data storage means,
cipher means for performing a cipher function,
control means causing said cipher means to decipher said synchronizing data stored in said data storage means under control of said key encrypting key stored in said working key storage means to obtain said operational key in clear form for storage in said buffer storage means, and
second transfer means causing said operational key in clear form to be transferred from said buffer storage means to said working key storage means as a working key for subsequent cryptographic operations.

26. In a data communication network as defined in claim 25 wherein said key encrypting key is a terminal master key.

27. In a data communication network as defined in claim 25 wherein said key encrypting key is a private terminal master key.

28. In a data communication network as defined in claim 25 wherein said write control means is effective thereafter to store terminal plaintext in said buffer storage means and said first transfer means is effective thereafter to cause said terminal plaintext stored in said buffer storage means to be transferred to said data storage means, and further comprising:
encipher control means controlling said cipher means to encipher said terminal plaintext stored in said data storage means under control of said operational key stored in said working key storage means to obtain terminal ciphertext for storage in said buffer storage means, and
means for reading said terminal ciphertext from said buffer storage means for transmission over said communication line to said host system.

29. In a data communication network as defined in claim 25 wherein said write control means is effective thereafter to store ciphertext representing host plaintext enciphered under said operational key received from said host system in said buffer storage means and said first transfer means is effective thereafter to cause said ciphertext stored in said buffer storage means to be transferred to said data storage means, and further comprising:
decipher control means causing said cipher means to decipher said ciphertext stored in said data storage means under control of said operational key stored in said working key storage means to obtain said host plaintext in clear form at said terminal.

30. In a data communication network having a host system connected via a communication line to a communication terminal which includes a data security device comprising:
data storage means,
means storing an operational key in said data storage means,
working key storage means,
control means causing said operational key to be transferred from said data storage means to said working key storage means,
said storing means being effective thereafter to store terminal plaintext in said data storage means, and
cipher means operable to encipher said terminal plaintext stored in said data storage means under control of said operational key stored in said working key storage means to obtain terminal ciphertext for transmission to said host system.

31. In a data communication network having a host system providing ciphertext representing host plaintext enciphered under an operational key for transmission over a communication line to a communication terminal which includes a data security device comprising:
data storage means,
means storing said operational key in said data storage means,
working key storage means,
control means causing said operational key to be transferred from said data storage means to said working key storage means, said storing means being effective thereafter to store said ciphertext received from said host system in said data storage means, and cipher means operable to decipher said ciphertext stored in said data storage means under control of said operational key stored in said working key storage means to obtain said host plaintext in clear form at said terminal.

32. In a data communication system having a first terminal including a data security device operatively coupled to a second terminal having a data security device, the data security devices of said terminals each comprising:

data storage means, means storing an operational key in said data storage means, working key storage means, control means causing said operational key to be transferred from said data storage means to said working key storage means so that a common operational key is maintained in the working key storage means of said first and second terminals, said storing means of said first terminal being effective thereafter to store first terminal plaintext in said data storage means of said first terminal, first terminal cipher means operable to encipher said first terminal plaintext in said data storage means of said first terminal under control of said common operational key in said working key storage means of said first terminal to obtain first terminal ciphertext for transmission to said second terminal, said storing means of said second terminal being effective thereafter to store said first terminal ciphertext received from said first terminal in said data storage means of said second terminal, and second terminal cipher means operable to decipher said first terminal ciphertext stored in said data storage means of said second terminal under control of said common operational key stored in said working key storage means of said second terminal to obtain said first terminal plaintext in clear form at said second terminal.

33. In a data processing network having a data file operatively coupled to a terminal having a data security device comprising:

first data storage means storing data representing a file key and data representing terminal plaintext, second data storage means, input control means controlling the transfer of said file key from said first data storage means to said second data storage means, working key storage means, output control means controlling the transfer of said file key from said second data storage means to said working key storage means, said input control means being effective thereafter for controlling the transfer of said terminal plaintext from said first data storage means to said second data storage means, and encipher means operable to encipher said terminal plaintext stored in said second data storage means under control of said file key stored in said working key storage means to obtain terminal ciphertext for storage in said data file.

34. In a data processing network having a data file containing ciphertext representing plaintext enciphered under a file key operatively coupled to a terminal having a data security device comprising:

first data storage means storing data representing a file key and data representing terminal ciphertext read from said data file, second data storage means, input control means controlling the transfer of said file key from said first data storage means to said second data storage means, working key storage means, output control means controlling the transfer of said file key from said second data storage means to said working key storage means, said input control means being effective thereafter for controlling the transfer of said terminal ciphertext from said first data storage means to said second data storage means, and decipher means operable to decipher said terminal ciphertext stored in said second data storage means under control of said file key stored in said working key storage means to obtain said terminal plaintext at said terminal.

35. A process for performing a cryptographic function comprising the steps of:

storing a key encrypting key, providing said key encrypting key as a working key, providing an operational key enciphered under said key encrypting key, carrying out a decipher operation to decipher said enciphered operational key under control of said working key to obtain said operational key in clear form, and replacing said key encrypting key with said operational key as a working key for subsequent cryptographic operations.

36. A process as defined in claim 35 further comprising the steps of:

providing plaintext, and carrying out an encipher operation to encipher said plaintext under control of said working key to obtain ciphertext representing said plaintext enciphered under said operational key.

37. A process as defined in claim 35 further comprising the steps of:

providing ciphertext representing plaintext enciphered under said operational key, and carrying out a decipher operation to decipher said ciphertext under control of said working key to obtain said plaintext in clear form.

38. A process for performing a cryptographic function comprising the steps of:

storing an operational key and plaintext, providing said operational key to a data storage, providing said operational key from said data storage as a working key, providing said plaintext at said data storage as input data, and carrying out an encipher operation to encipher said input data under control of said working key to obtain ciphertext representing said plaintext enciphered under said operational key.

39. A process of performing a cryptographic function comprising the steps of:

storing an operational key and ciphertext representing plaintext enciphered under said operational key, providing said operational key to a data storage, providing said operational key from said data storage as a working key, providing said ciphertext at said data storage as input data, and carrying out a decipher operation to decipher said input data under control of said working key to obtain said plaintext in clear form.

40. A process for writing a cipher key into the cipher key storage of cryptographic apparatus comprising the steps of:

enabling writing into said cipher key storage, overwriting the present cipher key stored in said cipher key storage with an arbitrary value, providing successive portions of said cipher key, and storing said successive portions of said cipher key into successive locations of said storage to thereby write said cipher key into said cipher key storage.

41. In a data communication network having a host system providing key synchronizing data representing an operational key enciphered under a key encrypting key for transmission over a communication line to a communication terminal having cryptographic apparatus, the method of enciphering terminal data for transmission from said terminal to said host system comprising the steps of:

storing said key encrypting key at said terminal, providing said key encrypting key as a working key at said terminal providing said received key synchronizing data as input data at said terminal, carrying out a decipher operation to decipher said input data under control of said working key to obtain said operational key in clear form, replacing said key encrypting key with said operational key as the working key, providing terminal plaintext, and carrying out an encipher operation to encipher said plaintext under control of said operational working key to obtain terminal ciphertext, and reading said terminal ciphertext for transmission to said host system.

42. In a data communication network having a host system providing key synchronizing data representing an operational key enciphered key encrypting key for transmission over a communication line to a communication terminal having cryptographic apparatus, the method of deciphering host ciphertext representing plaintext enciphered under said operational key for transmission from host system to said terminal comprising the steps of:

storing said key encrypting key at said terminal, providing said key encrypting key as a working key at said terminal, providing said received key synchronizing data as input data at said terminal, carrying out a decipher operation to decipher said input data under control of said working key to obtain said operational key in clear form, replacing said key encrypting key with said operational key, as the working key providing said received host ciphertext as further input data at said terminal, and carrying out a decipher operation to decipher said further input data under control of said operational key to obtain said host plaintext in clear form at said terminal.

43. A data security device comprising:

first data storage means storing data representing a cipher key and data representing plaintext, second data storage means, input control means controlling the transfer of said cipher key from said first data storage means to said second data storage means, working key storage means, output control means controlling the transfer of said cipher key from said second data storage means to said working key storage means, said input control means being effective thereafter for controlling the transfer of said plaintext from said first data storage means to said second data storage means, and cipher means operable to encipher said plaintext stored in said second data storage means under control of said cipher key stored in said working key storage means to obtain ciphertext corresponding to said plaintext.

44. A data security device comprising:

first data storage means storing data representing a cipher key and data representing ciphertext comprising plaintext enciphered under said cipher key, second data storage means, input control means controlling the transfer of said cipher key from said first data storage means to said second data storage means, working key storage means, output control means controlling the transfer of said cipher key from said second data storage means to said working key storage means, said input control means being effective thereafter for controlling the transfer of said ciphertext from said first data storage means to said second data storage means, and cipher means operable to decipher said ciphertext stored in said second data storage means under control of said cipher key stored in said working key storage means to obtain said plaintext corresponding to said ciphertext.

45. A data security device as defined in claims 43 or 44 further comprising:

means producing a signal indicating a key handling operation is in progress which is maintained while said cipher key is being transferred from said first data storage means to said working key storage means, read control means controlling the reading of data from said second data storage means, and means responsive to said key handling operation signal and said read control means producing a procedural error signal if a reading of said second data storage means is attempted while said key handling operation is in progress.

46. A data security device for performing a cryptographic operation comprising:

cipher key storage means for storing a cipher key, working key storage means for storing a working key, means causing said cipher key to be transferred from said cipher key storage means to said working key storage means, means independent of said key storage means for providing data to be enciphered or deciphered, cipher means operable to encipher or decipher said data input thereto for producing an enciphered or deciphered data word, means for causing said enciphered or deciphered data word to be entered into and substituted in said working key storage means as a working cipher key for subsequent cryptographic operations.

* * * * *